(12) United States Patent
Welsh et al.

(10) Patent No.: US 11,936,415 B2
(45) Date of Patent: Mar. 19, 2024

(54) MODULAR RADIO FREQUENCY APERTURE

(71) Applicant: Battelle Memorial Institute, Columbus, OH (US)

(72) Inventors: Raphael Joseph Welsh, Powell, OH (US); Douglas A. Thornton, Upper Arlington, OH (US); Mackenzie Jordan Hawkins, Canal Winchester, OH (US); Micah John Meleski, Columbus, OH (US); Katherine M. Armitage, Grove City, OH (US); Daniel G. Loesch, Sunbury, OH (US); Matthew E. Huntwork, Baltimore, OH (US); David R. Chase, Gahanna, OH (US); Erik W. Edwards, Columbus, OH (US); John Bartholomew, Hilliard, OH (US); Thomas Lloyd Moffitt, San Diego, CA (US); Curt Hudberg, Westerville, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

(21) Appl. No.: 18/139,620

(22) Filed: Apr. 26, 2023

(65) Prior Publication Data
US 2023/0261687 A1   Aug. 17, 2023

Related U.S. Application Data

(63) Continuation-in-part of application No. 17/992,203, filed on Nov. 22, 2022, now Pat. No. 11,742,888,
(Continued)

(51) Int. Cl.
*H04B 1/40* (2015.01)
*H01Q 1/42* (2006.01)

(52) U.S. Cl.
CPC .................. *H04B 1/40* (2013.01); *H01Q 1/42* (2013.01)

(58) Field of Classification Search
None
See application file for complete search history.

(56) References Cited

U.S. PATENT DOCUMENTS

| | | | |
|---|---|---|---|
| 6,623,430 B1* | 9/2003 | Slayton | A61B 8/5223 601/2 |
| 8,848,988 B2* | 9/2014 | Plickert | G01N 21/8483 382/128 |

(Continued)

FOREIGN PATENT DOCUMENTS

| | | |
|---|---|---|
| JP | H 08-181530 A | 7/1996 |
| WO | WO 2022/019026 A1 | 5/2022 |

OTHER PUBLICATIONS

International Search Report of Application No. PCT/US2023/19977 dated Sep. 5, 2023.
(Continued)

*Primary Examiner* — Pablo N Tran
(74) *Attorney, Agent, or Firm* — Lippes Mathias LLP

(57) ABSTRACT

An air interface plane (AIP) of a radio frequency (RF) aperture includes: a circuit board having a first side and a second side opposite the first side; and a matrix of tapered elements arranged on the first side of the circuit board and secured to the circuit board, the matrix of tapered elements cooperating to at least one of receive or transmit an over-the-air RF signal. Suitably, each tapered element of the matrix has: a central hub extending along a longitudinal axis from a hub base which is proximate to the first side of the circuit board to an apex of the tapered element which is distal from the first side of the first circuit board; and a plurality of arms extending from the central hub at the apex of the tapered element, each of the plurality of arms including a first portion that projects the arm radially away from the longitudinal axis and a second portion that projects the arm longitudinally toward the first side of the circuit board.

19 Claims, 78 Drawing Sheets

Related U.S. Application Data which is a continuation of application No. 17/141,796, filed on Jan. 5, 2021, now Pat. No. 11,552,670, which is a continuation of application No. 16/858,169, filed on Apr. 24, 2020, now Pat. No. 11,057,072.

(60) Provisional application No. 62/842,816, filed on May 3, 2019.

(56) References Cited

U.S. PATENT DOCUMENTS

| | | |
|---|---|---|
| 9,602,143 B1 | 3/2017 | Steinbrecher |
| 2007/0066246 A1 | 3/2007 | McDonald et al. |
| 2014/0055784 A1* | 2/2014 | Kremer ................ G01J 3/1804 356/302 |
| 2017/0126330 A1 | 5/2017 | Adiletta et al. |
| 2018/0062731 A1 | 3/2018 | Ng et al. |
| 2019/0326685 A1 | 10/2019 | Adams et al. |
| 2020/0343927 A1 | 10/2020 | Welsh et al. |
| 2021/0313680 A1 | 10/2021 | Turpin et al. |
| 2022/0399918 A1 | 12/2022 | Olesen et al. |

OTHER PUBLICATIONS

International Search Report of Application No. PCT/US2023/19990 dated Aug. 29, 2023.
International Search Report of Application No. PCT/US2023/19985 dated Sep. 5, 2023.

\* cited by examiner

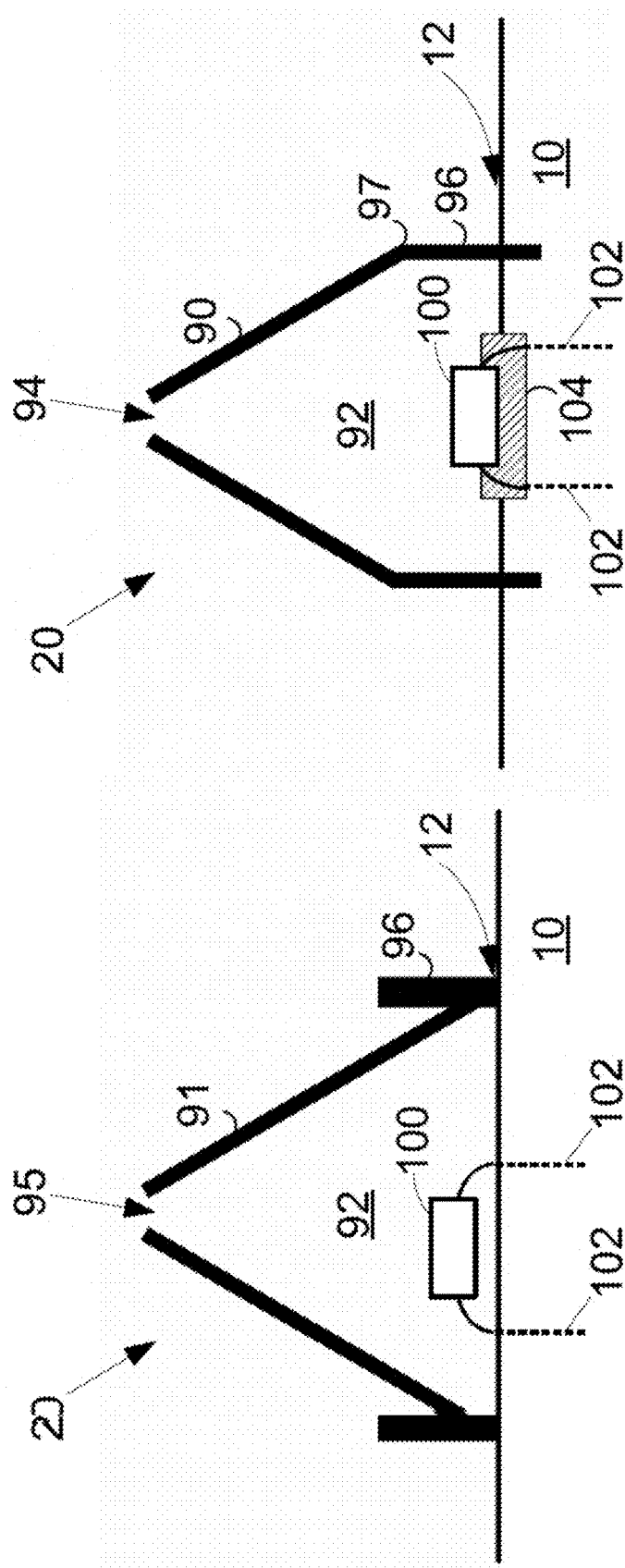

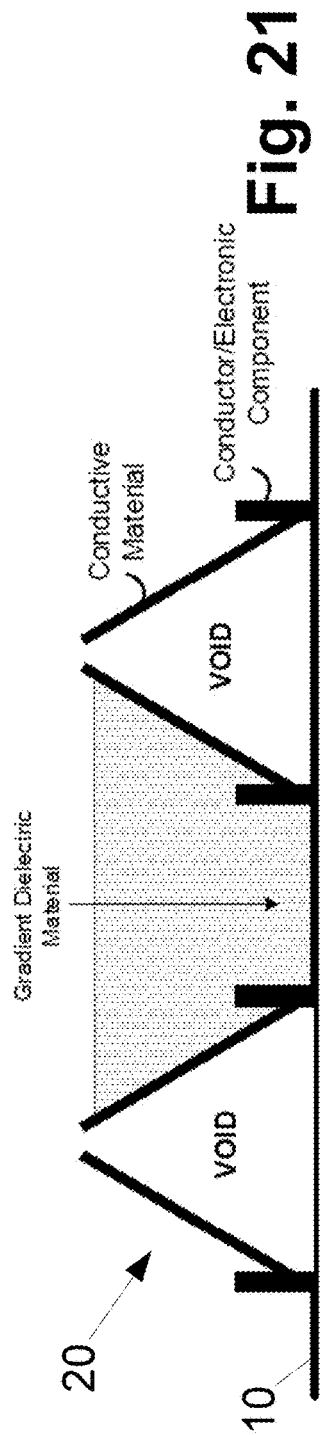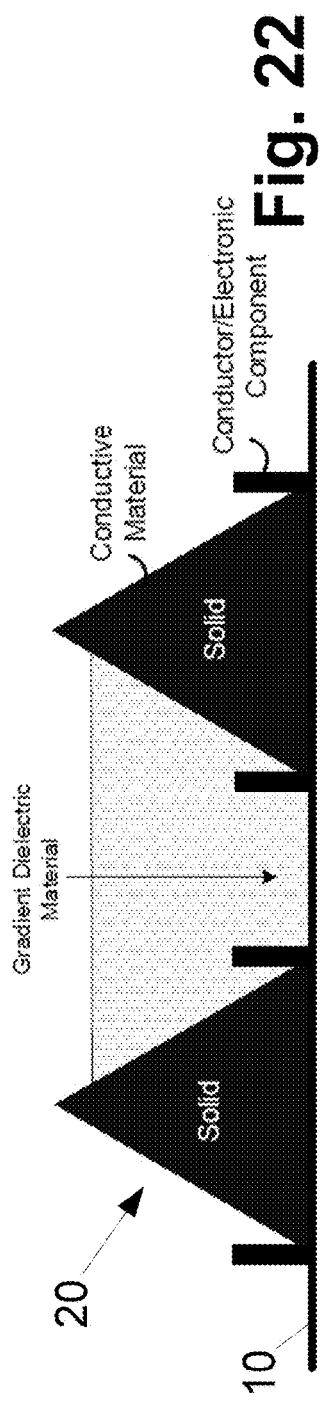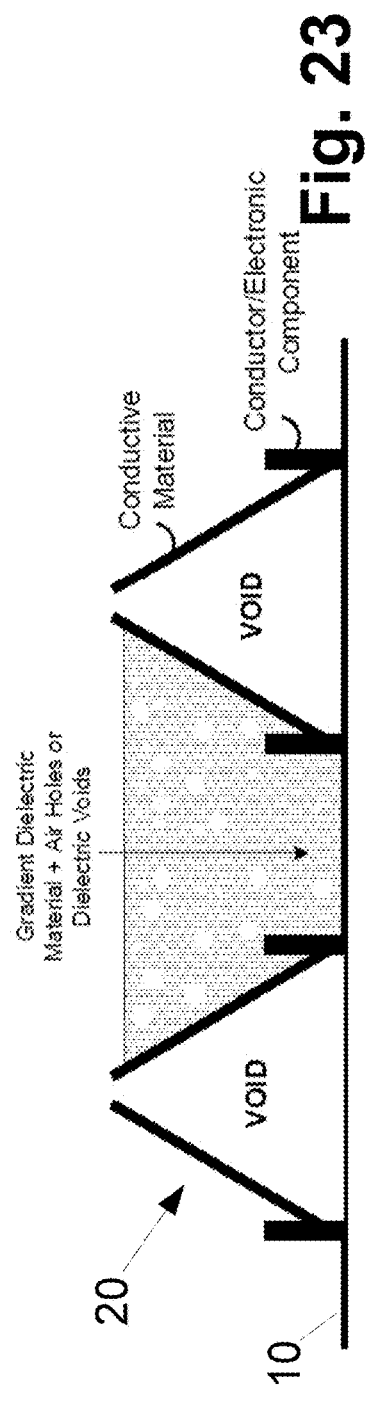

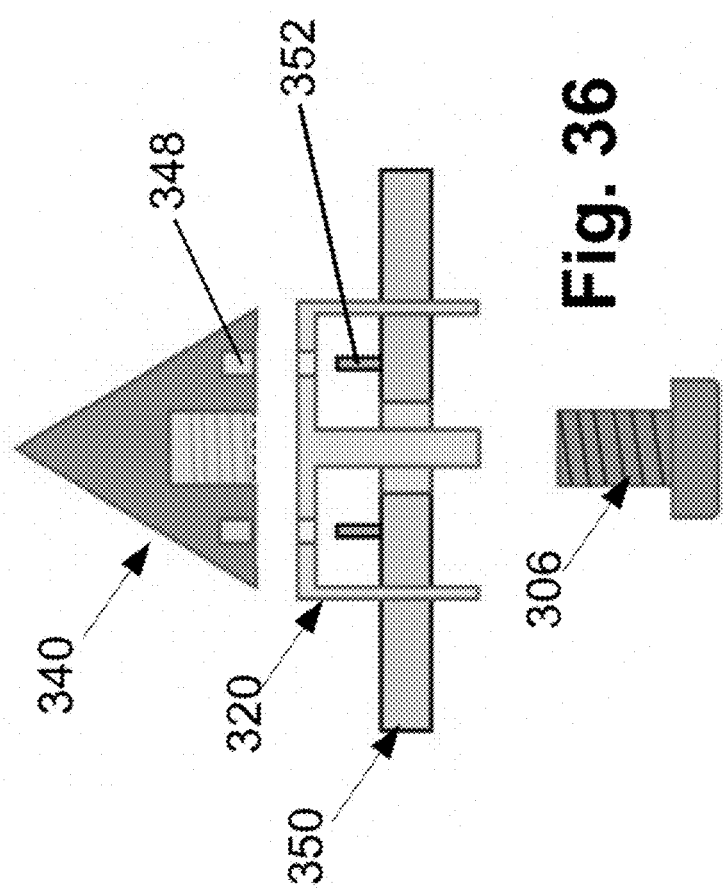

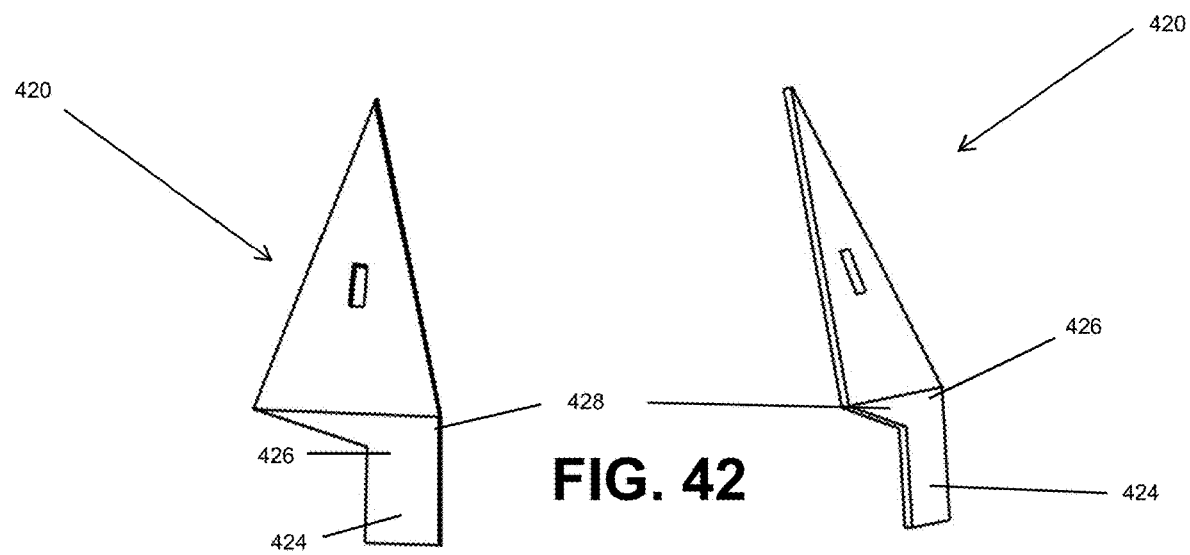
FIG. 42
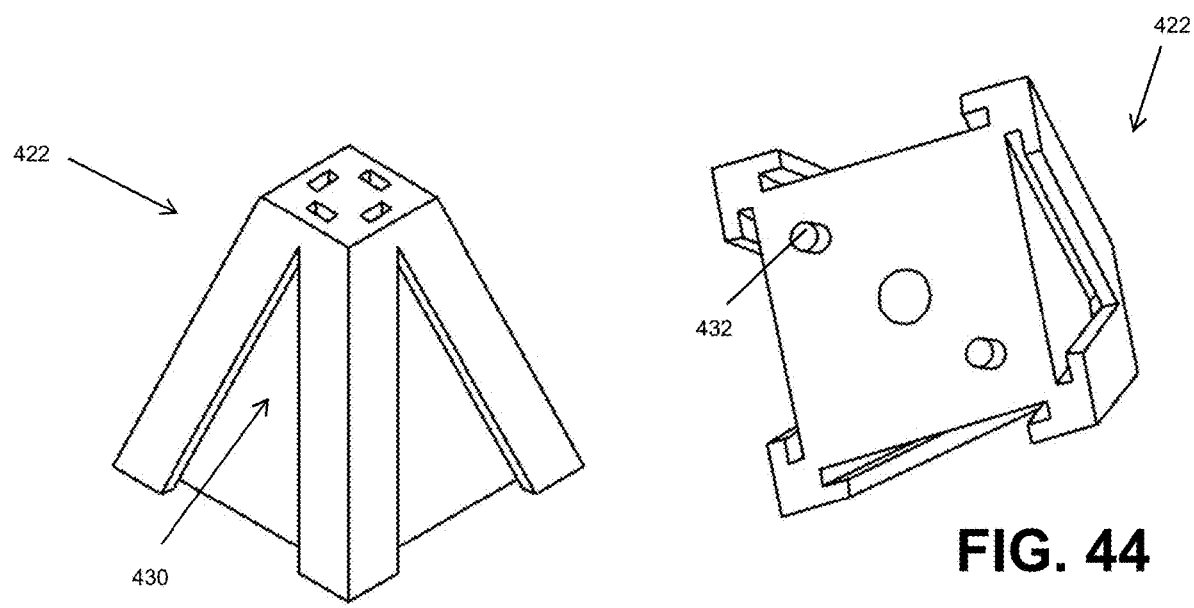
FIG. 43
FIG. 44

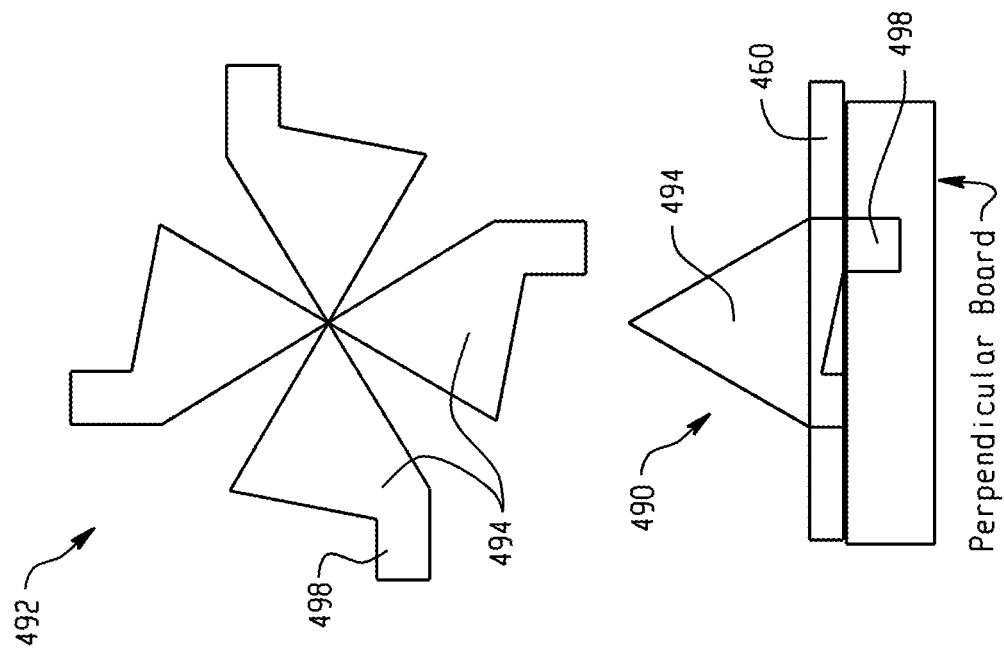
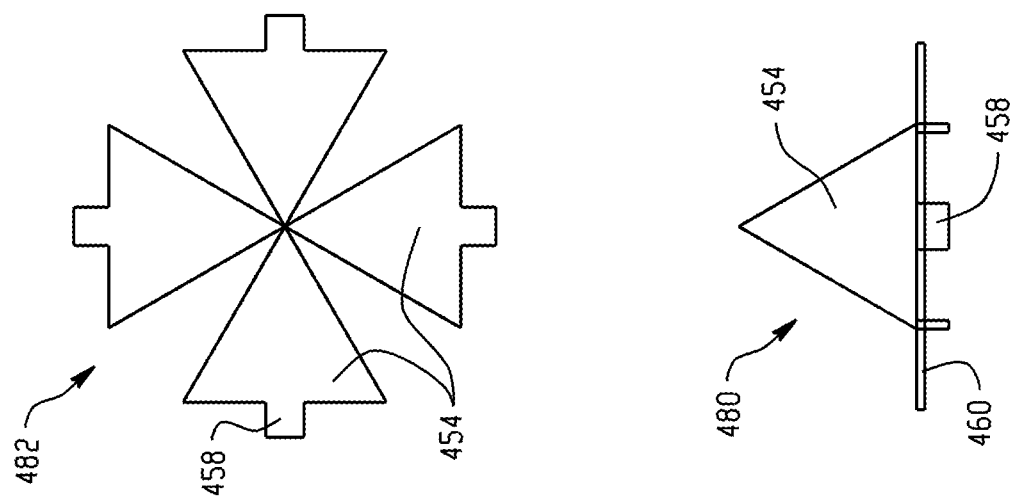
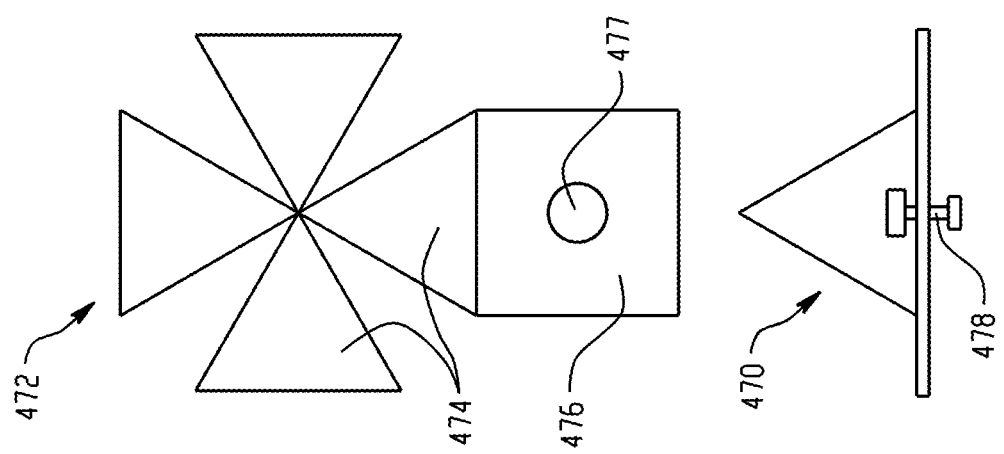
Fig. 54
Fig. 53
Fig. 52

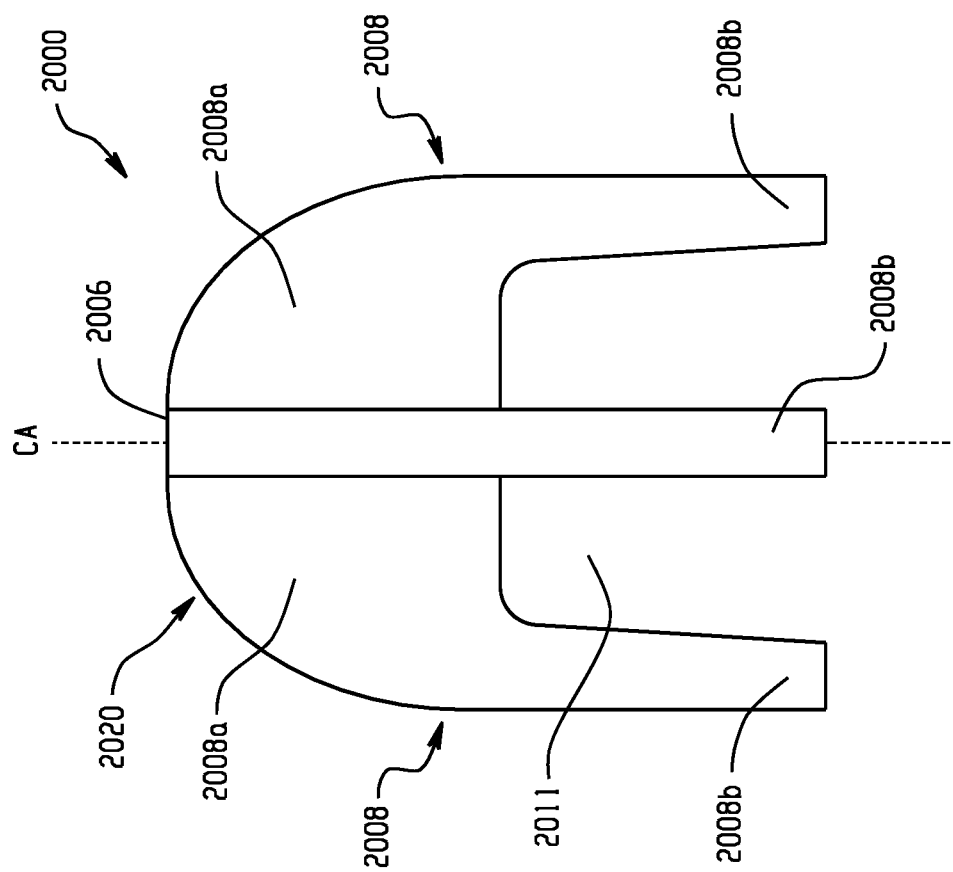

MODULAR RADIO FREQUENCY APERTURE

BACKGROUND

The following relates to the radio frequency (RF) arts, RF transmitter arts, RF receiver arts, RF transceiver arts, broadband RF transmitter, receiver, and/or transceiver arts, RF communications arts, and related arts.

Steinbrecher, U.S. Pat. No. 7,420,522 titled "Electromagnetic Radiation Interface System and Method" discloses a broadband RF aperture as follows: "An electromagnetic radiation interface is provided that is suitable for use with radio wave frequencies. A surface is provided with a plurality of metallic conical bristles. A corresponding plurality of termination sections are provided so that each bristle is terminated with a termination section. The termination section may comprise an electrical resistance for capturing substantially all the electromagnetic wave energy received by each respective bristle to thereby prevent reflections from the surface of the interface. Each termination section may also comprise an analog to digital converter for converting the energy from each bristle to a digital word. The bristles may be mounted on a ground plane having a plurality of holes therethrough. A plurality of coaxial transmission lines may extend through the ground plane for interconnecting the plurality of bristles to the plurality of termination sections."

Certain improvements are disclosed herein.

BRIEF SUMMARY

In accordance with some non-limiting illustrative embodiments disclosed herein, an air interface plane (AIP) of a radio frequency (RF) aperture includes: a circuit board having a first side and a second side opposite the first side; and a matrix of tapered elements arranged on the first side of the circuit board and secured to the circuit board, the matrix of tapered elements cooperating to at least one of receive or transmit an over-the-air RF signal. Suitably, each tapered element of the matrix includes: a central hub extending along a longitudinal axis defining an apex of the tapered element which is distal from the first side of the first circuit board; and a plurality of arms extending from the central hub at the apex of the tapered element, each of the plurality of arms including a first portion that projects the arm radially away from a longitudinal axis perpendicular to the board and passing through the apex and a second portion that projects the arm longitudinally toward the first side of the circuit board In accordance with some non-limiting illustrative embodiments disclosed herein, a radio frequency (RF) aperture includes:
a digital personality circuit board (DPB);
a transmit section including:
  a first air interface plane (AIP) having:
    a first AIP circuit board with a first side and a second side opposite the first side; and
    a first matrix of tapered elements arranged on the first side of the first AIP circuit board and secured to the first AIP circuit board, neighboring tapered elements of the first matrix defining a transmission pixel within the first matrix and the first matrix of tapered elements cooperating to selectively transmit over-the-air RF signals;
  a first conditioning circuit board electrically connected to the first AIP circuit board, the first conditioning circuit board being selectively operative to at least one of condition or amplify individual transmit signals provided to each transmission pixel of the first matrix;
  a splitting circuit board electrically connected to the first conditioning circuit board, the splitting circuit board being selectively operative to receive a modulated transmit signal from the DPB and divide the received modulated transmit signal into individual transmit signals for each transmission pixel of the first matrix; and
  a power supply circuit board electrically connected at least to the first conditioning circuit board and the splitting circuit board, the power supply circuit board selectively providing electrical power to operate at least the first conditioning circuit board and the splitting circuit board; and
a receive section including:
  a second AIP having:
    a second AIP circuit board with a first side and a second side opposite the first side; and
    a second matrix of tapered elements arranged on the first side of the second AIP circuit board and secured to the second AIP circuit board, neighboring tapered elements of the second matrix defining a reception pixel within the second matrix and the second matrix of tapered elements cooperating to selectively receive over-the-air RF signals;
  a second conditioning circuit board electrically connected to the second AIP circuit board, the second conditioning circuit board being selectively operative to at least one of condition or amplify individual receive signals received by each reception pixel of the second matrix; and
  a combining circuit board electrically connected to the second conditioning circuit board, the combining circuit board being selectively operative to combine individual receive signals from each reception pixel of the second matrix into a combined receive signal and provide the combined receive signal to the DPB;
wherein the first and second AIP circuit boards, the first and second conditioning circuit boards, the splitting and combining circuit boards, the power supply circuit board and the DPB are modularly interconnected such that a given one of the circuit boards may be selectively removed and replaced without removing and replacing another one of the circuit boards.

In accordance with some non-limiting illustrative embodiments disclosed herein, an RF aperture includes a digital personality circuit board (DPB) and an air interface plane (AIP) having: an AIP circuit board with a first side and a second side opposite the first side; a matrix of tapered elements arranged on the first side of the AIP circuit board and secured to the AIP circuit board, neighboring tapered elements of the matrix defining a pixel within the matrix and the matrix of tapered elements cooperating to selectively at least one of transmit or receive over-the-air RF signals; a conditioning circuit board electrically connected to the AIP circuit board, the conditioning circuit board being selectively operative to at least one of condition or amplify individual signals for each pixel of the matrix; a splitting/combining circuit board electrically connected to the conditioning circuit board, the splitting/combining circuit board being selectively operative to at least one of (a) receive a modulated transmit signal from the DPB and divide the received modulated transmit signal into individual transmit signals for each pixel of the first matrix, or (b) combine individual receive signals from each pixel of the matrix into a combined receive signal and provide the combined receive signal to the DPB; and a power supply circuit board electrically connected to the conditioning circuit board and the splitting/combining circuit board, the power supply circuit board selectively providing electrical power to operate the conditioning circuit board and the splitting/combining circuit board. The aperture further includes: a housing defining an interior cavity containing the DPB, AIP, conditioning circuit board, splitting combining circuit board and power supply circuit board, such that the AIP circuit board, the conditioning circuit board, the splitting/combining circuit board, the power supply circuit board and the DPB are arranged in a stack one over another; and a cooling assembly. Suitably, the cooling assembly includes: a fan operative to draw air out of the housing through an exhaust vent in a first wall of the housing; a first heat sink within the stack positioned between the conditioning circuit board and the power supply circuit board; a second heat sink within the stack position between the power supply circuit board and the splitting/combining circuit board.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

FIGS. 11 and 12 show embodiments in which the electrically conductive tapered projections of the RF aperture are hollow and in which one or more electronic components are disposed inside the hollow electrically conductive tapered projections.

FIGS. 18-24 show side sectional view of RF aperture embodiments employing dielectric filling material disposed between neighboring electrically conductive tapered projections to tune the RF capture performance for transmit and/or receive operations.

FIGS. 29-36 illustrate embodiments of electrically conductive tapered projections which are solid projections.

FIGS. 42-46 illustrate an embodiment of an electrically conductive tapered projection which includes a dielectric structure and tapered plates.

FIGS. 50-54 illustrate embodiments of electrically conductive tapered projections constructed by folding a cut-out of sheet metal.

FIG. 97 is a diagrammatic illustration showing a side view of one alternative embodiment of a tapered element in accordance with some embodiments of the aperture shown in FIG. 82.

DETAILED DESCRIPTION

Figure 1:
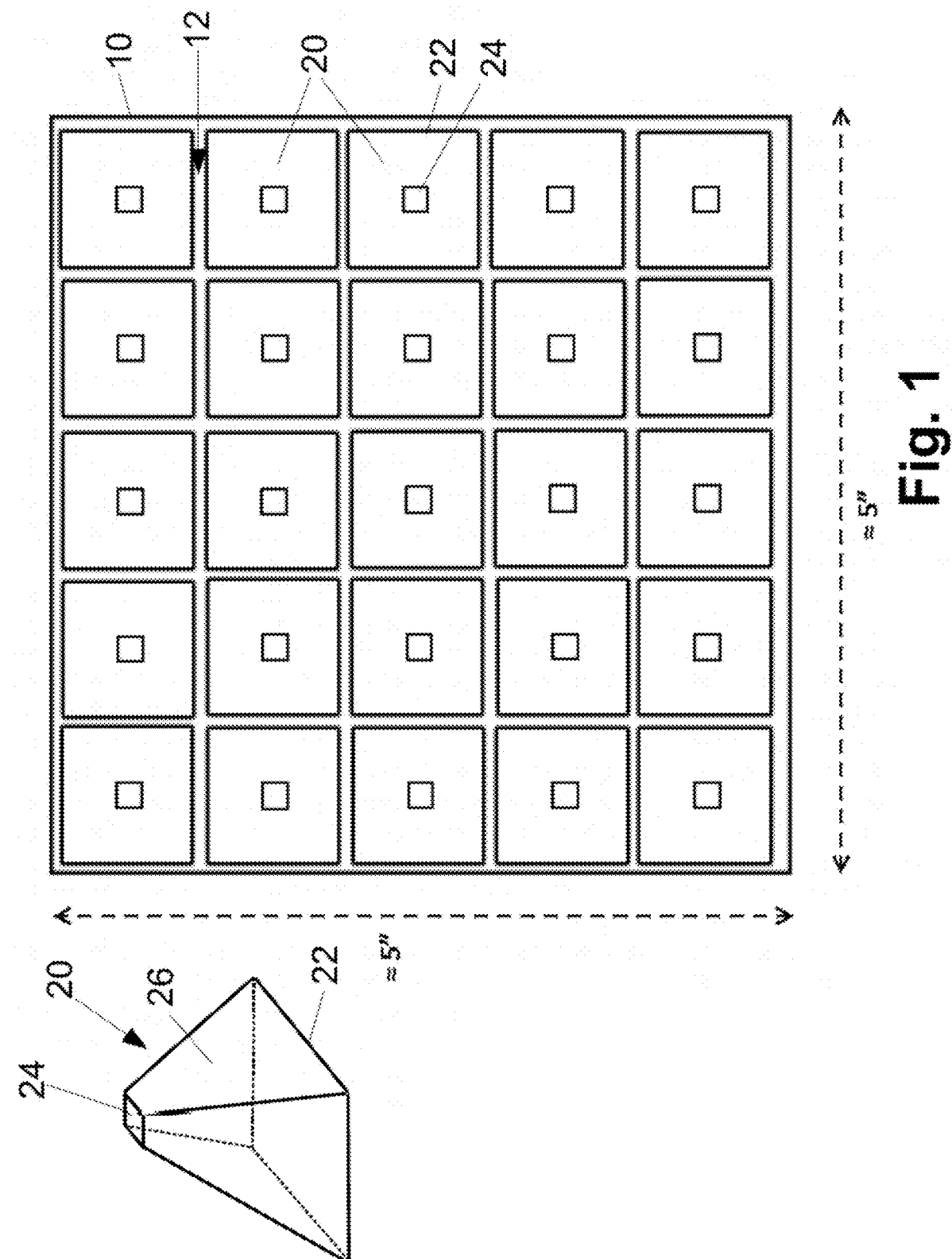
FIGS. 1 and 2 diagrammatically illustrate front and side-sectional views, respectively, of an illustrative RF aperture implemented as a differential segmented aperture (DSA).
Figure 2:
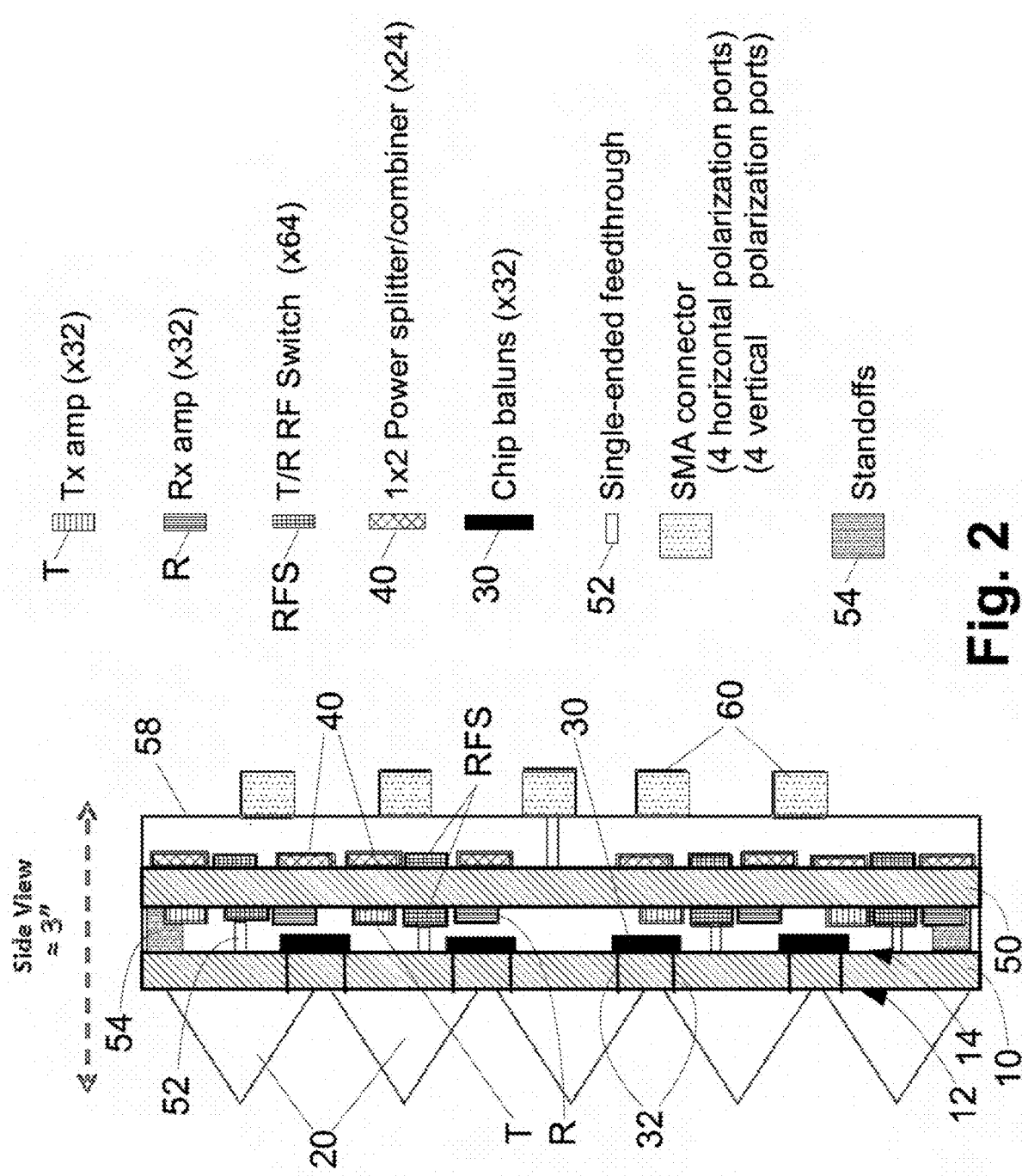

With reference to FIGS. 1 and 2, front and side-sectional views are shown, respectively, of an illustrative radio frequency (RF) aperture, including an interface printed circuit board (i-PCB) 10 having a front side 12 and a back side 14, and an array of electrically conductive tapered projections 20 having bases 22 disposed on the front side 12 of the i-PCB 10 and extending away from the front side 12 of the i-PCB 10. The illustrative i-PCB 10 is indicated in FIG. 1 as having dimensions 5-inch by 5-inch—this is merely a non-limiting illustrative example of a compact RF aperture. FIG. 1 shows the front view of the RF aperture, with an inset in the upper left showing a perspective view of one electrically conductive tapered projection 20. This illustrative embodiment of the electrically conductive tapered projection 20 has a square cross-section with a larger square base 22 and an apex which does not extend to a perfect tip but rather terminates at a flattened apex 24 (in other words, the electrically conductive tapered projection 20 of the inset has a frustoconical shape). This is merely an illustrative example, and more generally the electrically conductive tapered projections 20 can have any type of cross-section (e.g. square as in the inset, or circular, or hexagonal, or octagonal, or so forth). The apex 24 can be flat, as in the example of the inset, or can come to a sharp point, or can be rounded or have some other apex geometry. The rate of tapering as a function of height (i.e. distance "above" the base 22, with the apex 24 being at the maximum "height") can be constant, as in the example of the inset, or the rate of tapering can be variable with height, e.g. the rate of tapering can increase with increasing height so as to form a projection with a rounded peak, or can be decreasing with increasing height so as to form a projection with a more pointed tip. Similarly, as best seen in FIG. 1, the illustrative array of the electrically conductive tapered projections 20 is a rectilinear array with regular rows and orthogonal regular columns; however, the array may have other symmetry, e.g. a hexagonal symmetry, octagonal symmetry, or so forth. In the illustrative example of the inset, the square base 22 and square apex 24 lead to the electrically conductive tapered projection 20 having four flat slanted sidewalls 26; however, other sidewall shapes are contemplated, e.g. if the base and apex are circular (or the base is circular and the apex comes to a point) then the sidewall will be a slanted or tapering cylinder; for a hexagonal base and a hexagonal or pointed apex there will be six slanted sidewalls, and so forth.

Figure 3:
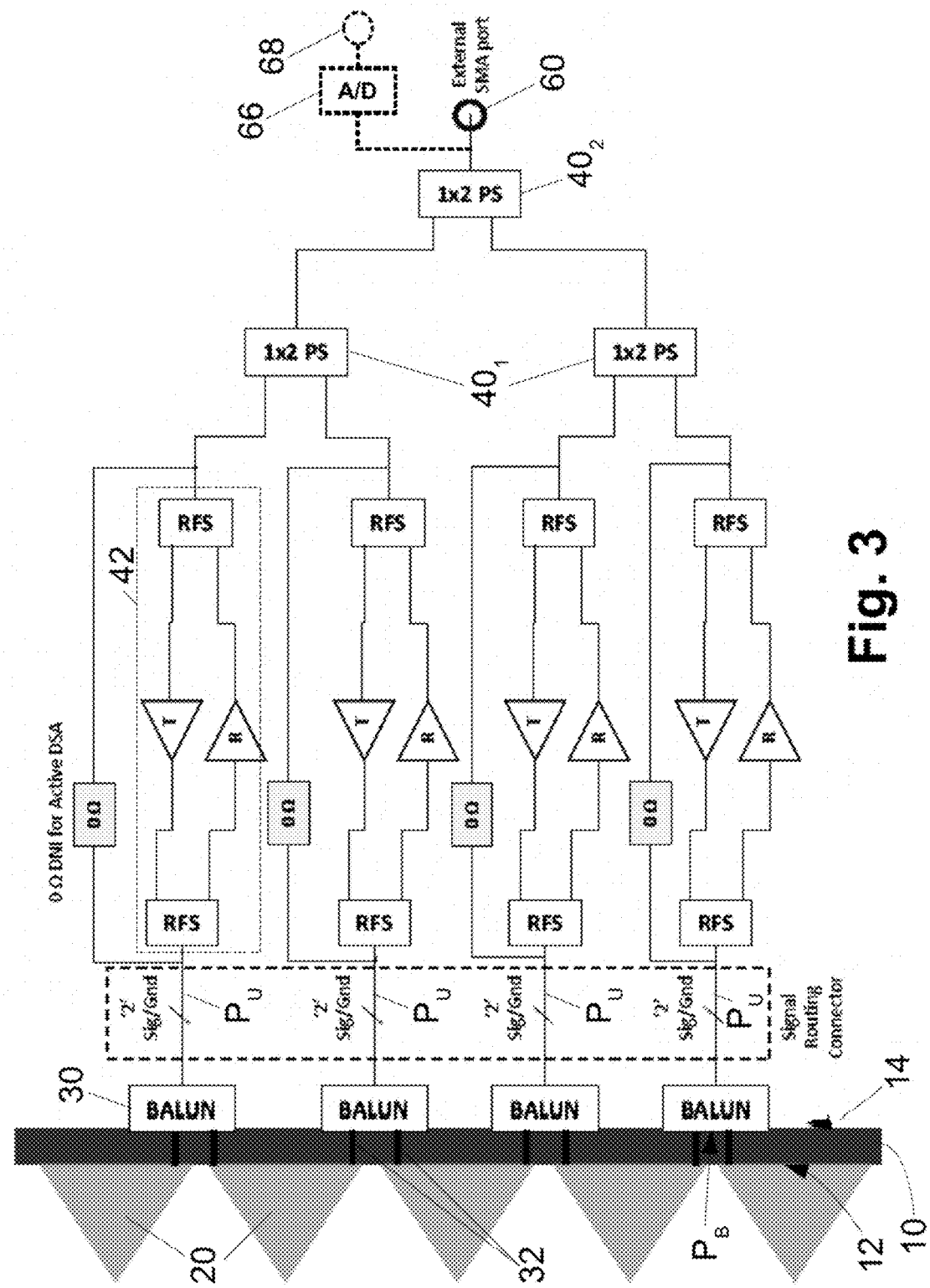
FIG. 3 diagrammatically shows a block diagram of a single QUAD subassembly of the DSA of FIGS. 1-4.

With continuing reference to FIGS. 1 and 2 and with further reference to FIG. 3, the RF aperture further comprises RF circuitry, which in the illustrative embodiment includes chip baluns 30 mounted on the back side 14 of the i-PCB 10. Each chip balun 30 has a balanced port $P_B$ (see FIGS. 3 and 6) electrically connected with two neighboring electrically conductive tapered projections of the array of electrically conductive tapered projections via electrical feedthroughs 32 passing through the i-PCB 10. Each chip balun 30 further has an unbalanced port $P_U$ (see FIGS. 3 and 6) connecting with the remainder of the RF circuitry. The illustrative RF circuitry further includes RF power splitter/combiners 40 for combining the outputs from the unbalanced ports $P_U$ of the chip baluns 30. As seen in FIG. 3, the illustrative electrical configuration of the RF circuitry employs first level 1×2 RF power splitter/combiners $40_1$ that combine pairs of unbalanced ports $P_U$, and second level 1×2 RF power splitter/combiners $40_2$ that combine outputs of pairs of the first level RF power splitter/combiners $40_1$. This is merely an illustrative approach, and other configurations are contemplated, such as using 1×3 (which combine three lines), 1×4 (combining four lines), or higher-combining RF power splitter/combiners, or various combinations thereof. The illustrative RF circuitry further includes a signal conditioning circuit 42 interposed between each unbalanced port $P_U$ of the chip baluns 30 and the first level 1×2 power splitter $40_1$. The signal conditioning circuit 42 connected with each unbalanced port includes: an RF transmit amplifier T; an RF receive amplifier R; and RF switching circuitry including switches RFS configured to switch between a transmit mode operatively connecting the RF transmit amplifier T with the unbalanced port and a receive mode operatively connecting the RF receive amplifier R with the unbalanced port.

Figure 4:
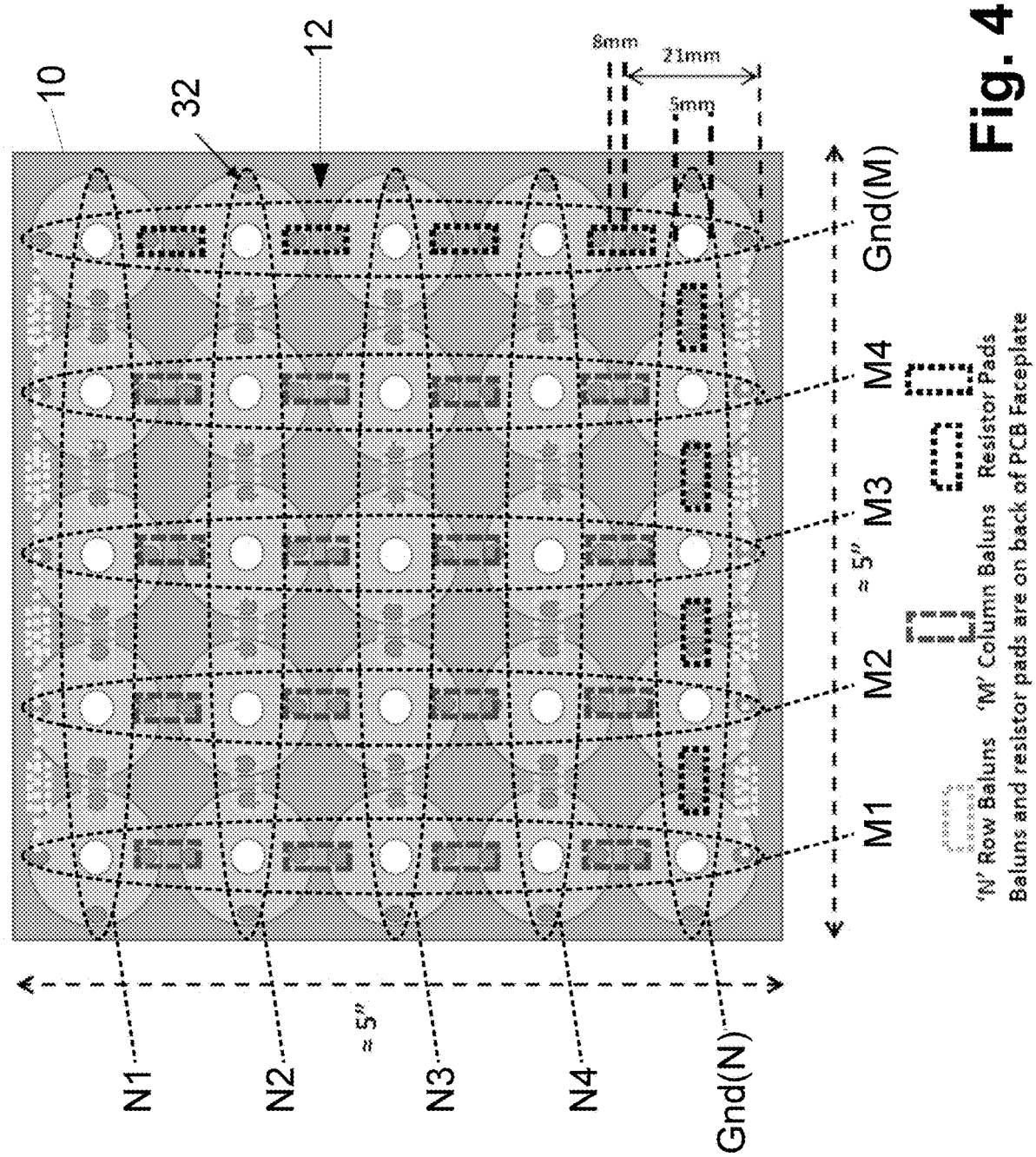
FIG. 4 diagrammatically illustrates a front view of the interface printed circuit board (i-PCB) of the DSA of FIGS. 1-3 including vias and mounting holes and diagrammatically indicated locations of baluns and resistor pads.
Figure 5:
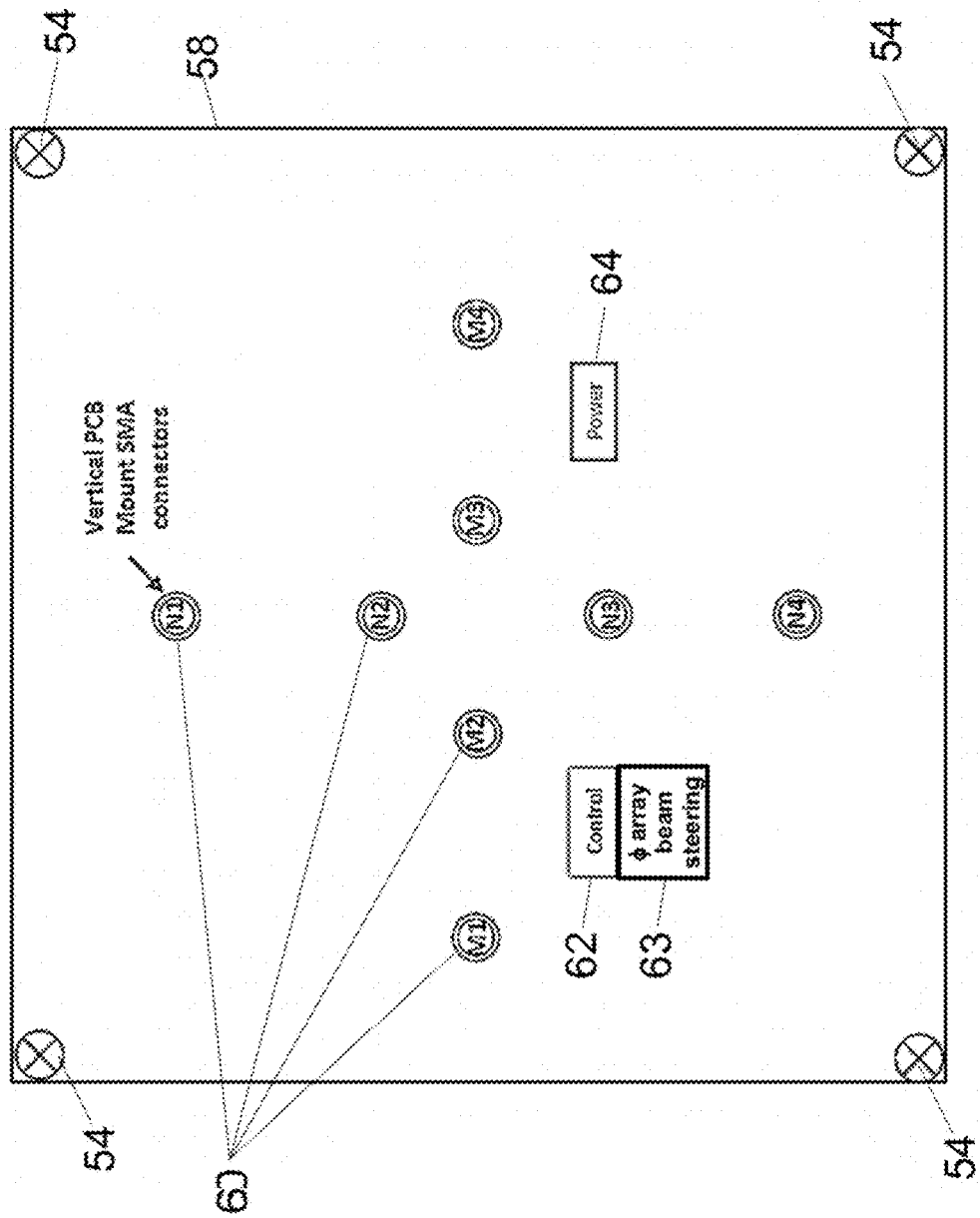
FIG. 5 diagrammatically illustrates a rear view of the enclosure of the DSA of FIGS. 1-4 including diagrammatically indicated RF connections, control, and power connectors.

With continuing reference to FIGS. 1-3 and with further reference to FIGS. 4 and 5, a compact design is achieved (e.g., depth of 3-inches in the non-limiting illustrative example of FIG. 3) in part by employing one or more printed circuit boards (PCBs) including at least the i-PCB 10. In the illustrative example shown in FIG. 3, the chip baluns 30 are mounted on the back side 14 of the i-PCB 10. Optionally, the other electronic components may also be mounted on the back side of the i-PCB 10 on whose front side 12 the array of electrically conductive tapered projections 20 are disposed. However, there may be insufficient real estate on the i-PCB 10 to mount all the electronics of the RF circuitry. In the illustrative embodiment, this is handled by providing a second printed circuit board 50 which is disposed parallel with the i-PCB 10 and faces the back side 14 of the i-PCB 10. Said another way, the second printed circuit board 50 is disposed on the (back) side 14 of the i-PCB 10 opposite from the (front) side 12 of the i-PCB 10 on which the electrically conductive tapered projections 20 are disposed. The RF circuitry comprises electronic components mounted on the second printed circuit board 50, which may also be referred to herein as a signal conditioning PCB or SC-PCB 50, and additionally or alternatively comprises electronic components mounted on the i-PCB 10 (typically on the back side 14 of the i-PCB, although it is also contemplated (not shown) to mount components of the RF circuitry on the front side of the i-PCB in field space between the electrically conductive tapered projections 20. If the SC-PCB 50 is provided, as shown in FIG. 2 it is suitably secured in parallel with the i-PCB 10 by standoffs 54, and single-ended feedthroughs 52 are provided to electrically interconnect the i-PCB 10 and the SC-PCB 50 (see FIG. 3). If the RF circuitry is unable to fit onto the real estate of two PCBs 10, 50, a third (and fourth, and more, as needed) PCB may be added (not shown) to accommodate the components of the RF circuitry.

FIG. 4 shows a front view of the i-PCB 10 including vias and mounting holes and diagrammatically indicated locations of baluns 30 and resistor pads as indicated in the legend shown in FIG. 4. (The resistors are used to terminate the unused side of the pyramids to help lower radar cross section).

With reference to FIG. 2 and with further reference to FIG. 5, the illustrative RF aperture has an enclosure 58 which in the illustrative example is secured at its periphery with the periphery of the i-PCB 10 so as to enclose the RF circuitry. This is merely one illustrative arrangement, and other designs are contemplated, e.g. both PCBs 10, 50 may be disposed inside an enclosure (although such an enclosure should not comprise RF shielding extending forward so as to occlude the area of the RF aperture). FIG. 5 diagrammatically illustrates a rear view of the enclosure 58 of the RF aperture, showing diagrammatically indicated RF connectors (or ports) 60 (also shown or indicated in FIGS. 2 and 3), control electronics 62 (for example, illustrative phased array beam steering electronics 63 shown by way of non-limiting illustration; these electronics 62, 63 may be mounted on the exterior of the enclosure 58 and/or may be disposed inside the enclosure 58 providing beneficial RF shielding), and a power connector 64 for providing power for operating the active components of the RF circuitry (e.g. operating power for the active RF transmit amplifiers T and the active RF receive amplifiers R, and the switches RFS). The particular arrangement of the various components 60, 62, 63, 64 over the area of the back side of the enclosure can vary widely from that shown in FIG. 5, and moreover, these components may be located elsewhere, e.g. the RF connectors 60 could alternatively be located at an edge of the RF aperture or so forth. It will also be appreciated that the RF aperture could be constructed integrally with some other component or system—for example, if the RF aperture is used as the RF transmit and/or receive element of a mobile ground station, a maritime radio, an unmanned aerial vehicle (UAV), or so forth, in which case the enclosure 58 might be replaced by having the RF aperture built into a housing of the mobile ground station, maritime radio, UAV fuselage, or so forth. In such cases, the RF connectors 60 might also be replaced by hard-wired connections to the mobile ground station, maritime radio, UAV electronics, or so forth.

With particular reference to FIG. 3, an illustrative electrical configuration for the illustrative RF circuitry is shown. In this non-limiting illustrative example, the array of electrically conductive tapered projections 20 is assumed to be a 5×5 array of electrically conductive tapered projections 20, as shown in FIGS. 1 and 4. The balanced ports $P_B$ of the chip baluns 30 connect adjacent (i.e. neighboring) pairs of electrically conductive tapered projections 20 of the array so as to receive the differential RF signal between the two adjacent electrically conductive tapered projections 20 (in receive mode; or, alternatively, to apply a differential RF signal between the two adjacent electrically conductive tapered projections 20 in transmit mode). As detailed in Steinbrecher, U.S. Pat. No. 7,420,522 which is incorporated herein by reference in its entirety, the tapering of the electrically conductive tapered projections 20 presents a separation between the two electrically conductive tapered projections 20 that varies with the "height", i.e. with distance "above" the base 22 of the electrically conductive tapered projections 20. This provides broadband RF capture since a range of RF wavelengths can be captured corresponding to the range of separations between the adjacent electrically conductive tapered projections 20 introduced by the tapering. The RF aperture is thus a differential segmented aperture (DSA), and has differential RF receive (or RF transmit) elements corresponding to the adjacent pairs of electrically conductive tapered projections 20. These differential RF receive (or transmit) elements are referred to herein as aperture pixels. For the illustrative rectilinear 5×5 array of adjacent electrically conductive tapered projections 20, this means there are 4 aperture pixels along each row (or column) of 5 electrically conductive tapered projections 20. More generally, for a rectilinear array of projections having a row (or column) of N electrically conductive tapered projections 20, there will be a corresponding N−1 pixels along the row (or column). FIG. 3 shows a QUAD subassembly, which is an interconnection of a row (or column) of four pixels. As there are four rows, and four columns, this leads to 4×4 or 16 such QUAD subassemblies. The resistor pads are used as terminations for the unused edges of the perimeter pyramids to prevent unnecessary reflections. Without the resistors mounted via the resistor pads, those surfaces would be left floating and could re-radiate incident RF energy, causing an enhanced radar cross section.

In the illustrative embodiment shown in FIG. 3, the second level 1×2 RF power splitter/combiner 40₂ of each QUAD subassembly connects with an RF connector 60 at the backside of the enclosure 58. Hence, as seen in FIG. 5, there are eight RF connectors for the eight QUAD subassemblies, denoted in FIGS. 4 and 5 as the row QUAD subassemblies N1, N2, N3, N4 and the column QUAD subassemblies M1, M2, M3, M4. The Gnd(N) row and the Gnd(M) column are circuit grounds to allow a common path for current flow from the captured RF energy along the perimeter sides of the pyramids. The use of the QUAD subassemblies permits a high level of flexibility in RF coupling to the RF aperture. For example, the illustrative phased array beam steering electronics 63 may be implemented by introducing appropriate phase shifts $\phi_N$, N=1, . . . , 4 for the row QUAD subassemblies N1, N2, N3, N4 and phase shifts $\phi_M$, M=1, . . . , 4 for the column QUAD subassemblies M1, M2, M3, M4 to steer the transmitted RF signal beam in a desired direction, or to orient the RF aperture to receive an RF signal beam from a desired direction (transmit or receive being controlled by the settings of the switches RFS of the signal conditioning circuits 42). Other applications that may be implemented by the RF aperture include: simultaneous "Transmit/Receive, dual circular polarization modes", and "Scalability" by physically locating multiple DSAs in close physical proximity giving the combined effect of increased aperture size. In an alternative embodiment diagrammatically shown in FIG. 3, the RF connectors 60 may be replaced by analog-to-digital (A/D) converters 66 and digital connectors 68 via which digitized signals are output. More generally, the A/D conversion may be inserted anywhere in the RF chain, for example A/D converters could be placed at the outputs of the signal conditioning circuits 42 and the analog first and second level RF power splitter/combiners 40₁, 40₂ then replaced by digital signal processing (DSP) circuitry.

The described electronics employing PCBs 10, 50, chip baluns 30, and active signal conditioning components (e.g. active transmit amplifiers T and receive amplifiers R) advantageously enables the RF aperture to be made compact and lightweight. As described next, embodiments of the electrically conductive tapered projections 20 further facilitate providing a compact and lightweight broadband RF aperture.

Figure 6:
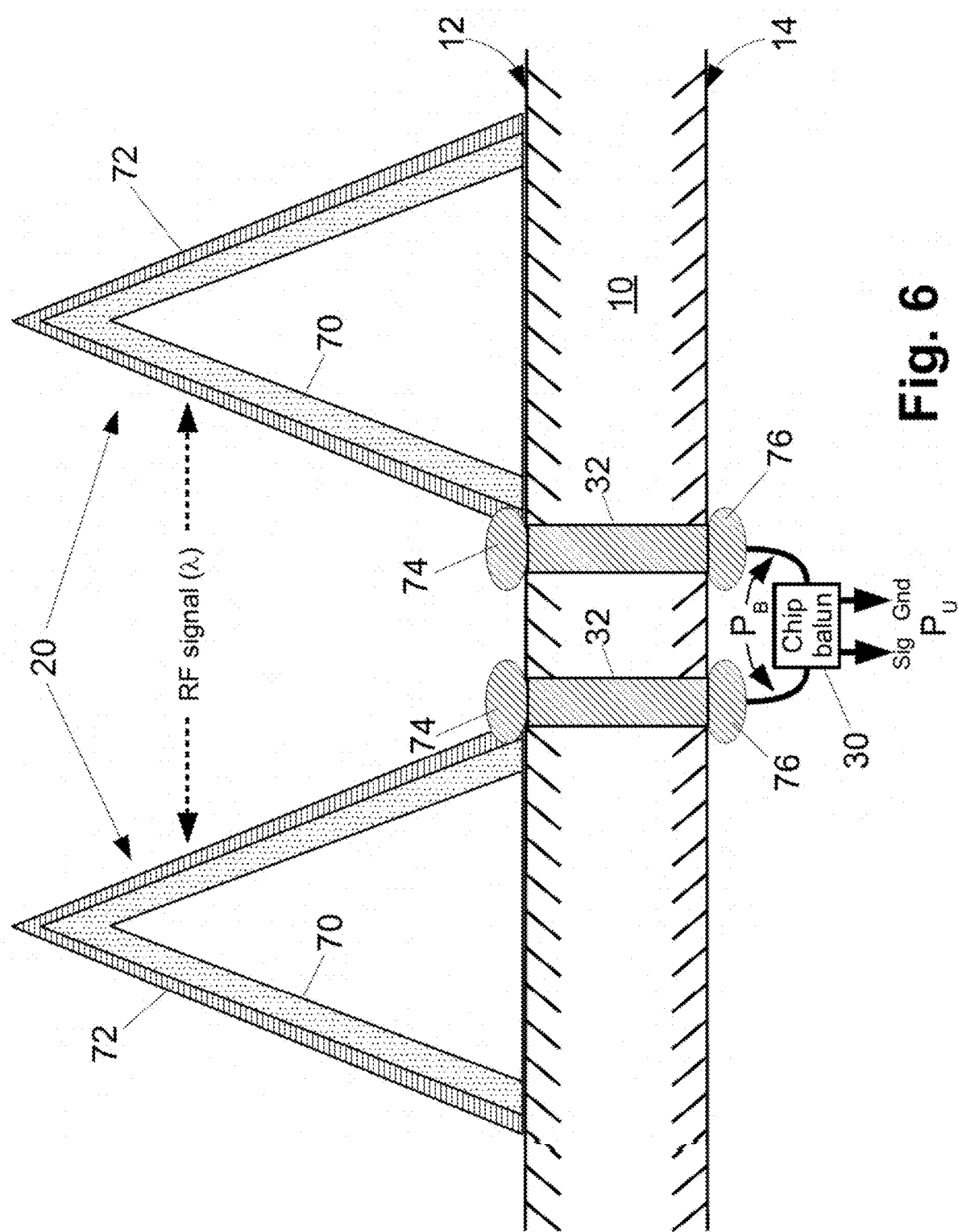
FIG. 6 diagrammatically illustrates a side sectional view of an embodiment of the electrically conductive tapered projections, along with a diagrammatic representation of the connection of the balanced port of a chip balun between two adjacent electrically conductive tapered projections.

FIG. 6 shows a side sectional view of one illustrative embodiment in which each electrically conductive tapered projection 20 is fabricated as a dielectric tapered projection 70 with an electrically conductive layer 72 disposed on a surface of the dielectric tapered projection 70. The dielectric tapered projections may, for example, be made of an electrically insulating plastic or ceramic material, such as acrylonitrile butadiene styrene (ABS), polycarbonate, or so forth, and may be manufactured by injection molding, three-dimensional (3D) printing, or other suitable techniques. The electrically conductive layer 72 may be any suitable electrically conductive material such as copper, a copper alloy, silver, a silver alloy, gold, a gold alloy, aluminum, an aluminum alloy, or so forth, or may include a layered stack of different electrically conductive materials, and may be coated onto the dielectric tapered projection 70 by vacuum evaporation, RF sputtering, or any other vacuum deposition technique. FIG. 6 shows an example in which solder points 74 are used to electrically connect the electrically conductive layer 72 of each dielectric tapered projection 20 with its corresponding electrical feedthrough 32 passing through the i-PCB 10. FIG. 6 also shows the illustrative connection of the balanced port $P_B$ of one chip balun 30 between two adjacent electrically conductive tapered projections 20 via solder points 76.

Figure 7:
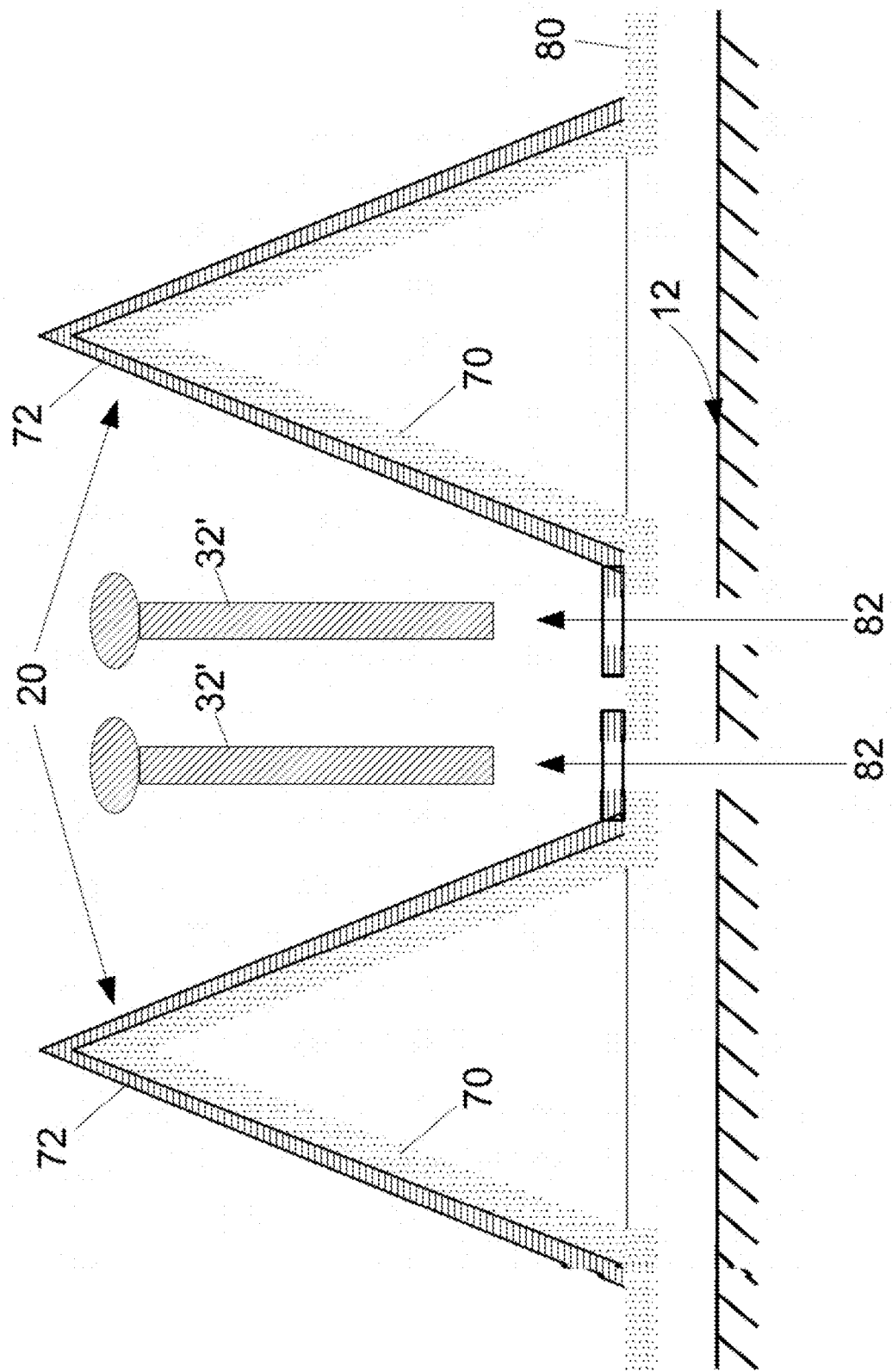
FIGS. 7-10 diagrammatically illustrate additional embodiments of the electrically conductive tapered projections.
Figure 8:
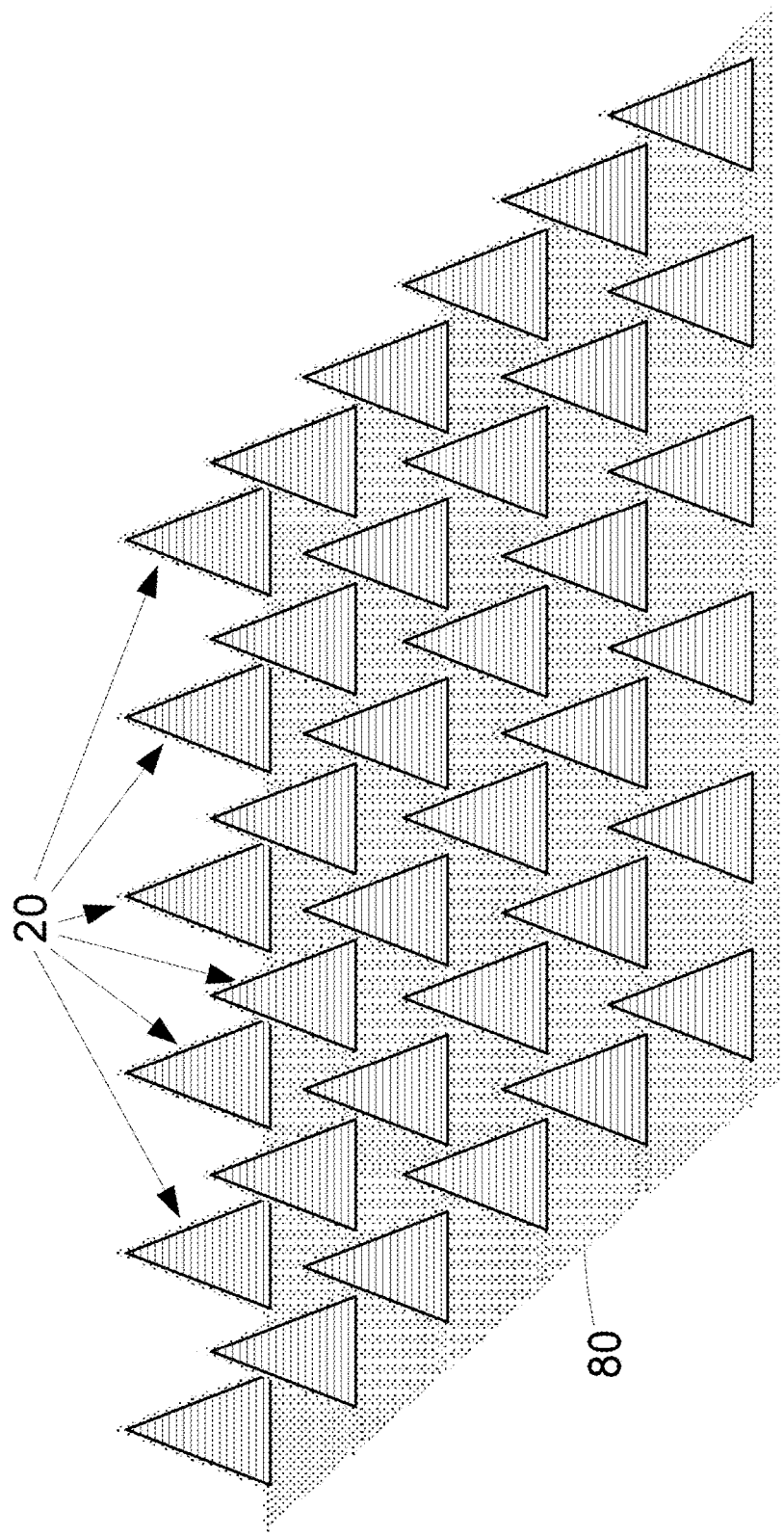

FIGS. 7 and 8 show an exploded side-sectional view and a perspective view, respectively, of an embodiment in which the dielectric tapered projections 70 are integrally included in a dielectric plate 80. The electrically conductive layer 72 coats each dielectric tapered projection 70 but has isolation gaps 82 that provide galvanic isolation between the neighboring dielectric tapered projections 20. The isolation gaps 82 can be formed after coating the electrically conductive layer 72 by, after the coating, etching the coating away from the plate 80 between the electrically conductive tapered projections 20 to galvanically isolate the electrically conductive tapered projections from one another. Alternatively, the isolation gaps 82 can be defined before the coating by, before the coating, depositing a mask material (not shown) on the plate 80 between the electrically conductive tapered projections 20 so that the coating does not coat the plate in the isolation gaps 82 between the electrically conductive tapered projections whereby the electrically conductive tapered projections are galvanically isolated from one another. As seen in the perspective view of FIG. 8, the result is that the dielectric plate 80 covers (and therefore occludes) the surface of the i-PCB 10, with the electrically conductive tapered projections 20 extending away from the dielectric plate 80.

With particular reference to FIG. 7, in one approach for the electrical interconnection, through-holes 82 pass through the illustrative plate 80 and the underlying i-PCB 10, and rivets, screws, or other electrically conductive fasteners 32' pass through the through-holes 82 (note that FIG. 7 is an exploded view) and when thusly installed form the electrical feedthroughs 32' passing through the i-PCB 10. (Note, the perspective view of FIG. 8 is simplified, and does not depict the fasteners 32'). The use of the dielectric plate 80 with integral dielectric tapered projections 70 and the combined fastener/feedthroughs 32' advantageously allows the electrically conductive tapered projections 20 to be installed with precise positioning and without soldering.

In the embodiments of FIGS. 6-8, the electrically conductive coating 72 is disposed on the outer surfaces of the dielectric tapered projections 70. In this case, the dielectric tapered projections 70 may be either hollow or solid.

Figure 9:
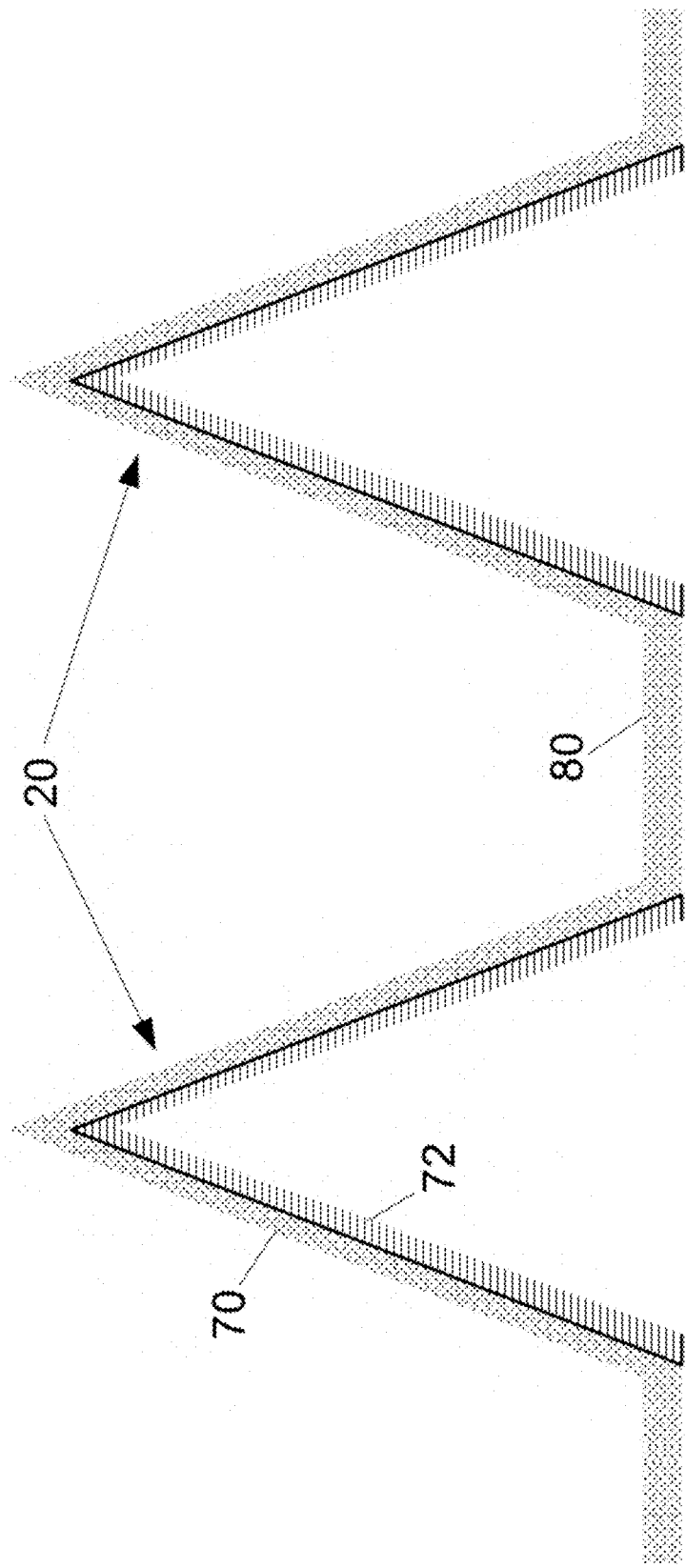
Figure 10:
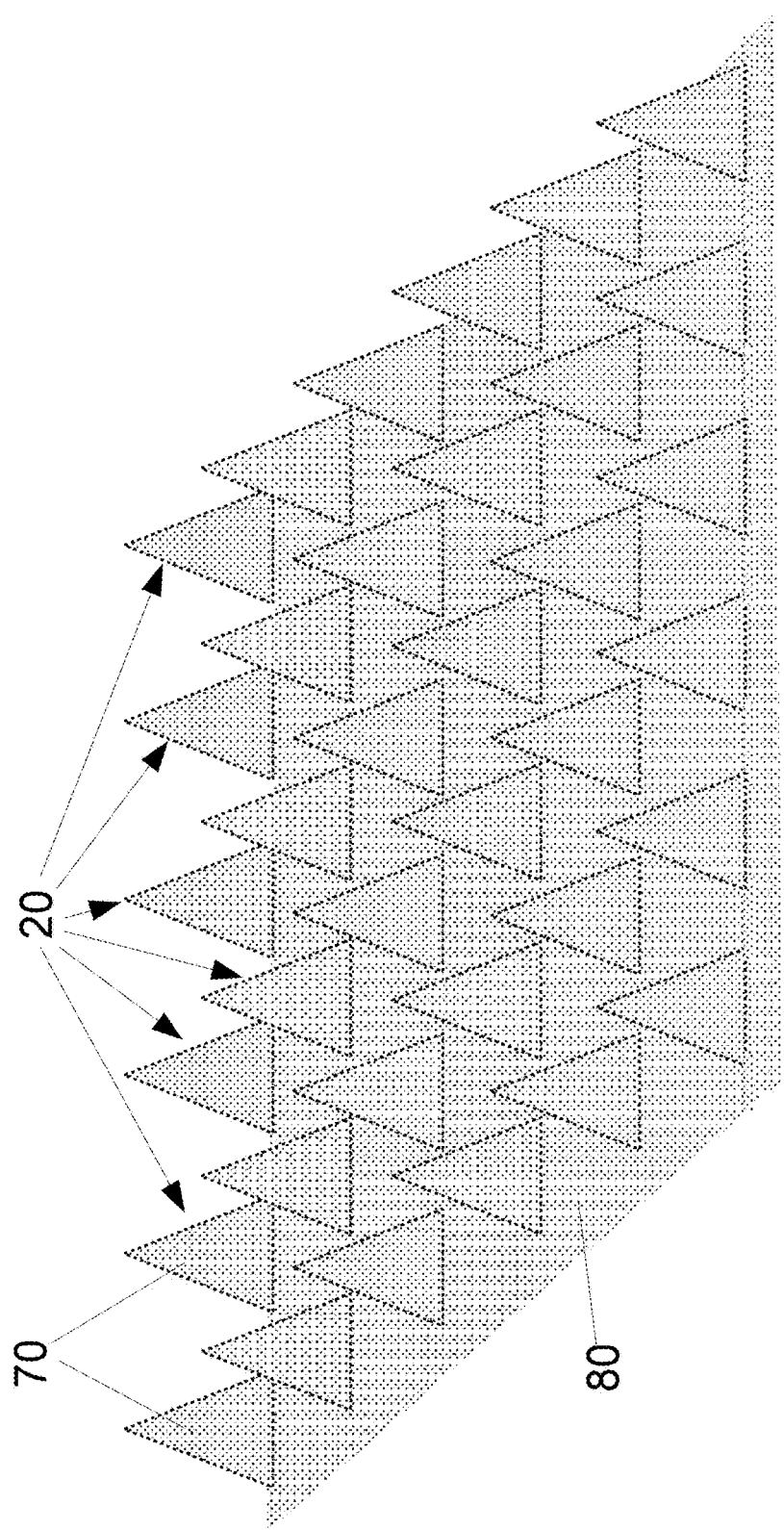

With reference to FIGS. 9 and 10, as the dielectric material is substantially transparent to the RF radiation, the electrically conductive coating 72 may instead be coated on inner surfaces of the (hollow) dielectric tapered projections 70. FIG. 9 shows a side sectional view of such an embodiment, while FIG. 10 shows a perspective view. The embodiment of FIGS. 9 and 10 again employs a dielectric plate 80 including the dielectric tapered projections 70. As seen in FIG. 10, by coating the electrically conductive coatings 72 on the inner surfaces of the hollow dielectric tapered projections 70, this results in the electrically conductive coating 72 being protected from contact from the outside by the dielectric plate 80 including the integral dielectric tapered projections 70. This can be useful in environments in which weathering may be a problem.

It is to be appreciated that the various disclosed aspects are illustrative examples, and that the disclosed features may be variously combined or omitted in specific embodiments. For example, one of the illustrative examples of the electrically conductive tapered projections 20 or a variant thereof may be employed without the QUAD subassembly circuitry configuration of FIGS. 2-5. Conversely the QUAD subassembly circuitry configuration of FIGS. 2-5 or a variant thereof may be employed without the dielectric/coating configuration for the electrically conductive tapered projections 20. Likewise, the chip baluns 30 may or may not be used in a specific embodiment; and/or so forth.

With reference to FIGS. 11 and 12, further embodiments of the multiple sensor elements/pyramids 20 of the DSA 102 (e.g., scalable, modular board) are described. The sensor elements/pyramids can be formed on, for example, the front side 12 of the circuit board 10 as an array and function as a radiation interface. The senor elements/pyramids 20 of FIGS. 11 and 12 each include multiple electrically conductive plates 90 (FIG. 12) that together form the pyramid and/or the sensor elements/pyramids can each be formed of a single plate 91 (FIG. 11) that, for example, wraps in a conical fashion. In some embodiments, each sensor element/pyramid 20 is hollow, that is, includes a void 92. The void 92 may be formed by an inner portion of either the multiple plates 90 and/or single conical plate 91. This occurs, for example, when the sensor element/pyramid 20 is supported from an outside portion, creating the void 92 in the center. In one embodiment, the multiple plates 90 of the sensor element/pyramid can come close to each other, but not touch. In other words, the conductive plates of the sensor element/pyramid can form a gap 94 (FIG. 12). Similarly, the single conical plate 91 can have an upper opening or gap 95. The gap 94, 95 can exist between the plates and/or between the plates and a support of fixture that contains or holds the plates of the sensor elements/pyramids of the DSA. In some embodiments, the sensor elements/pyramids 20 can be formed of a solid material. The surface of the plate(s) 90, 91 that form the sensor element/pyramid can be used (e.g., the skin depth) for conductivity. In other words, the surface of the sensor elements/pyramids 20 can be used to transfer current from, for example, a wavelength or RF signal, causing the resistance of the sensor elements/pyramids to increase resultant from the current riding the surface of the sensor elements/pyramids (i.e., attenuation). The plate(s) 90, 91 can be formed of any highly electrically conductive material. In some embodiments, the plate(s) 90, 91 of the sensor elements/pyramids may be formed of something other than an electrically conductive material, e.g. the electrically conductive material can be, for example, printed or wrapped onto dielectric plates as shown in FIGS. 6-10. For example, conductive material can be spray-coated onto the plates that form the sensor elements/pyramids. The thickness of the coating can be varied to achieve desired skin depths. The embodiments of FIGS. 11 and 12 further include a conductor or electronic component 96 on the front side 12 of the circuit board 10. The embodiment of FIG. 12 further includes a bend 97 defined at the intersection of the lower end of the plates 90 and the conductor or electronic component 96.

With continuing reference to FIGS. 11 and 12, in some embodiments it is contemplated to leverage the voids 92 defined by the hollow electrically conductive tapered projections 20 to accommodate one or more electronic components 100 disposed on the front side 12 of the printed circuit board 10. Electrical vias, i.e. feedthroughs 102 passing through the i-PCB 10 provide electrical communication between the front-side electronics 100 and electronics/electrical circuitry disposed on the backside of the i-PCB 10 and/or the single-ended feedthroughs 52 electrically interconnecting the i-PCB 10 and the SC-PCB 50 (see FIG. 3). The embodiment of FIG. 12 further includes an optional recess or hole 104 in the front surface 12 of the i-PCB 10 that receives the electronic component(s) 100. Other electronic component mounting arrangements are also/alternatively contemplated, e.g. sockets for integrated circuits (ICs) or so forth. Advantageously, the hollow electrically conductive tapered projections 20 serve as Faraday cages protecting the interior electronic component(s) 100 from RF interference. Placing electronics 100 inside the hollow electrically conductive tapered projections 20 also provides for a more compact design (for example possibly providing sufficient real estate to eliminate the need for the second PCB 50 shown in FIG. 3).

Figure 13:
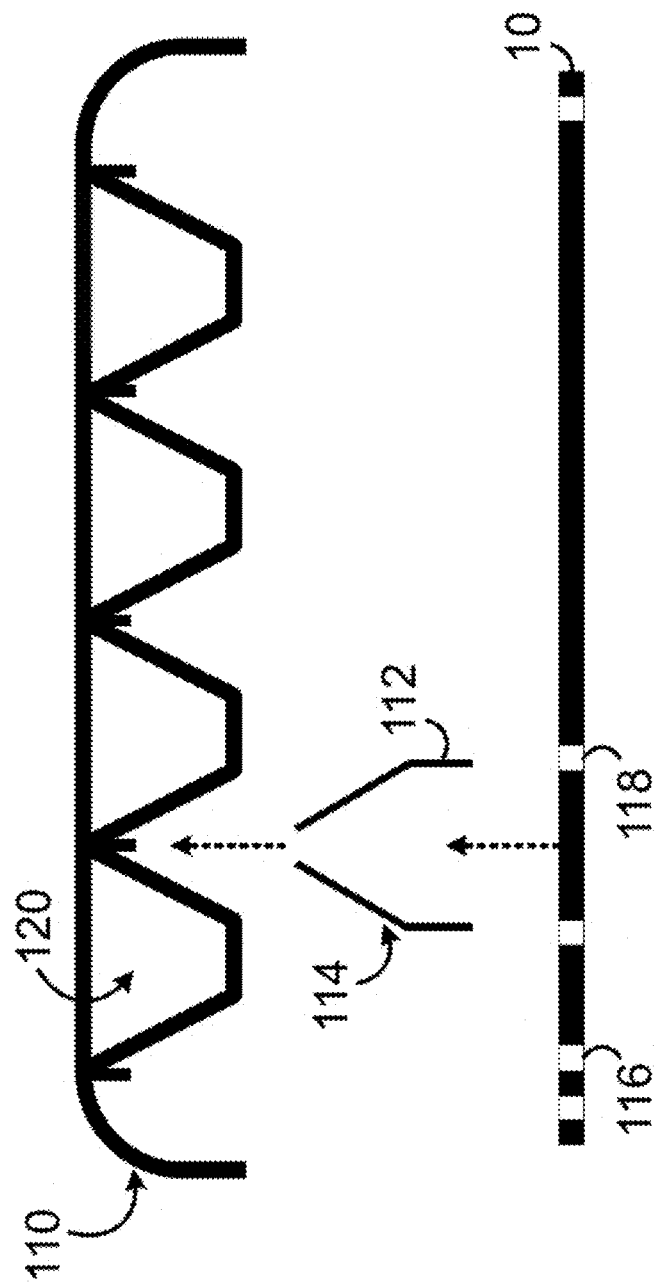
FIG. 13 diagrammatically illustrates an exploded view of another illustrative RF aperture assembly.

With reference to FIG. 13, in another illustrative RF aperture embodiment, a radio frequency (RF) transparent material 110 covers the sensor elements/pyramids (that is, the electrically conductive tapered projections 20 of other embodiments described herein). The RF transparent material 110 serves as a support/fixture for containing/holding plates 112 of the elements/pyramids of the DSA captured in the cover. Plates 112 can be captured in the cover 110 using or with the assistance of an adhesive 114. In some embodiments, a circuit board can be configured to be attached to the plate(s) (e.g. the i-PCB 10). The circuit board can receive the foot or base of the plate and the plate can be optionally electrically attached (e.g., soldered) to the circuit board. In an alternative embodiment, the conductive plates 112 can be formed of printed circuit boards. As noted above, together the printed circuit boards, forming the conductive plates, can create or include a void (e.g. voids 92 of the embodiments of FIGS. 11 and 12). In some embodiments, electronic components 110 (see FIGS. 11 and 12) of the DSA or sensor elements/pyramids can be housed within the void and combined, for example, in a differential mode. Alternatively, the electronic components could be directly attached to the DSA board via screws 116 or holes 118, sensor elements/pyramids, to each other or to something else. In some embodiments, the RF transparent material cover 110 includes an optional filler 120 that is filled with a variable dielectric.

Figure 14:
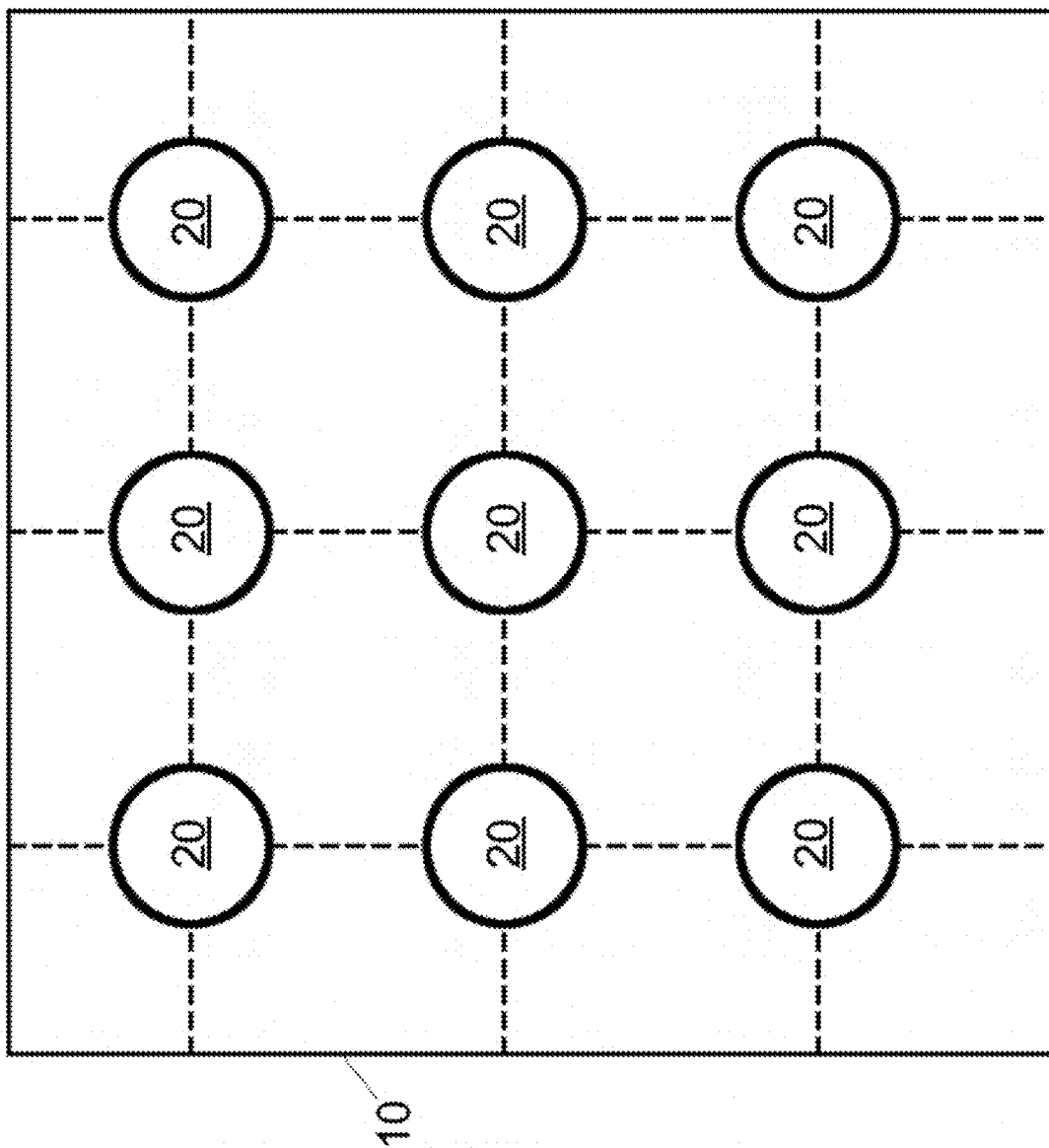
FIGS. 14-17 diagrammatically show some illustrative layouts of electrically conductive tapered projections over the area of the RF aperture.
Figure 15:
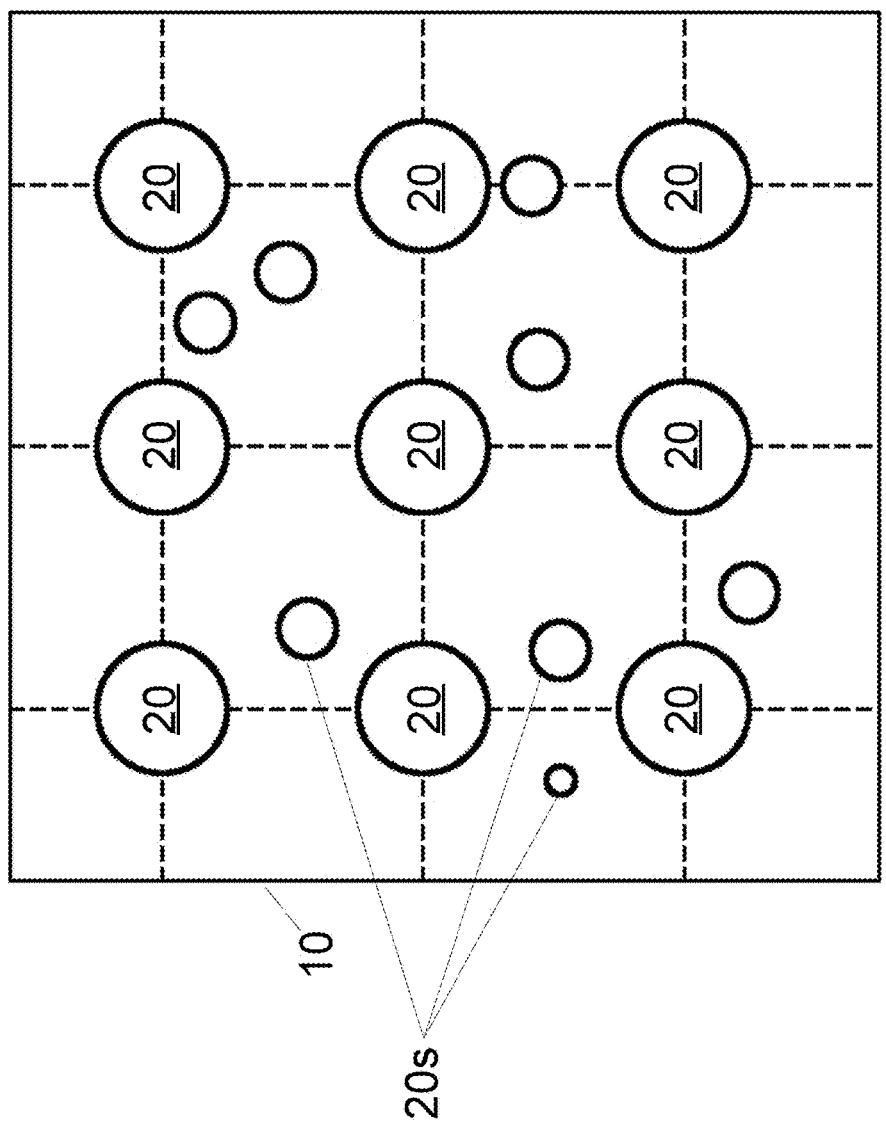
Figure 16:
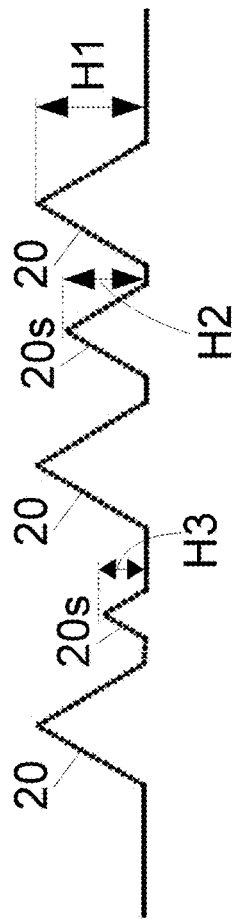
Figure 17:
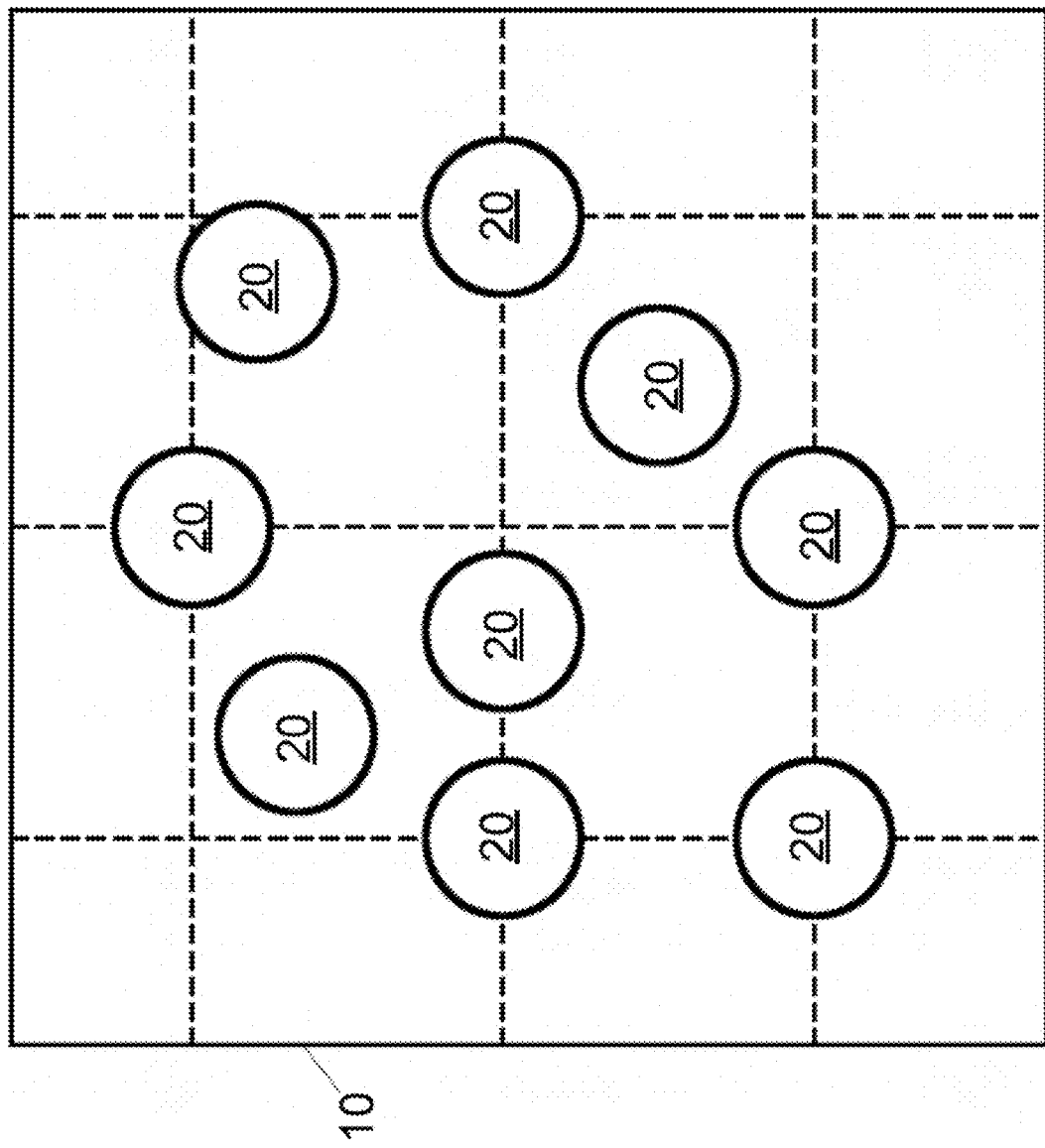

With reference to FIGS. 14-17, the DSA (e.g., scalable, modular board) can include multiple sensor elements/pyramids 20 formed of conductive plates. FIG. 14 shows a top view of an example in which the electrically conductive tapered projections 20 are of equal size and distributed over the i-PCB 10 as a rectilinear array. FIGS. 15 and 16 show top and side views, respectively, of an example in which electrically conductive tapered projections 20 of equal size are distributed over the i-PCB 10 as a rectilinear array, and smaller-sized electrically conductive tapered projections 20s are interspersed in the space between the rectilinear array. FIG. 17 shows an example in which the electrically conductive tapered projections 20 are of equal size but are distributed over the i-PCB 10 as other than a rectilinear array, e.g. with unequal spacings between neighboring electrically conductive tapered projections 20. The sensor elements/pyramids 20, 20s can be formed on, for example, the i-PCB 10 as an array and function as a radiation interface. In some embodiments, the signal capture area of the sensor elements/pyramids 20 can be uniformly distributed over the area of the array or radiation interface. This may be accomplished, for example, by locating a center point of the sensor elements/pyramids 20 at equal distance relative to each other (FIG. 14). In an alternative embodiment, shown in FIGS. 15 and 16, the center points of a first set of sensor elements/pyramids 20 with a first height H1 (FIG. 16) can be located at an equal distance relative to each other to uniformly distribute the signal capture area over the area of the array or radiation interface and second sets of sensor elements/pyramids 20s with a second (or more different) heights H2, H3 that vary can be located at random or to achieve desired propagation or signal capture in the signal capture area defined by the first set of sensor elements/pyramids 20. In other words, the second sets of sensor elements/pyramids 20s do not have to be evenly spaced from each other. In yet another embodiment, shown in FIG. 17, the (first) set of sensor elements/pyramids 20 with a first height H1 can be located at random distances relative to each other to achieve a desired propagation or signal capture. The (first) set of sensor elements/pyramids 20 with a first height H1 can also be located to achieve a desired signal capture area. In an alternative embodiment (not shown), the first set of sensor elements/pyramids can include a first height H1 that varies to achieve a desired propagation or signal capture in the signal capture area. The first set of sensor elements/pyramids, organized at random or to achieve a desired propagation or signal capture in the signal capture area, can also be interspersed with the second sets of sensor elements/pyramids as shown in FIGS. 15 and 16.

Figure 18:
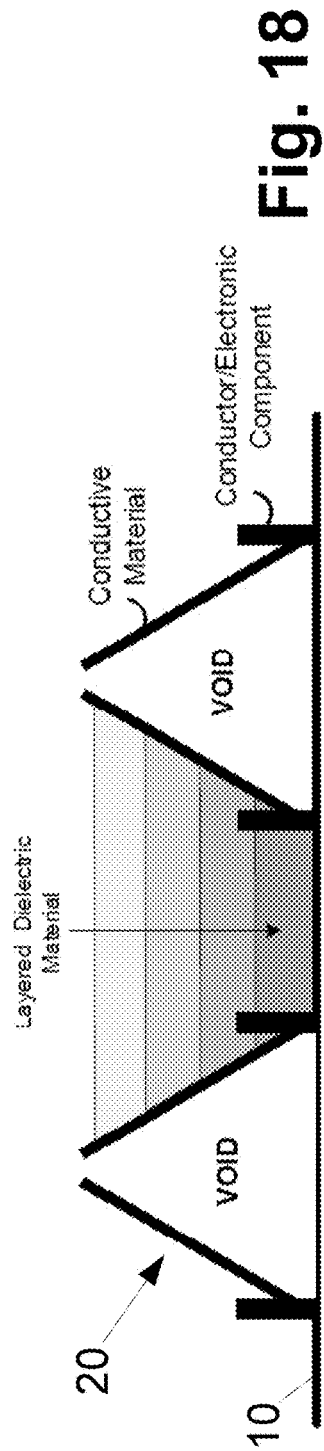
Figure 19:
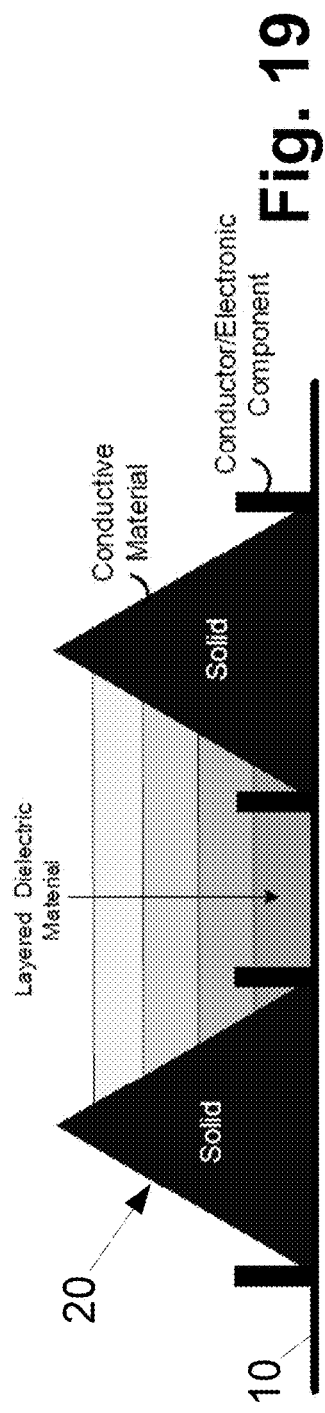
Figure 20:
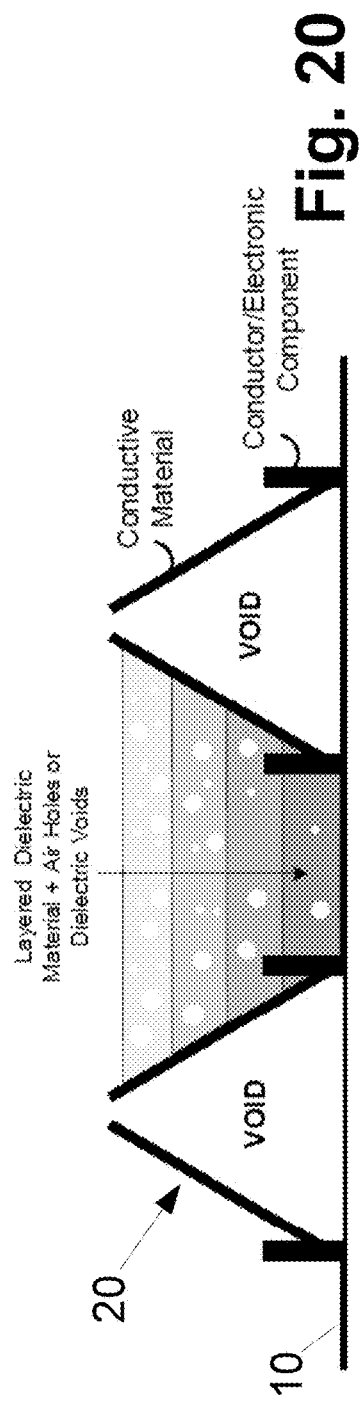

With reference to FIGS. 18-20, in some embodiments the DSA (e.g., scalable, modular board) can include multiple sensor elements/pyramids 20 formed of conductive plates (or otherwise formed, e.g. using metallic coatings on dielectric projections as described in other embodiments herein). In some embodiments, the multiple sensor elements/pyramids 20 are each formed of a single plate wrapped to create a conical-shaped sensor element/pyramid, multiple conductive plates configured to form a void (FIGS. 18 and 20), or can be formed as a solid (FIG. 19). As noted above, in alternative embodiments, electronic components of the DSA or sensor elements/pyramids can be housed within the void of FIGS. 18 and 20 and combined, for example, in a differential mode. Alternatively, the electronic components could be directly attached to the DSA board, sensor elements/pyramids, to each other or to something else. In some embodiments, shown in FIGS. 18-20, dielectric material can surround or be otherwise configured to form to the sensor elements/pyramids 20 of the DSA. In other words, the dielectric material can fill in gaps created between the sensor elements/pyramids. The dielectric material can form distinct layers, as in the embodiments of FIGS. 18-20. The layers can be formed of different materials each with different permittivity values. Alternatively, the layers can be formed of a same material and the permittivity of the single material can be changed. For example, as shown in FIG. 20, air holes or other dielectric voids may be formed in the dielectric material (e.g., the air spaces can be fractionalized). The density of the air holes or other dielectric voids determines the overall dielectric constant. In one embodiment, shown in FIG. 20, lots of air holes or other dielectric voids are formed in the upper most layer of the dielectric material, which results in more of a match of free space to dielectric material in the upper most layer. The second most layer has reduced air holes or other dielectric voids, decreasing the ratio of air holes or dielectric voids to dielectric material. For each layer of dielectric material, the ratio of air holes or dielectric voids to dielectric material is decreased (i.e., dielectric lensing). The dielectric material and ratio of air holes or dielectric voids to dielectric material can be chosen based on a desired propagation of RF signals through the dielectric material inlaid between the sensor elements/pyramids of the DSA. As the signal or wavelength hits the dielectric material, the propagation changes. In other words, the wavelength of the incoming signal is shortened. For example, when measuring the voltage differential, there is an increased voltage differential if/when the wavelength shortens.

With reference to FIGS. 21-23, in some embodiments, dielectric material can surround or be otherwise configured to form to the sensor elements/pyramids 20 of the DSA. In other words, the dielectric material can fill in gaps created between the sensor elements/pyramids. In the illustrative embodiments of FIGS. 21-23, the dielectric material is formed of single or multiple material that, together, form a graded index (e.g., no discontinuities). In other words, there is a graded index of dielectric material. As shown in FIG. 23, air holes or other dielectric voids can be formed in the graded index of dielectric material. The density of air holes or other dielectric voids to the graded index of dielectric material can change based on, for example, a desired signal propagation through the graded index of dielectric material.

Figure 24:
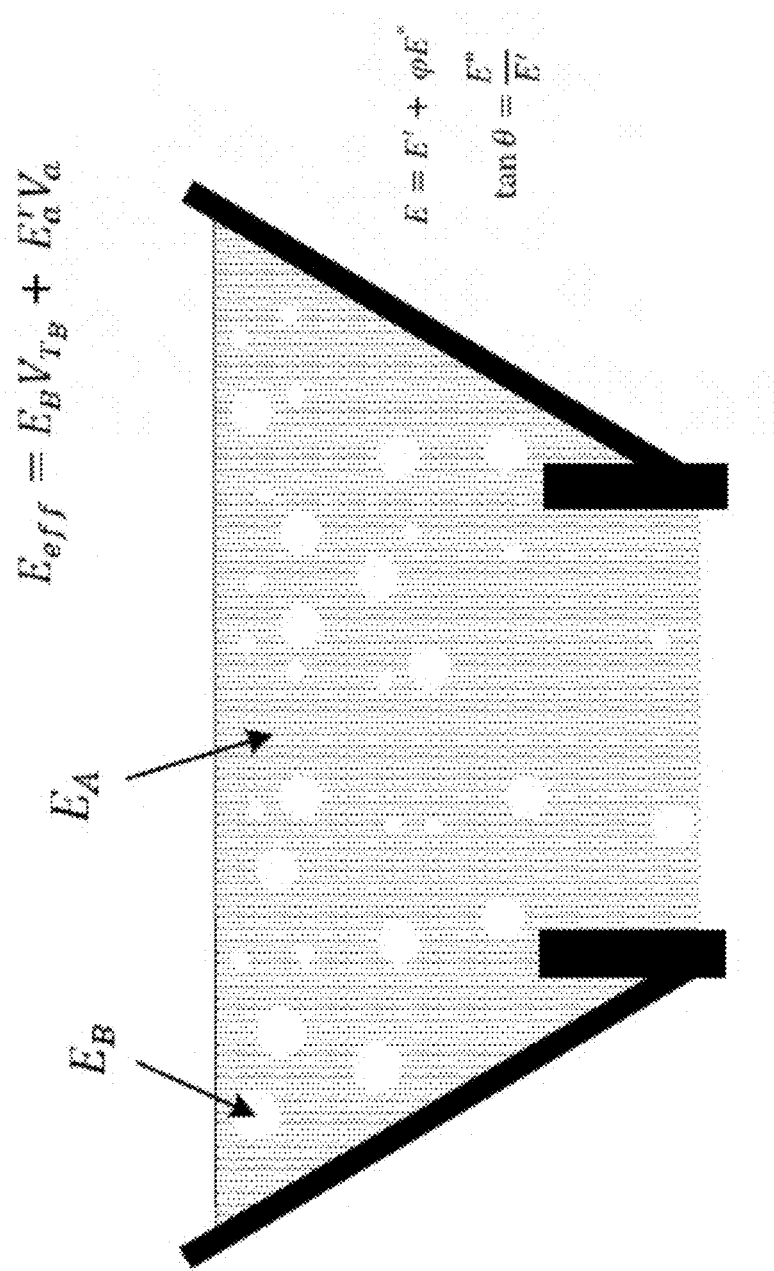

With reference to FIG. 24, an enlarged view of the graded dielectric of the embodiment of FIG. 23 is shown with additional descriptive notation. As shown in FIG. 24, the volumetric fraction of air holes or other dielectric voids to the dielectric material results in an overall dielectric constant. By changing the permeability of the graded index of dielectric material or changing the dielectric constant of the graded index of dielectric material filled in between the gaps of the sensor elements/pyramids 20 of the DSA, as the signal or wavelength hits the graded index of dielectric material the propagation changes. For example, as shown in FIG. 24, the signals may propagate in a first dielectric. At an upper most portion of the graded index of dielectric material, the dielectric material and the volumetric fraction of air holes or other dielectric voids have a same dielectric constant (e.g., based on the volumetric fraction of the material that has the openings). As the number or volume of air holes or other dielectric voids to dielectric material decreases, the dielectric constant decreases. Each dielectric has a real part and a complex part. In the complex part, a loss tangent, which also is a dissipation factor, exists. This causes attenuation. The goal is to limit attenuation by minimizing the complex part on the dielectric material. This is how the dielectric materials or composite materials are selected.

In some embodiments, the sensor elements/pyramids of the DSA can be formed of the dielectric materials and include conductive plates configured to support the dielectric material. Holes or other dielectric voids can be formed in the dielectric material supported by the conductive plates. The holes or other dielectric voids can be used to vary the effective dielectric constant. Resistivity determines the loss.

Although FIGS. 18-24 show the dielectric material ending before the peak of the sensor elements/pyramids 20 of the DSA, the dielectric material could go beyond the peaks of the sensor elements/pyramids of the DSA and/or completely encapsulate the sensor elements/pyramids of the DSA.

In some embodiments, the RF aperture (e.g. DSA) is a modular plate. Multiple DSAs can be selectively put together to form larger DSAs.

In further variants, the DSAs could be acoustic based DSAs or magnetic based DSAs. Magnetic based DSAs would allow efficient magnetic field capture as low as tens of Hertz frequencies. This would potentially minimize propagation. Acoustic would allow the DSA to be deployed on submarines and to operate under the water.

Figure 25:
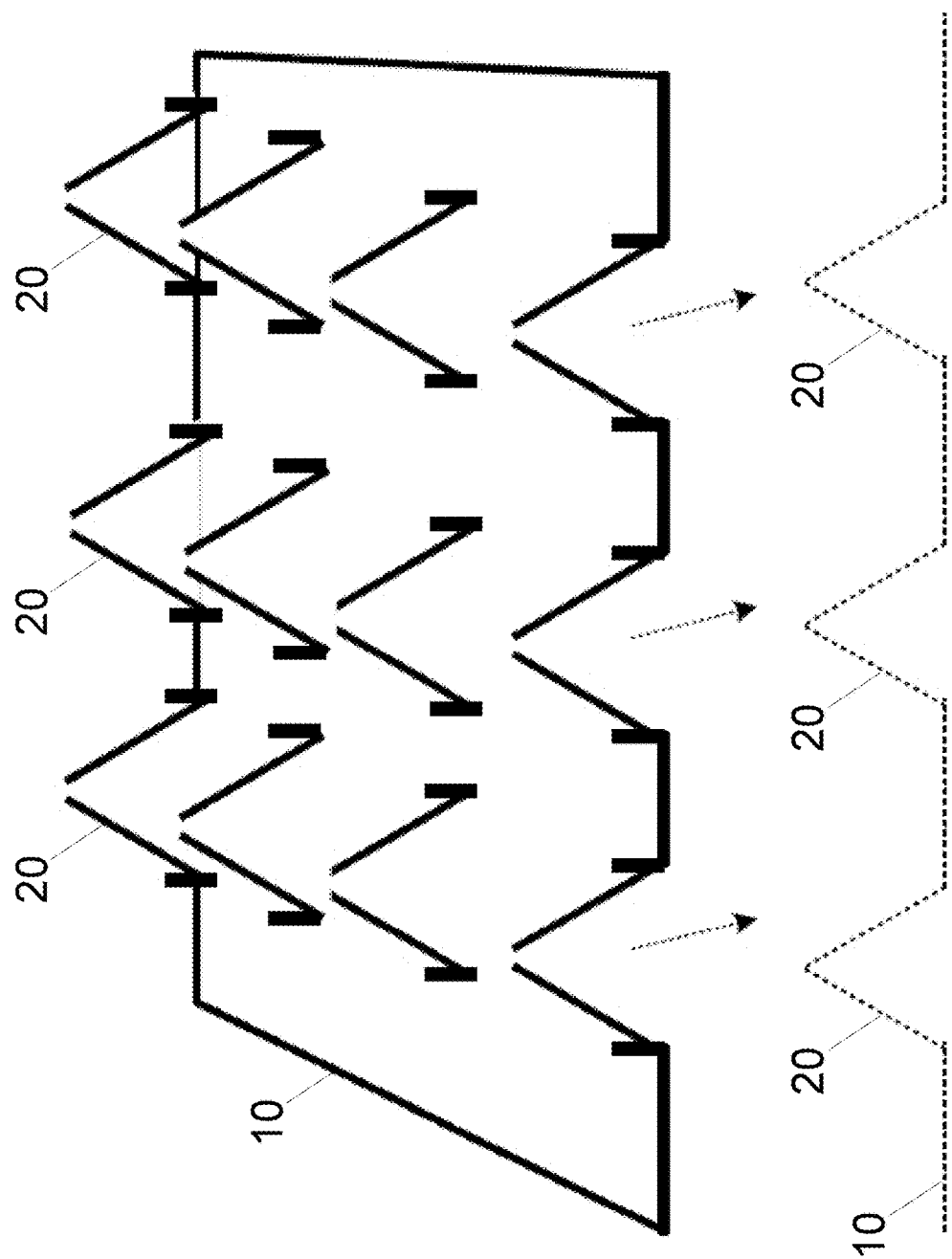
FIG. 25 shows another illustrative RF aperture assembly.

With reference to FIG. 25, the DSA (e.g., scalable, modular board) can include multiple sensor elements/pyramids 20 formed of conductive plates (or otherwise formed as described in various embodiments herein). In one embodiment, a base 10 of the DSA can be formed of a printed circuit board (e.g., the described i-PCB) configured to support the sensor elements/pyramids 20. The circuit board can include multiple openings where the baluns (i.e., the sensor elements/pyramids 20) are loaded. The circuit board, with openings, creates a form factor that can be slidably received on, for example, a 3-D printed form factor (e.g., blocks, etc.). In other words, the circuit board together with the baluns can form a "smart board" configured to store the intelligence (e.g., using a processing node 900, see FIG. 28) of the DSA. The smart board can be, for example, injection molded. This smart board can be slidably received on any form factor. The smart board can be efficiently manufactured.

Figure 26:
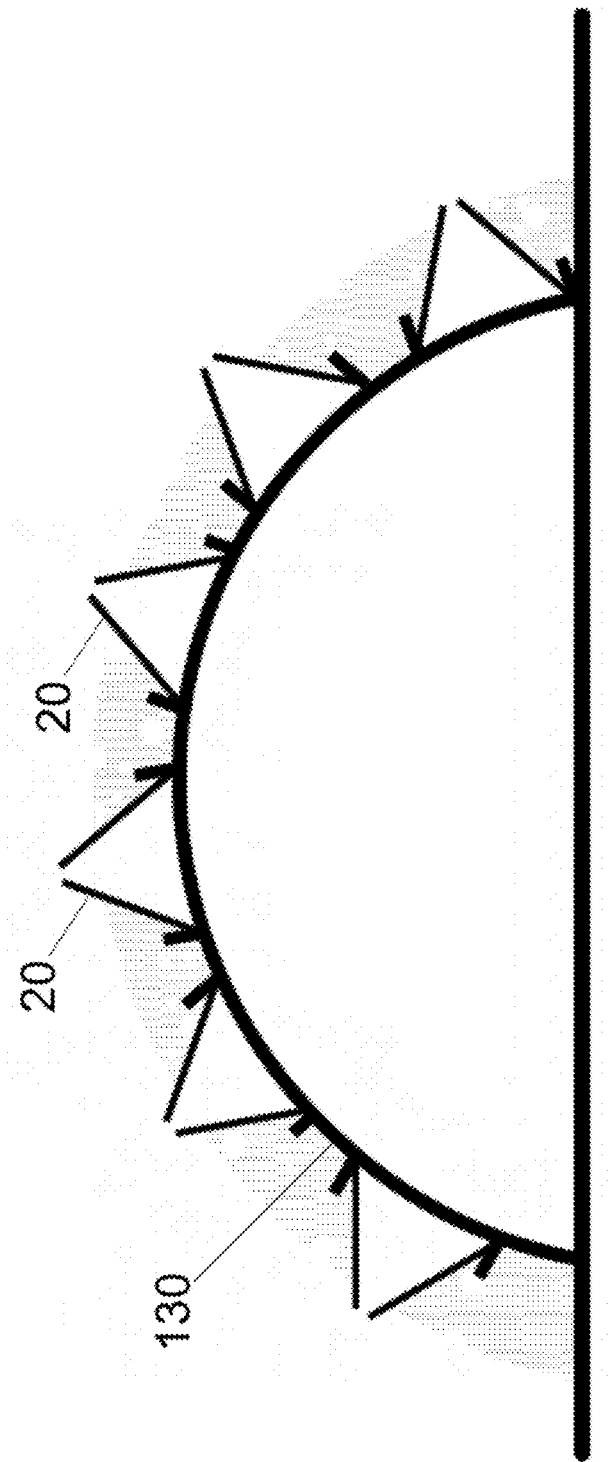
FIG. 26 shows an RF aperture comprising electrically conductive tapered projections disposed on a curved (e.g. radial) surface.

As shown in FIG. 26, the DSA (e.g., scalable, modular board) can include multiple sensor elements/pyramids 20 formed of conductive plates (or otherwise formed as described in various embodiments herein). While the previous embodiments have employed a flat i-PCB 10, in the embodiment of FIG. 26 the shaping of the DSA is domed (or, more generally, has a non-flat or curved surface 130, e.g. with a fixed curved radius in some more specific embodiments). The domed-shaped DSA of FIG. 26 (including sensor elements/pyramids 20 formed along the curved surface 130) can support beam-forming and beam-steering. For example, the DSA can be configured to attach to a curved surface such as, for example, the exterior of an airplane. Using beam-forming, a certain series of amplitudes may be applied to the sensor elements/pyramids 20 of the DSA to knock out side loads and create a concentrated, directed beam steered directionally to the DSA. In other words, the amplitudes of different elements can be changed and the phase shifts between adjacent elements used to direct concentrated beams at the sensor elements/pyramids 20 of the DSA. The illustrative DSA of FIG. 26 also includes optional dielectric material 132 disposed between the sensor elements/pyramids 20, for example as described with reference to FIGS. 18-24.

Figure 27:
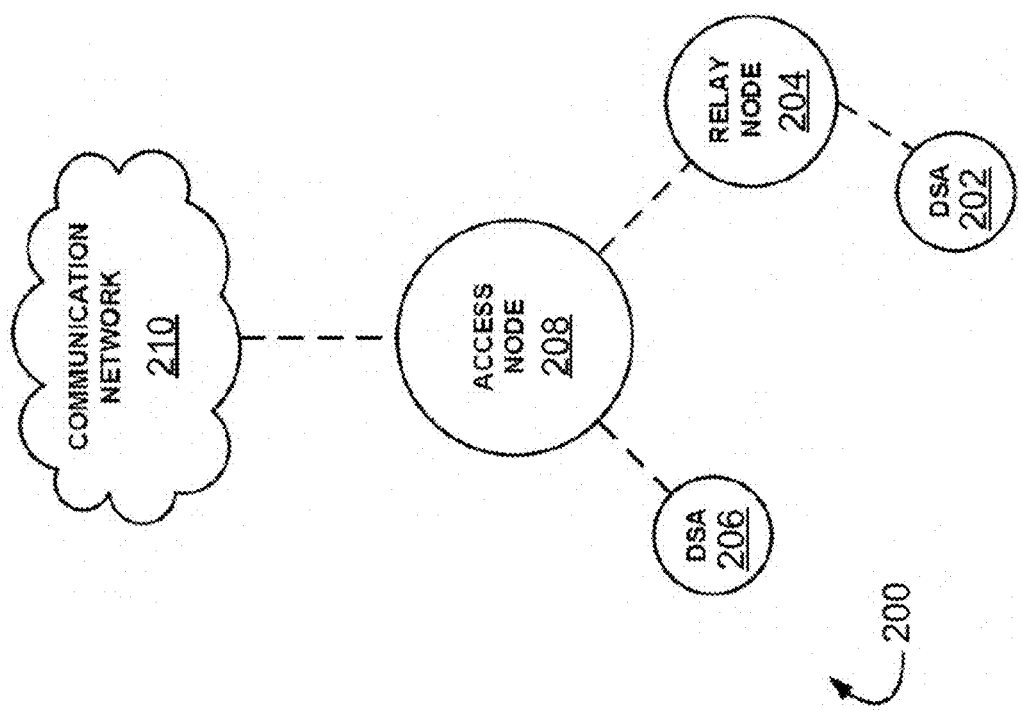
FIG. 27 diagrammatically shows a network employing DSAs.

With reference to FIG. 27, a network 200 is shown, including access node 208 (e.g., signal source/node for detecting signals, etc.) directly communicating with one DSA 206, and relay node 204 (e.g., could be, for example, an interferer node, used to relay signal information, etc.) communicating with another DSA 202 (e.g., scalable, modular board that includes, for example, multiple elements, which can be formed as an array and function as an electromagnetic radiation interface or other conductive material).

Figure 28:
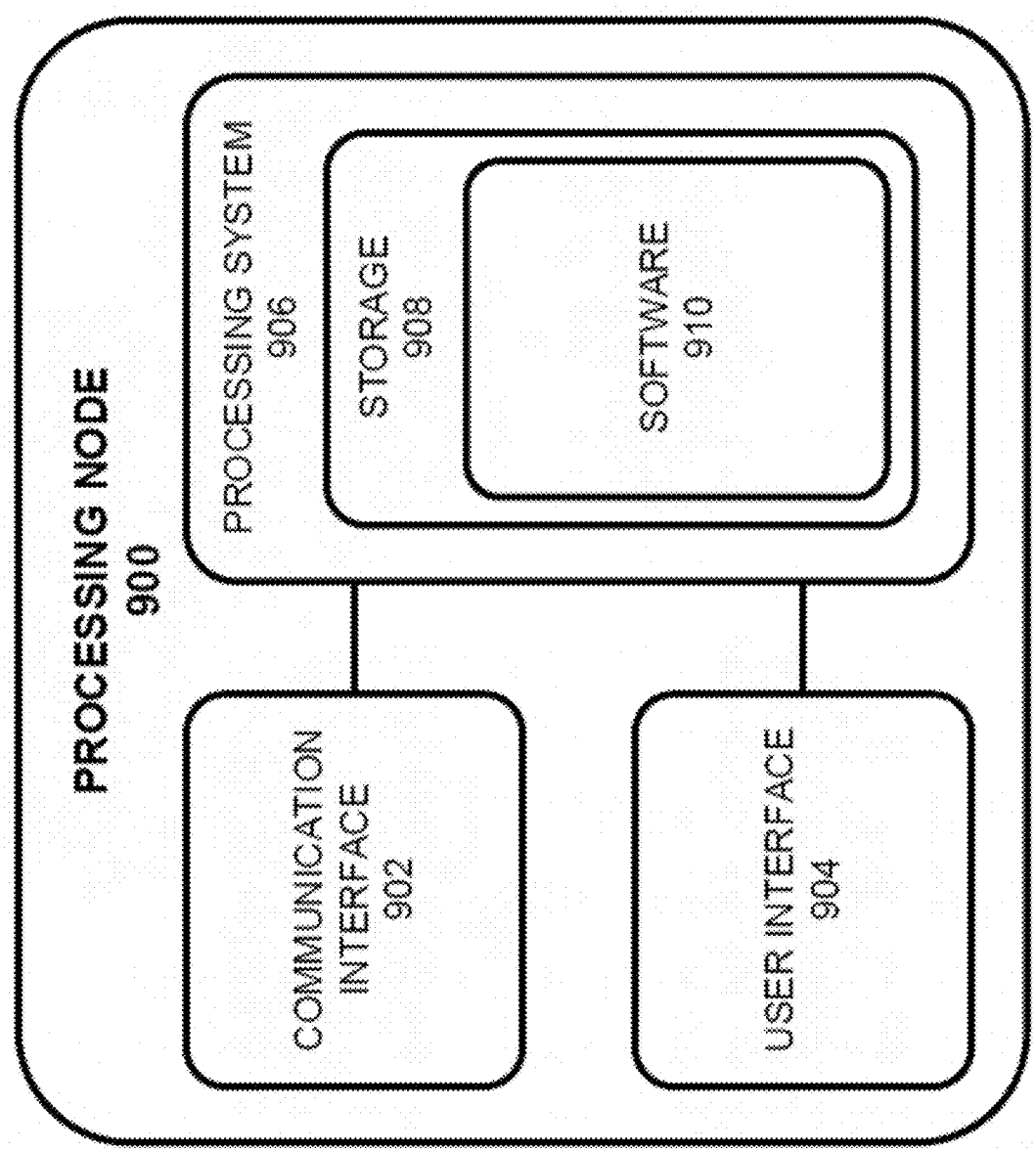
FIG. 28 diagrammatically shows a processing node suitable employed in conjunction with the embodiment of FIG. 25.

FIG. 28 shows a diagrammatic representation of a processing node 900 including a communication interface 902, a user interface 904, and a processing system 906 with storage 908 storing software 910. The processing node 900 may, for example, be used in conjunction with the DSA of FIG. 25.

Some further contemplated optional aspects and/or extensions are listed as follows. Antenna that includes a single port. Cable transmission line or transmission line that is not formed as an integral part of the sensor element. Inner conductor and/or dielectric material formed with the electrically conductive tapered projection and/or sensor without a plate (e.g., the sensor is formed as part of the bristle structure). Electrically conductive tapered projections formed of something other than metal or that is formed of multiple antennas. Transmission line that corresponds to multiple electrically conductive tapered projections or antennas. Random signal capture area. Shorter length of electrically conductive tapered projections compared to wavelength. Do not terminate follicle in a resistive element that matches the impedance of the follicle (e.g., find another way to 'electrically black' the signal). Don't digitally convert the signals to create a digital replica of the incident electromagnetic energy. Don't use electronic modules to create an active surface that controls the amplitude of the reflected signals (e.g., amplify the signal by a factor relating to real magnitude). Pixel partition elements (electrically conductive tapered projections) that do not correspond to a single horizontal/vertical circuit board. Use something other than RF waves (e.g., acoustic or magnetic aperture designed equivalently to the RF aperture embodiments described herein). Provide the partition elements to each have a frequency dependent effective area. Form the circuit boards as part of the partition elements. In other words, form partition elements of some material that holds or supports a circuit board. The partition elements are also contemplated to be the circuit board. Printed partition element that includes a printed circuit board formed as part of it. Use a printed circuit board on the partition element or formed with the partition element to guide RF signals and or disperse, etc., on the rest of the partition element. In some contemplated embodiments, the circuit boards terminate in a balanced transmission line. The support substrate (e.g. illustrative i-PCB 10) could alternatively be formed as a portion of the electrically conductive tapered projections or partition elements. Conductive "seats" or "pads" that are not positioned on the substrate or that surround the electrically conductive tapered projections or partition elements. This refers to "conductive" seats or pads such as copper. Seats or pads that are not conductive could use a material that affects the acoustic response, such as a polymer (in the case of an acoustic aperture). Similarly, different properties could be provided to transform the RF waves.

In the following, some further illustrative implementations of the electrically conductive tapered projections are described. In some embodiments, these are solid elements, as in the following examples.

The protrusions should be firmly mounted to a surface (flat, or curved) and make discrete, electrical contact along each face of the protrusion. The protrusions may be nonround protrusions, having at least 3 faces and 3 edges connecting the faces. Undue 'play' or uncoupled movement between the interface board and the protrusion can result in decreased RF performance.

Figure 30:
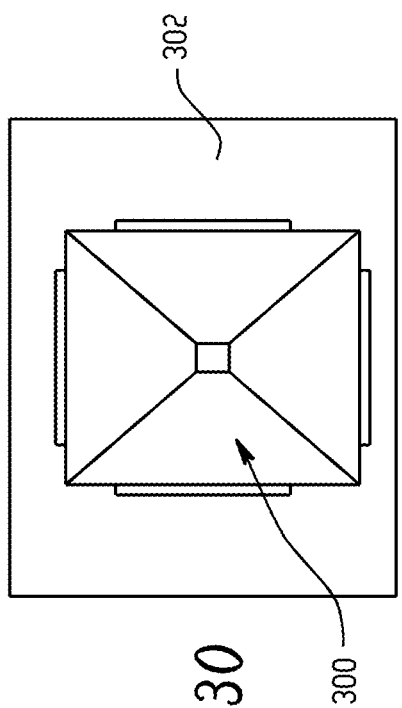
Figure 31:
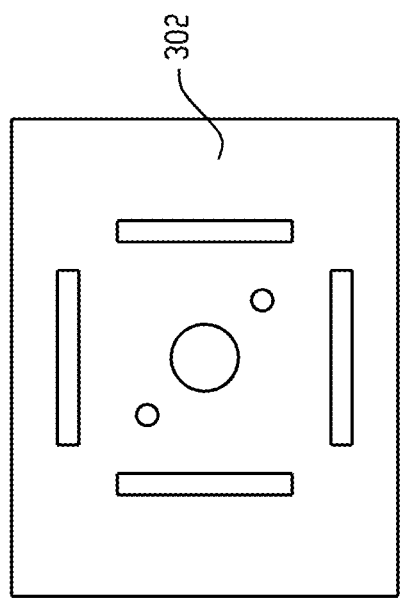
Figure 29:
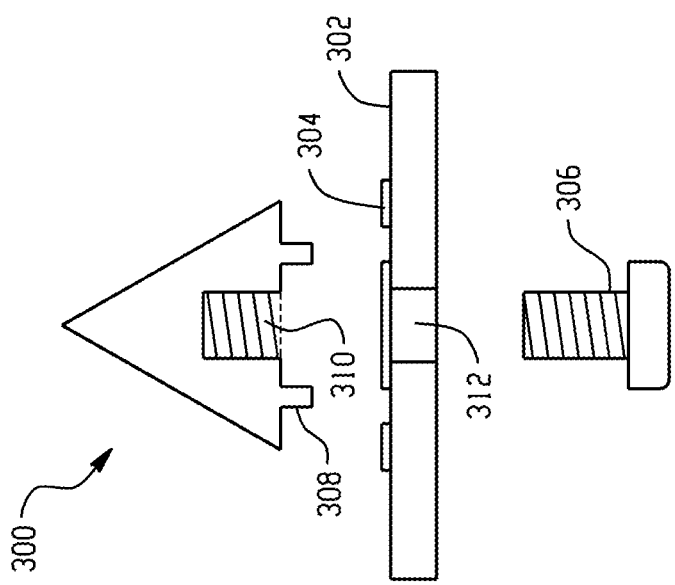
Figure 34:
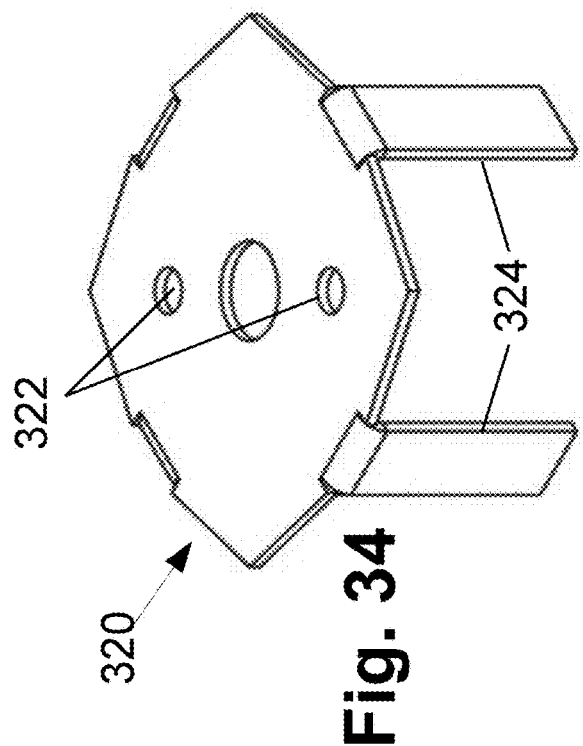

With reference to FIGS. 29-31, an embodiment employs electrically conductive tapered protrusions 300 and an interface board 302 which contains conductive traces 304. The protrusion 300 is made from a solid conductive material, such as metal bar stock, e.g. of copper or aluminum which are readily available, high performance, and cost effective. The illustrative electrically conductive tapered protrusion 300 has the shape of a four-sided pyramid. The protrusion 300 is held against the board 302 with a screw or other threaded fastener 306 causing consistent pressure to be made along the base edges. This pressure ensures an electrical contact because the conductive traces 304 are slightly higher than the non-conductive elements of the circuit board 302, and the conductive traces 304 are exposed, as seen in FIG. 29. The top view of the configuration with the protrusion 300 mounted is shown in FIG. 30, while FIG. 31 shows a top view of the interface board 302 in isolation. In this design, the protrusion 300 has at least one small nub (and in the illustrative embodiment two small nubs 308) that maintain the proper orientation of the protrusion 300 with respect to the conductive surfaces. The protrusion 300 has a centered hole 310 that is threaded to receive the screw 306 after the screw passes through a through-hole 312 in the interface board 302. The mounting method is independent of the length of protrusion 300, and so the height of the protrusion 300 above the surface of the board 302 is a free design parameter.

Figure 32:
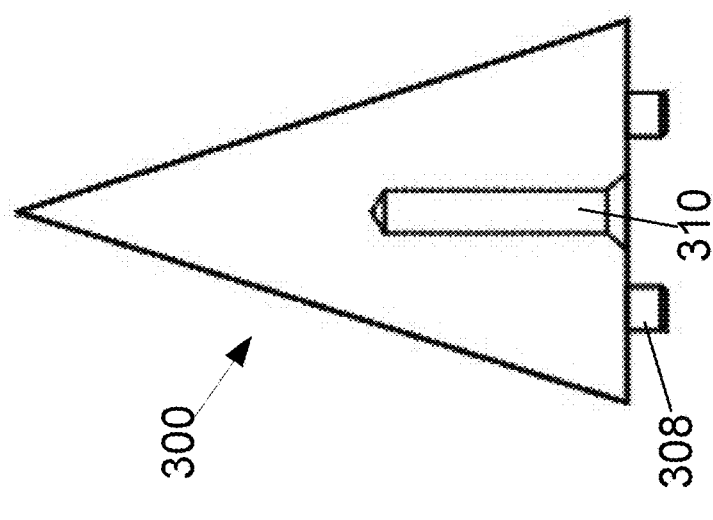
Figure 33:
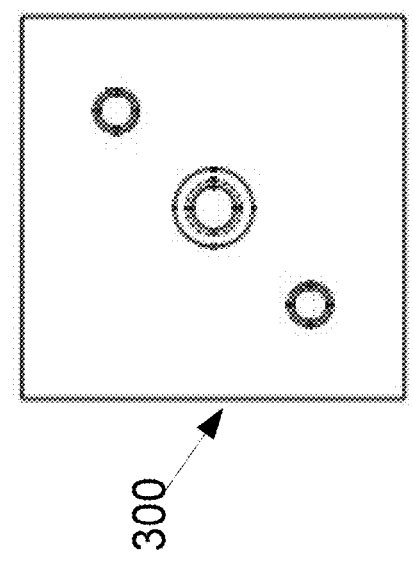
Figure 35:
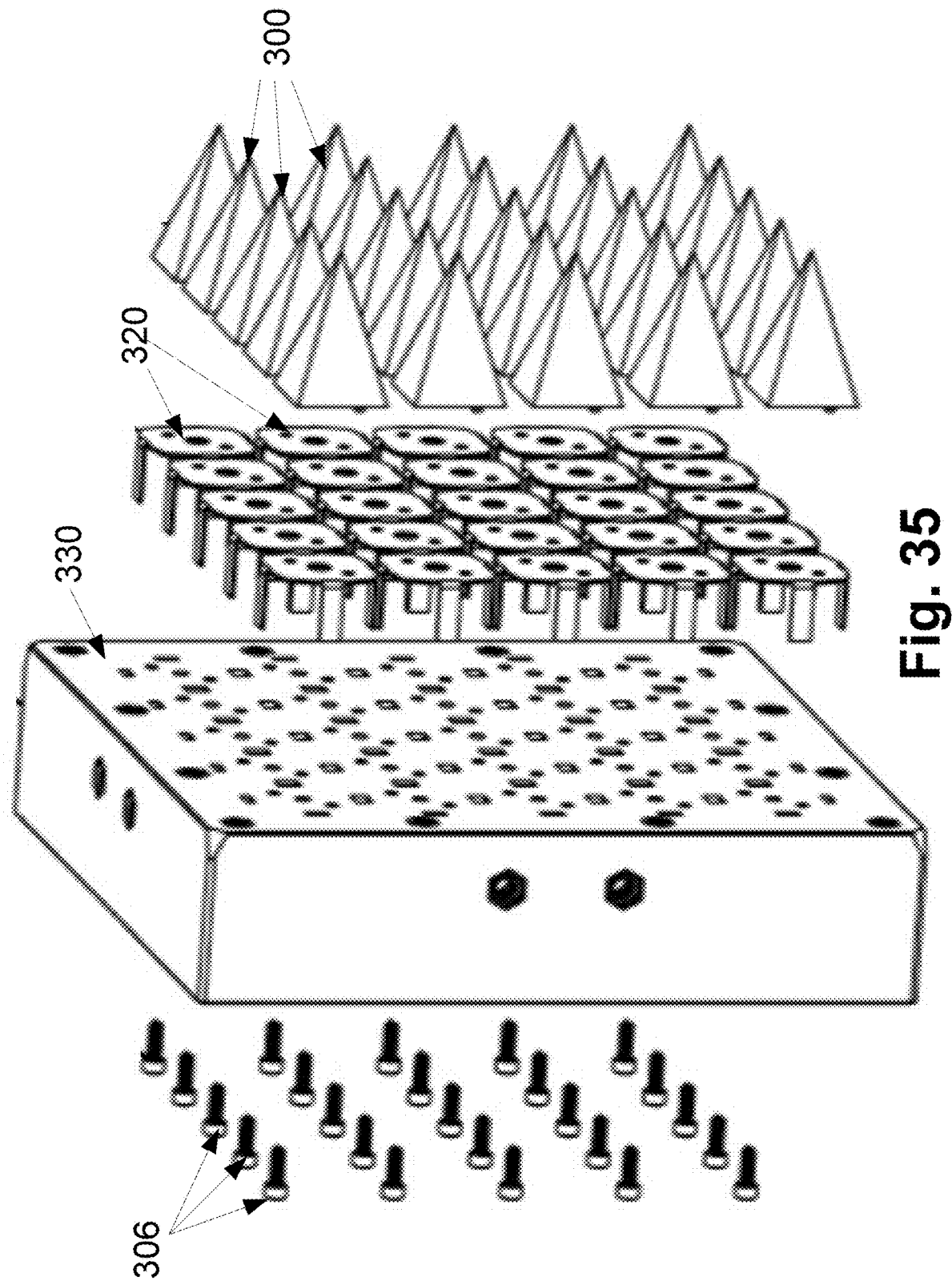

With reference to FIGS. 32-35 an embodiment is shown which permits the protrusion mounting to work with a non-PCB interface board (that is, an interface board that does not include printed circuitry). The mounting method uses sheet goods to electrically connect the pyramids with perpendicular boards (not shown in FIGS. 32-36) below the interface board. FIGS. 32 and 33 show side and bottom isolation views, respectively, of a suitable electrically conductive tapered protrusion 300, which may be of the same design as in FIGS. 29-31, e.g. having the shape of a four-sided pyramid. Here the protrusion 300 sits on an electrically conductive (e.g., metal) mount 320. The mount 320 is shown in isolation in FIG. 34, with the nubs 308 captured in the holes 322 of the mount 320. Tabs 324 of the mount (labeled in FIG. 34) then insert and protrude through an interface board 330, as shown in the exploded perspective view of FIG. 35. Screws 306 then go from the backside of the interface board 330, through the respective mounts 320, and into the centered holes 310 of the respective protrusions 300. Again, the mounts can be used with protrusions 300 of different heights. In this configuration the mount 320 can be designed so that the size of the base is interchangeable as well. So long as the tabs 324 that mount through the interface board 330 are in the same location, the size of the mount can be changed at will. As shown in FIG. 35, this design allows for the interface board 330 to be an electrically non-conductive housing, which may contain electrical circuitry for operating the array of electrically conductive tapered protrusions 300 in RF transmit and/or RF receive mode(s).

With reference to FIG. 36, another embodiment employs an electrically conductive tapered protrusion 340 in which the nubs 308 of the embodiments of FIGS. 29-35 are replaced by recesses 348. In this embodiment, the interface board 330 of the embodiments of FIGS. 29-35 is replaced by an interface board 350 which includes nubs 352 that mate with the recesses 348. In other words, the positive nubs 308 are replaced with holes 348, which in some manufacturing processes reduces machining time, and thus cost, and results in less material waste. To do so, the interface board 350 is designed to supply the nubs 352 itself. The interface board 350 may for example be injection molded or produced by additive manufacturing, in both cases the inclusion of the nubs 352 is of little consequence to material or tooling costs. For the same strength as the metal nub 308 on the solid metal protrusion 300, the nub 352 on the non-metal interface board 350 should be larger due to its material composition, but this is to no detriment because the increased hole size in the mount 320 and in the protrusion 340 do not affect cost or performance.

In a variant approach, the use of nubs is eliminated by using a second screw, with both screws being offset from the center of the protrusion being secured. Using two screws requires two tapping steps, and doubles the number of screws, and doubles the time spent fastening.

Figure 38:
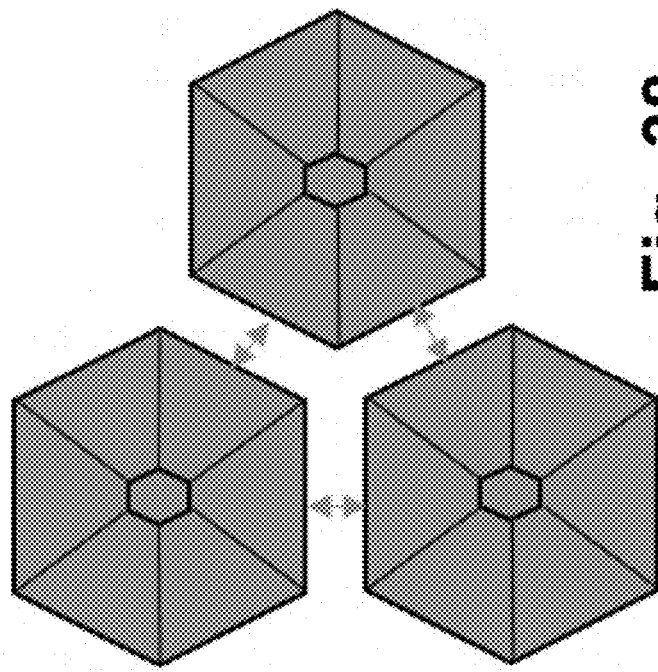
FIGS. 37-39 illustrate some alternative faceted electrically conductive tapered projection geometries.
Figure 37:
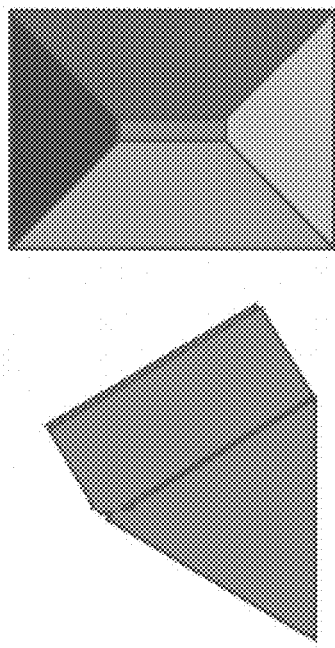
Figure 39:
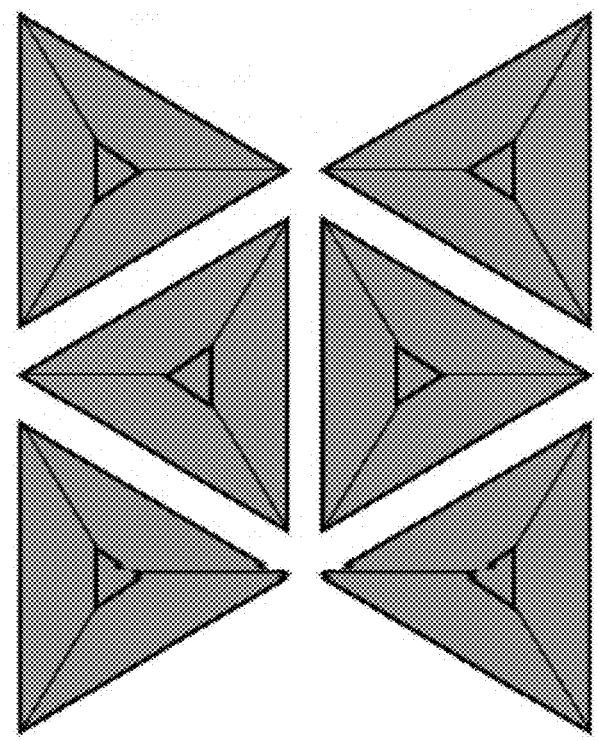

With reference to FIGS. 37-39, in some designs the electrically conductive tapered protrusions are faceted with various geometries. As mentioned, the electrically conductive tapered protrusions 300 as shown in FIGS. 30 and 35 are four-sided pyramids with four-fold rotational symmetry. FIG. 37 shows an embodiment which is also a four-sided pyramid, but with only two-fold rotational symmetry. This design could support different sensitivities and signal chain complexities along opposing orthogonal polarizations. FIG. 38 shows an embodiment in which the electrically conductive tapered protrusions are six-sided (i.e. hexagonal) pyramids with six-fold rotational symmetry. A hexagonal structure provides three different polarizations. This is useful when it is necessary to finely measure or transmit polarization, or when the number of signal chains per surface area is higher, thus increasing transmit power and reducing noise for that same area. FIG. 39 shows an embodiment in which the electrically conductive tapered protrusions are three-sided (i.e. triangular) pyramids with three-fold rotational symmetry. These have similar properties to the hexagonal design of FIG. 38. More generally, any configuration where the geometry can tesselate is possible, with the most straightforward being a geometry that can tessellate with only itself.

In the following, some further illustrative implementations of the electrically conductive tapered projections are described. In these embodiments, the projections are hollow elements, e.g. formed by plates as in the following examples.

Manufacturing of solid electrically conductive tapered protrusions uses substantial amounts of interior material that does not affect the RF performance, as the electromotive force only flows on the outside surface of the protrusion, to a depth equaling the skin depth of the particular frequency of the coupled RF radiation. Employing hollow electrically conductive tapered protrusions can reduce weight, material cost, and fabrication cost. Hollow protrusions can be made from sheet goods, such as electrically conductive plates. In the various embodiments next discussed, the electrically conductive plates may have a positive support, or may be freestanding or self-supporting plates, or may have a negative support.

Key attributes for DSA market acceptance include Size, Weight, Power, and Cost (SWAP-C) per equivalent performance. Using faceted electrically conductive tapered projections (such as those of FIGS. 30, 35, and 37-39; as opposed to conical projections) facilitates machining the faceted projections from solid aluminum or copper stock. While convenient, significant material is used in solid projections, with significant tool time, raising both the cost and weight of the DSA. Being that the electromagnetic wave only travels a small depth (i.e. the skin depth) into the protrusion, only the first few micrometers of the outer surface need to be electrically conductive. The calculation for skin depth is as follows:

$$\delta = \sqrt{\frac{\rho}{\pi f_0 \mu_r \mu_0}} \quad (1)$$

Where $\delta$ is the skin depth, $\rho$ is the resistivity of the material, $f_0$ is the frequency-of-interest, $\mu_r$ is the relative permeability of the material (~1 for copper and aluminum), and $\mu_0$ is the permeability of free space. For the frequencies-of-interest to the current generation of DSA design, i.e., 100 MHz and greater, the skin depth is less than 10 micrometers. The result is that the conductive surface of the DSA protrusions only need to be a few skin depths, e.g. 5-10 microns, in thickness on each side to support the current flow from the protrusion to the signal chain.

Figure 40:
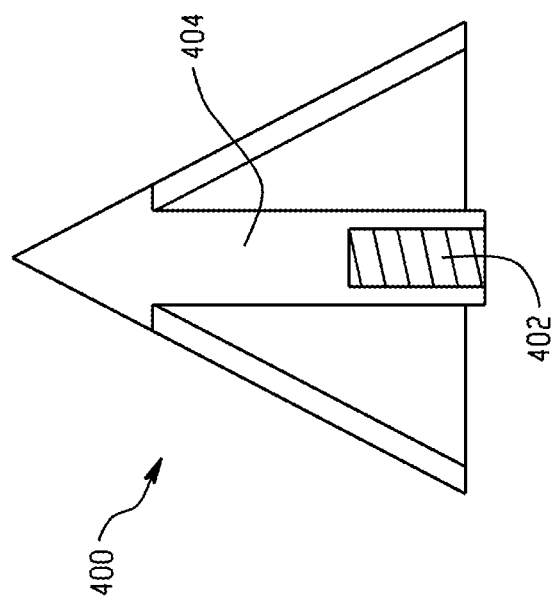
FIGS. 40-41 illustrate an embodiment of an electrically conductive tapered projection which is hollow.
Figure 41:
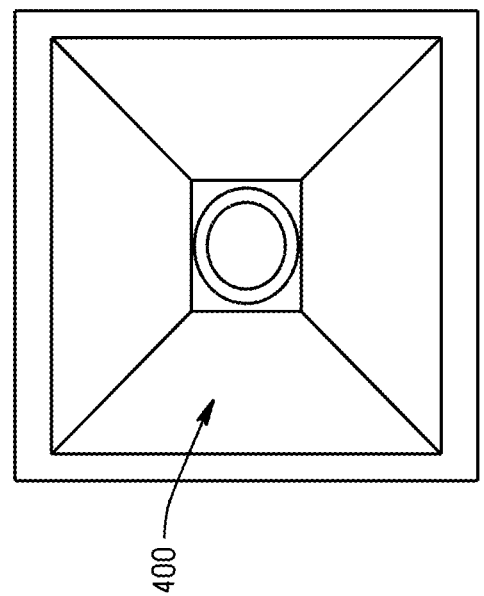
Figure 45:
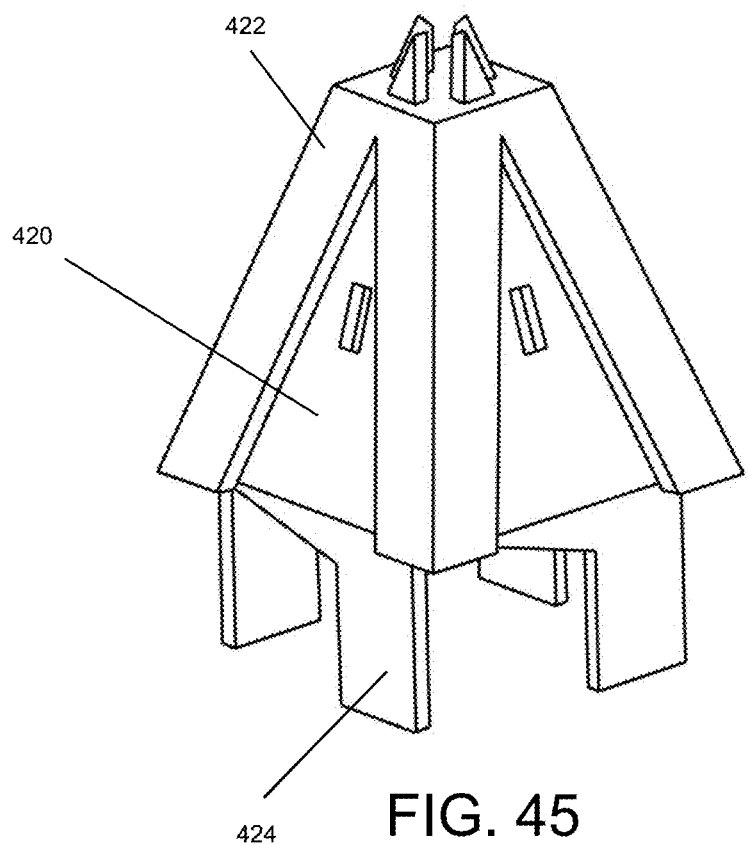

With reference to FIGS. 40 and 41, an electrically conductive tapered projection 400 is suitably milled from bar stock, and then is processed by a finishing step where excess material is removed. FIG. 40 shows an example of this approach where a single tapped screw hole 402 is maintained in the center of the structure and the remaining material is milled out, retaining a thickness of material that is appropriate for mechanical rigidity. FIG. 40 shows a central cylinder support 404 disposed inside the hollow projection 400. The illustrative central cylinder 404 has a circular cross-section extending to the top of the protrusion, however this cylinder support could have a square or rectangular cross-section which would be faster to machine with only a moderate penalty in weight. While this solution reduces the weight of the projection, it increases the tooling time and thus the cost as compared with a solid projection, and maintains the same material cost as a solid projection.

Rather than subtractive milling, the electrically conductive tapered projection 400 could be manufactured by casting or additive manufacturing. Casting reduces manufacturing costs and material waste, but is only suitable in high volume applications. The projection 400 manufactured by casting would likely have a rough surface and be thicker than necessary for mechanical rigidity. For additive manufacturing, the material must be conductive limiting the applicable technologies. Generally, additive manufacturing would be most costly then milling, and result in a rough surface.

In the following, a plate-based approach is described for manufacturing the electrically conductive tapered projections. Three variants of the plate-based approach are described: an approach using a positive support; an approach that is free standing, i.e. self-supporting; and an approach utilizing a negative support.

With reference to FIGS. 42-48, an embodiment employing positive support is described. Here, individual electrically conductive (e.g., metal) tapered plates 420 (shown in isolation in FIG. 42 in alternative perspective views) are supported internally by a dielectric structure 422 shown in FIGS. 43 and 44 in alternative perspective views. Each electrically conductive tapered plate 420 has a tab 424 at the bottom that electrically extends the plate beyond the base of the protrusion to make electrical connection with an interface board (PCB or not PCB) or a perpendicular boards located below the interface board, or some other electronics. Each plate 420 further has a bend 426 in the plate at the point where the protrusion ends. The bend 426 permits the plate 420 to travel through the interface board at a ninety-degree angle. While optional, this bent configuration saves material and provides an easier connection. A third feature is an angled extension 428 below the plane of the tapered projection. This angled extension 428 mates with the interface board, ensuring a slide into the board and positive capture. It also increases the strength at the bend 426.

Figure 46:
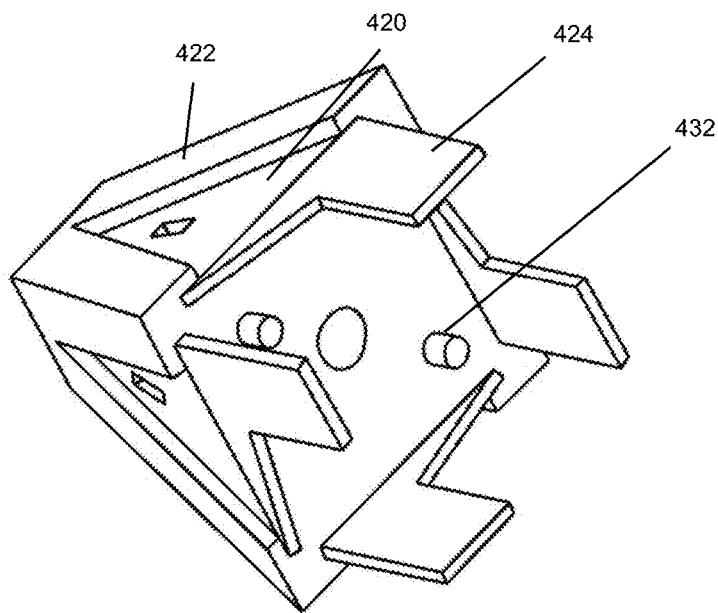
Figure 47:
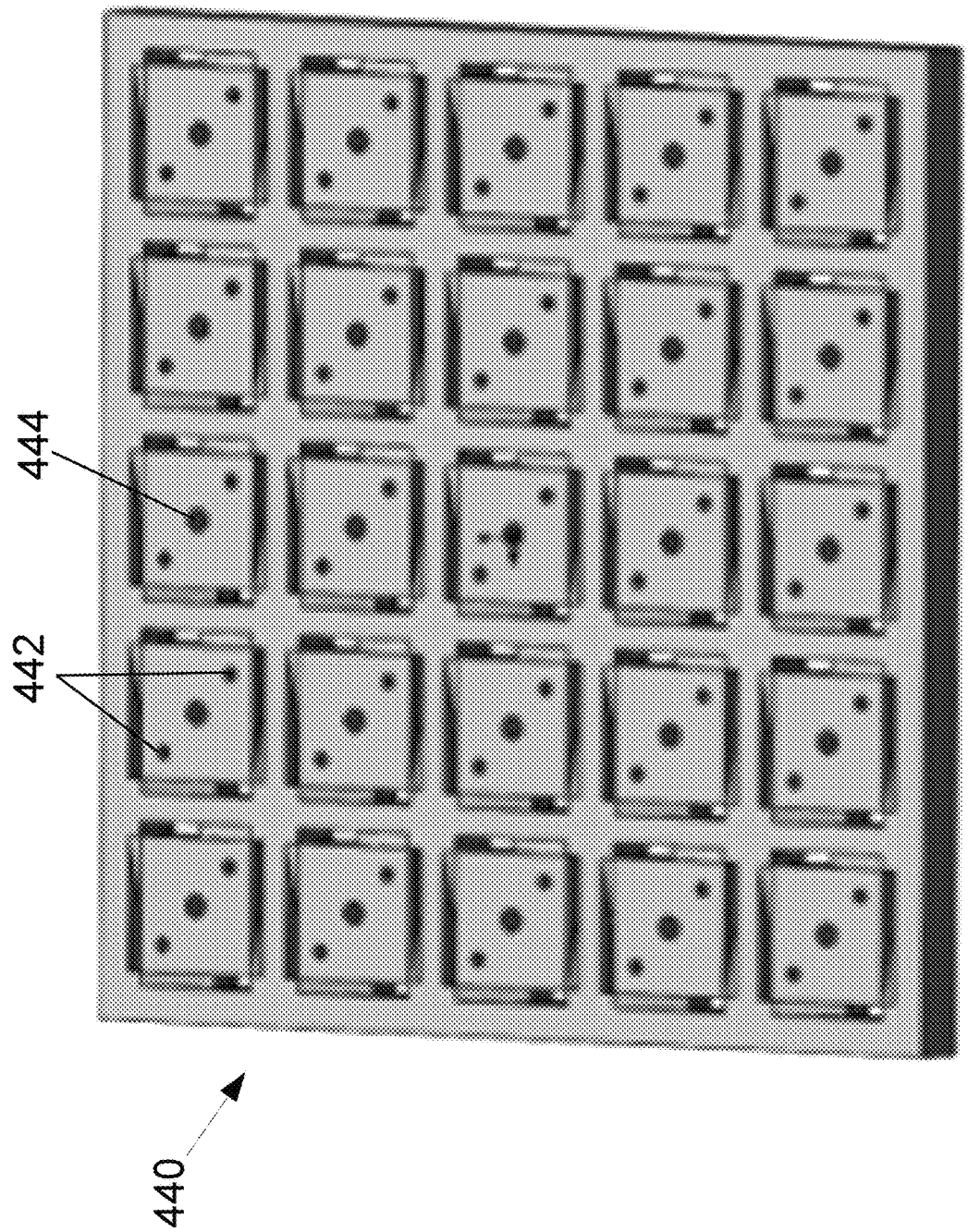
FIGS. 47-49 illustrate mounting of electrically conductive tapered projections of FIGS. 42-46 on an interface board.
Figure 48:
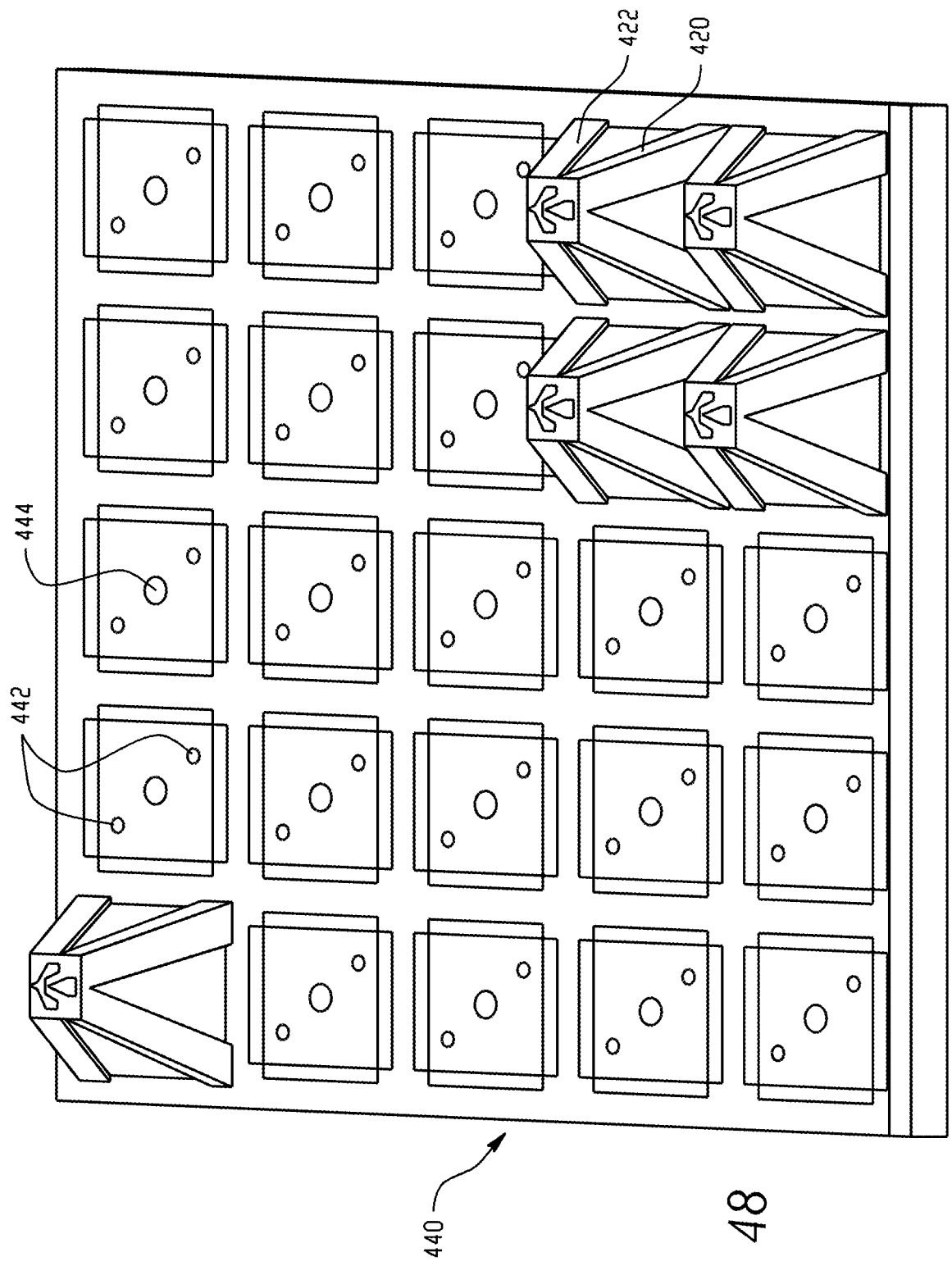
Figure 49:
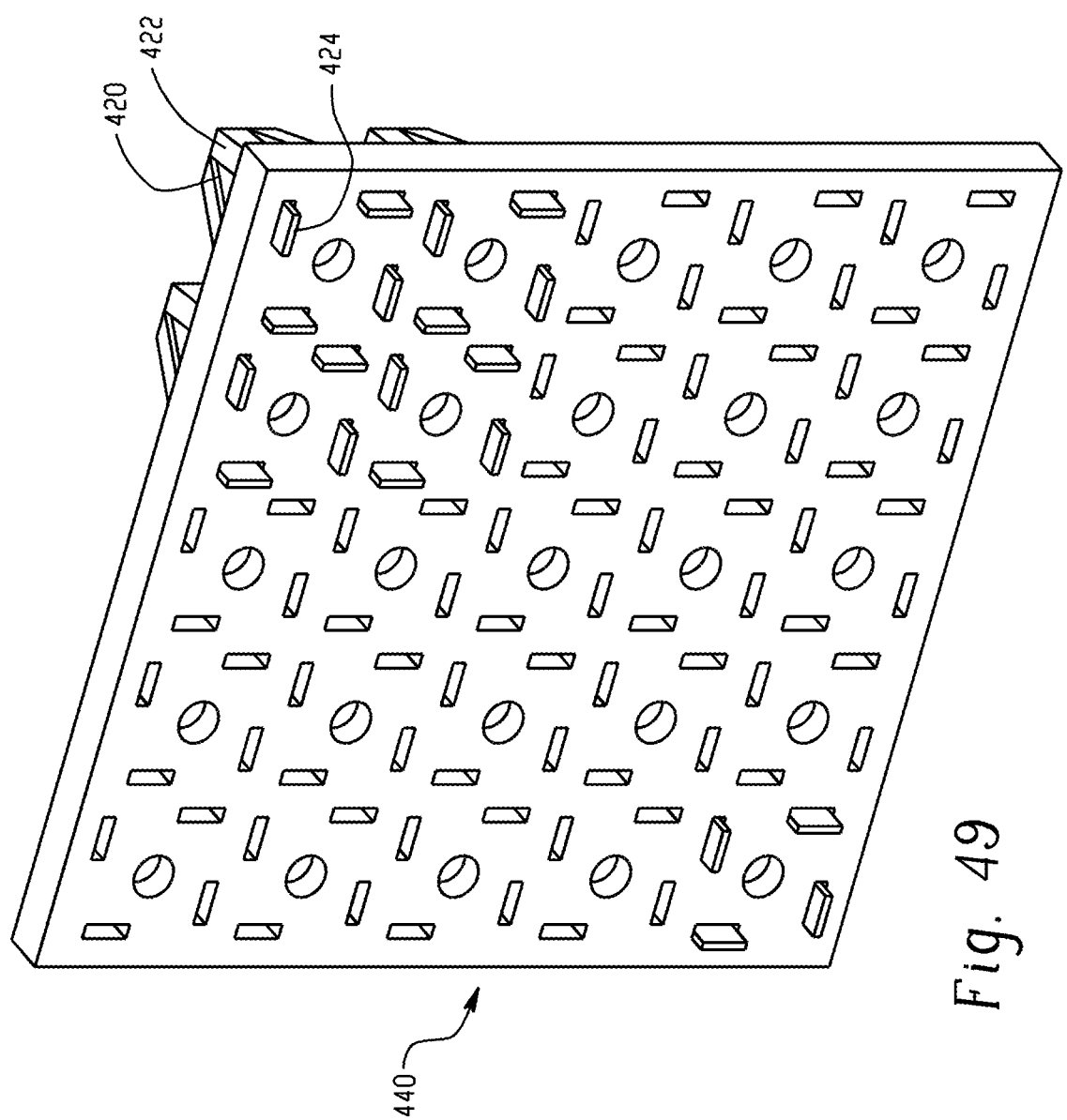

The electrically conductive tapered plates 420 are supported by the dielectric structure 422 shown in FIGS. 43 and 44. This structure has four (for the illustrative four-sided faceted projection) tapered (e.g. "V"-shaped) receptacles 430 (labeled in FIG. 43) into which four respective electrically conductive tapered plates 420 mate. The mating is by the "V"-shaped (or more generally, tapered) receptacles 430 capturing the edges of the electrically conductive "V"-shaped (more generally, tapered) plates 420, allowing the electrically conductive tapered plates 420 to slide in as shown in alternative perspective views of FIGS. 45 and 46. The electrically conductive tapered plates 420 thus define the facets of the electrically conductive tapered projection 400. As seen in FIGS. 44 and 46, the bottom of the dielectric structure 422 has two nubs 432 to prevent rotation once mounted to an interface board 440 (shown in isolation in FIG. 47) with matched locating holes 442. Additionally, there is a hole 444 in the center that can be threaded to receive a screw, or smooth for a rivet. The fastener used at this hole goes from the back of the interface board, into the supporting structure, rigidly holding the entire assembly together. Once assembled, the system has the appearance of FIG. 48 which shows five electrically conductive tapered projections 420, 422 mounted on the topside, and FIG. 49 which shows the backside with the tabs 424 protruding.

Benefits of this plate-based approach include that it is interchangeable with the a solid projection design, permitting the choice of solid or plate-based projection type to be made for each application. Additionally, the plate design configuration is lighter and has significantly less material cost than the solid projection or hollowed projection approaches. The dielectric support 422 can be formed by an injection molding process for high manufacturing volume, or via additive manufacturing at low manufacturing volume. The assembly time is increased slightly due to the step of inserting the plates into the supporting structures. One RF performance benefit is that the plates, being electrically isolated, can provide higher cross polarization isolation as compared with a solid or hollowed out projection in which there are conductive paths between the facets.

In the preceding example the internal structure (i.e., dielectric support 422) was required to support the plates 420. However, the complete isolation of individual sides of the faceted electrically conductive tapered projections has been shown in experimentation to lead to mechanical resonances that can decrease RF performance. To address these issues, in the following some illustrative configurations are disclosed to provide a freestanding projections that needs no internal structure. These electrically conductive tapered projections are fabricated using sheet goods, further reducing costs. Any of the examples could be attached at the edges over the entire length or at points through applying solder or creating a tabbed connection where a tab located on one face slides into a cut on the adjacent space. The point-based soldering solutions could be ideal in that it eliminates mechanical resonances by rigidly attaching the faces, while still permitting a great deal of cross polarization isolation.

Some illustrative examples that follow show the projection coming to a point for simplicity. However, coming to a point is not necessary, and for mechanical strength or ease of fabrication the top of the protrusion can be a shaped matched to the bottom of the protrusion, but smaller in size.

Figure 51:
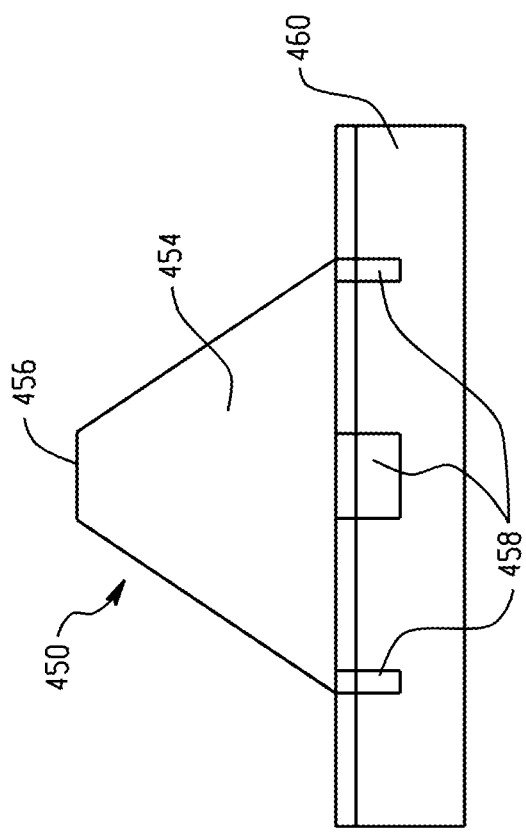
Figure 50:
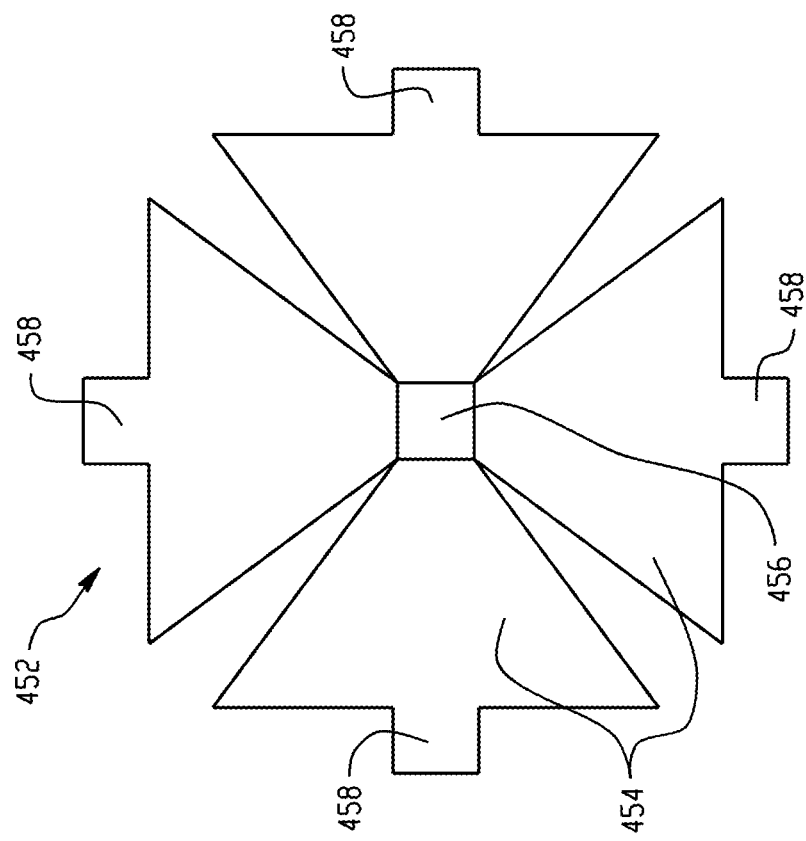

An example is shown in FIGS. 50 and 51. In this example, FIG. 51 shows a faceted electrically conductive tapered projection 450 that is formed by folding a single-piece cut-out 452 from a metal sheet as shown in FIG. 50. As best seen prior to folding in FIG. 50, the cut-out 452 includes the four facets 454 (in this example) which meet at a small square apex facet 456 (or, alternatively, at an apex point as seen in alternative embodiments of FIGS. 52-54). The facets 454 of the single-piece cut-out 452 are folded at their junctions with the apex facet 456 (or apex point) to form the faceted electrically conductive tapered projection 450. Each facet 454 includes a tab 458 distal from its junction with the apex facet 456 (or apex point) that mates into an interface board 460 as seen in FIG. 51, to electrically connect with the RF circuitry. In the assembled projection 450 of FIG. 51, edges of the neighboring facets 454 may optionally be connected by soldering or by mating tabs (features not shown in FIGS. 50 and 51). As just noted, the apex facet 456 is optional but can add mechanical strength (if the apex facet 456 is omitted then the four facets come together at an apex point).

With reference to FIG. 52, a variant embodiment is shown, with the faceted electrically conductive tapered projection 470 shown in the bottom part of FIG. 52 and the corresponding single-piece cut-out 472 shown in the top part of FIG. 52. This embodiment omits the apex facet 456 of the embodiment of FIGS. 50 and 51, so that the four facets 474 of this embodiment come to a point. Additionally, the tabs 458 of the embodiment of FIGS. 50 and 51 are omitted, and in their place a bottom plate 476 is attached to one of the facets 474 in the cut-out. The bottom plate 476 has an opening 477 for capturing a fastener 478, such as a bolt head or a rivet. If a bolt is used, attachment is performed before completion of the folding because once the folding is completed the inside of the projection 470 is not accessible. Once folded the projection 470 can be soldered at points or along the entire edge, or a tabbed connection could be used (features not shown). Alternatively, the bottom edges of the facets 474 could be soldered to an interface board, or the bottoms could fold to create a tab that rests on top of the interface board. This variant is lightweight. It can provide good cross-polarization isolation. However, the nature of the folding could result in variabilities in RF performance since there is no mechanical connection. Additionally, as shown in FIG. 52 with a single screw, the pyramid could rotate if only a pressure fit is used to electrically attach the faces. Having two screws fasten the bottom plate 476 would double the number of attachment steps but eliminate the rotation issue. In this embodiment a PCB is suitably used for the interface board to provide for electrical connection to the projection 470. Furthermore, variations are contemplated such as providing a bottom plate on more than one of the facets 474, so when folded the bottom is replicated, thus adding rigidity and consistency at a penalty of material weight and cost.

With reference to FIG. 53, another illustrative faceted electrically conductive tapered projection 480 is shown in the bottom part of FIG. 53 and the corresponding single-piece cut-out 482 shown in the top part of FIG. 53. This embodiment is similar to that of FIGS. 50 and 51 and includes the four facets 454 with the tabs 458; but the apex facet 456 is omitted, so that the four (side) facets come to a point. It should also be noted that further variants are contemplated, such as replacing the apex facet 456 of the embodiment of FIGS. 50 and 51 with a rounded apex, for example formed by a drawing operation. Regarding the tabs 458 of the embodiments of FIGS. 50 and 51 and 53, the tabs 458 are bent to meet the interface board 460 at a 90-degree angle when the projection 480 is bent into its final shape (e.g., as in FIG. 51 and the bottom of FIG. 53). The tabs 458 can be soldered to electrical traces of the interface board 460 when the interface board 460 is a printed circuit board (PCB). This permits a strong mechanical and electrical connection of the electrically conductive tapered projection 450, 480 to the interface board 460. Alternatively, the tabs 458 can pass through the interface board and attach to the perpendicular board below. Optionally, neighboring edges of the facets 454 can be joined using solder or a tab and receiver arrangement (not shown). This method improves on the flat bottom version in that it has reduced weight and requires no mechanical connection other than the joining of the tab to a PCB. The use of the tabs 458 reduces assembly time and overall system Size, Weight, Power, and Cost (SWAP-C) compared to the approach of using the bottom plate 476 as in the embodiment of FIG. 52.

With reference to FIG. 54, another illustrative faceted electrically conductive tapered projection 490 is shown in the bottom part of FIG. 53 and the corresponding single-piece cut-out 492 shown in the top part of FIG. 53. This embodiment employs four facets 494 each with a tab 498 offset-positioned at a corner of the facet 494. Here the interface board 460 has a thickness at least the depth of the triangular facet 494 added to the tab. While the illustrative tab 498 is offset to one side, it could alternatively be in the middle with a triangle added to either side.

Figure 55:
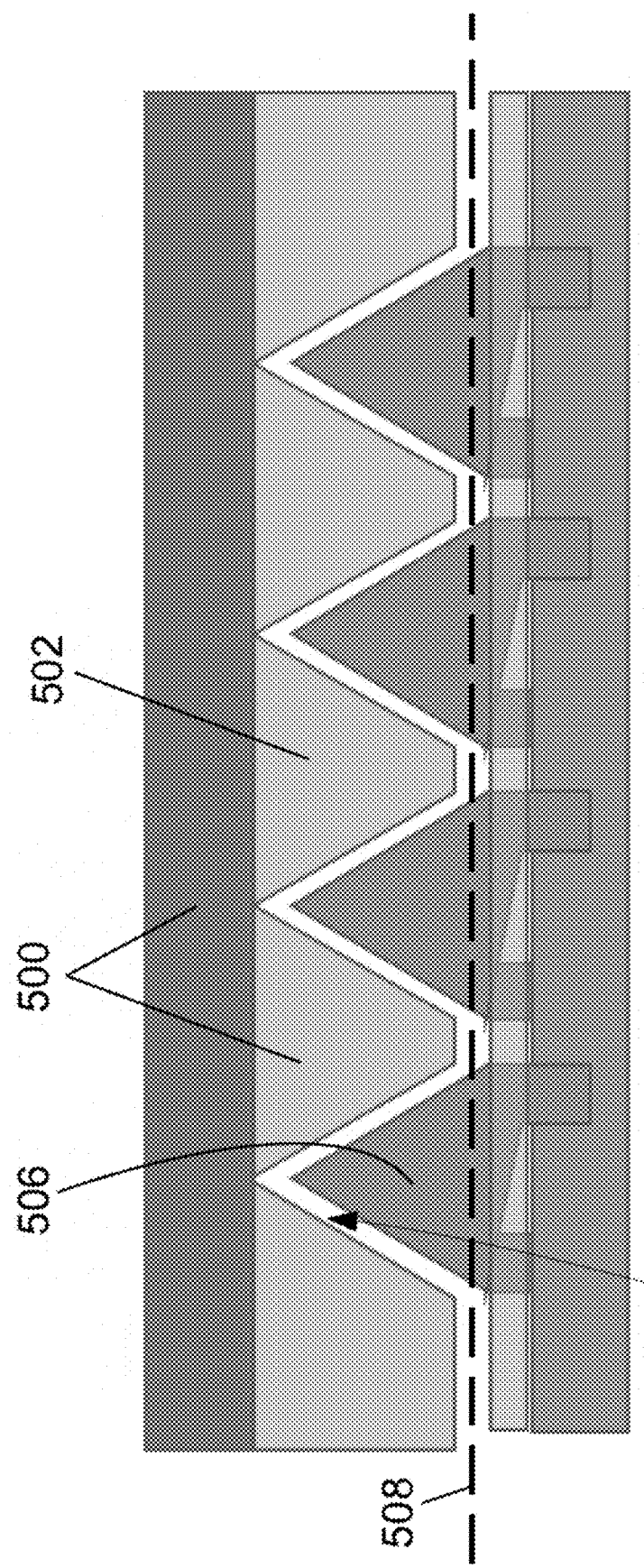
FIG. 55 illustrates an embodiment of electrically conductive tapered projections constructed by punching sheet metal into a radome defining tapered projection forms.

With reference to FIG. 55, an embodiment employing plates with negative (i.e. external) support is disclosed. A DSA may include a radome (i.e., a structural enclosure that may optionally be weatherproof) to protect the electrically conductive tapered projections and provide a safe surface for external contact. In this embodiment, a radome 500 includes or defines a form 502 with tapered projection-shaped recesses 504. To construct electrically conductive tapered projections 506, a sheet of metal is laid on top of the form 502 (e.g. at a position diagrammatically indicated in FIG. 55 by dashed line 508), then a punch is applied to push the sheet metal into the tapered projection-shaped recesses 504. Alternatively, a separate sheet may be punched to form each projection 506. The punch may be shaped in the same cross section as the projections 506. (Note, in diagrammatic FIG. 55, a gap is shown between the surfaces of the tapered projection-shaped recesses 504 and the projections 506 in order to distinguish them; however, in actual fabrication the tapered projections 506 will be pressed against and contacting the corresponding surfaces of the tapered projection-shaped recesses 504). This approach has certain benefits. It facilitates automation of DSA assembly. It also provides support for the projections 506 thereby permitting thinner material and a higher level of environmental robustness. The radome 500 should be made of a dielectric material, such as plastic, and can be fabricated by a manufacturing approach such as injection molding or three-dimensional (3D) printing technology. Injection molding can build strong, light and low-cost radomes. Note the form 502 need not be solid and could alternatively be mostly vacant.

In the following, some further illustrative implementations are described, which address an issue recognized herein that the interface board, if metallic (for example, a PCB with a ground plane) can adversely impact RF performance of the DSA.

The DSA architecture works best with no electrically conductive material immediately behind the gap between electrically conductive tapered projections. On the other hand, most radio frequency componentry performs best when mounted proximate to a ground plane, for example on a PCB with a ground plane. To address this issue, some embodiments disclosed herein employ PCBs that are mounted perpendicular to the surface on which the projections are mounted.

In a DSA design such as that of FIG. 2, the projections 20 are mounted directly to the printed circuit board (PCB) 10, and the opposing side of the PCB 10 is used to mount RF componentry (e.g., the chip baluns 30 in the example of FIG. 2). The PCB 10 has at least 2 layers, with conductive traces connecting the protrusions 20 on the 'top' to the baluns 30, and either the inner layer (when more than 2 layers are present) or an outer layer as a flooded ground plane. A flooded ground plane provides a low resistance surface for electricity to flow by filling the surface, to the extent possible, with a conductive material. The ground plane is included to improve RF componentry performance.

Figure 56:
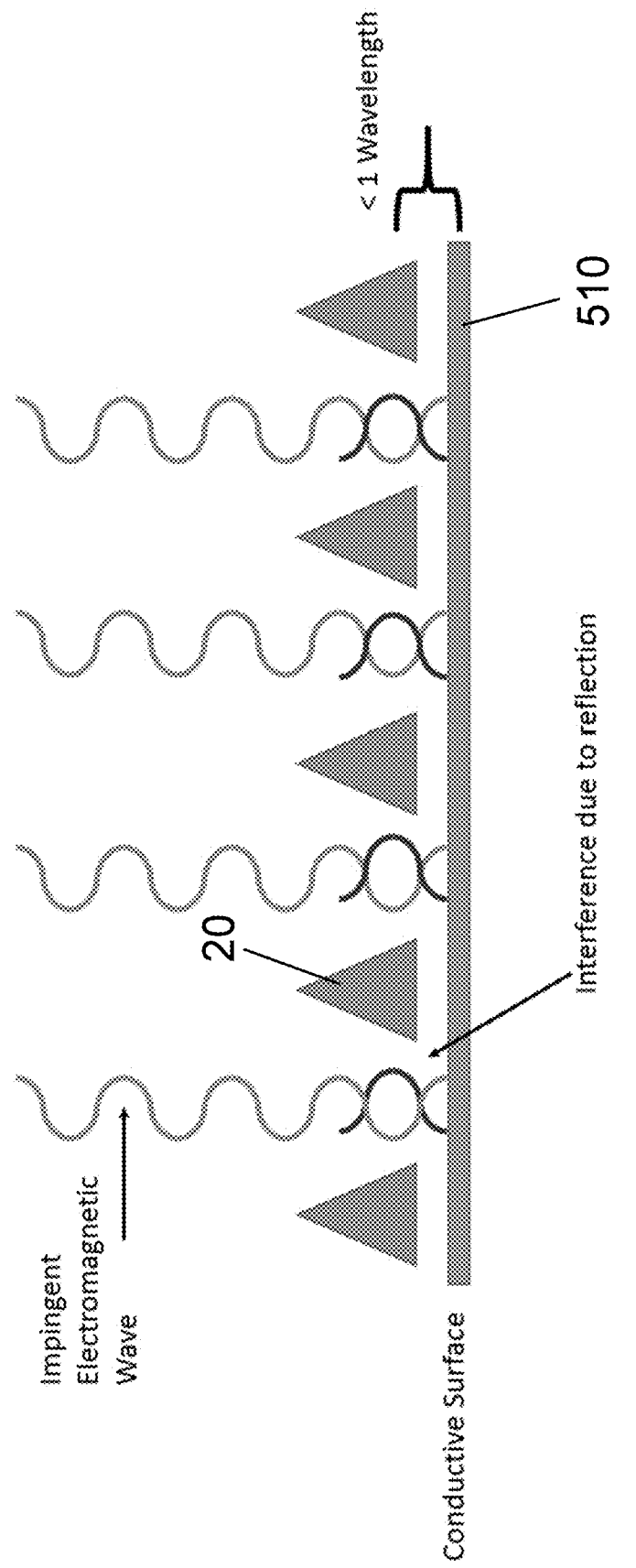
FIG. 56 illustrates potential RF interference in a DSA due to an interface board with a ground plane.

With reference to FIG. 56, this is diagrammatically illustrated by showing the electrically conductive tapered projections 20 and the underlying ground plane 510 (which is part of the PCB 10 of the embodiment of FIG. 2). The ground plane 510, being integral to the same substrate (i.e. PCB 10) to which the projections 20 are mounted, results in an electrically conductive surface being mounted less than one complete wavelength away from the gaps between the protrusions 20 at the bases of the protrusions 20. FIG. 56 diagrammatically shows the resulting RF interference due to the reflection of the incoming radio frequency wave back into the projection space. While the interference can be both constructive or destructive, the overall result is a decrease in wideband performance and an increase in design complexity required to resolve such interference at multiple arrival angles and frequencies.

One solution (not illustrated) is to replace the continuous ground plane with a ground plane extending under the bases of the projections, but not extending between the projections. In such an approach, the RF componentry would be sufficiently miniaturized so that it fits entirely under the bases of the projections. However, this approach would require a complex "grid-like" ground plane and highly miniaturized RF components.

Figure 57:
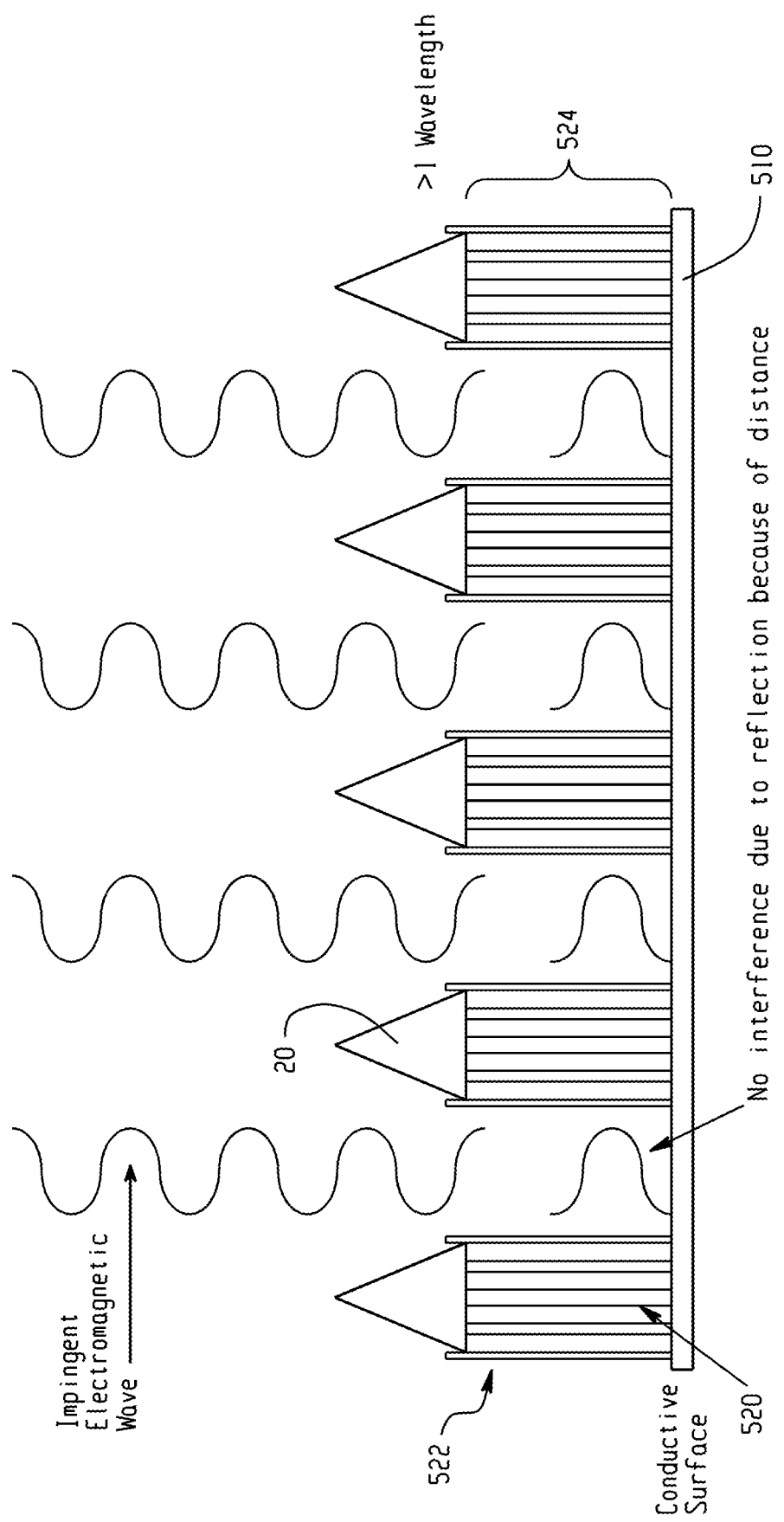
FIG. 57 illustrates an embodiment employing standoffs to mitigate the potential RF interference described with reference to FIG. 56.

With reference to FIG. 57, another solution is illustrated. By moving the conductive surface, i.e., the ground plane 510, further then one wavelength away from the bases of the projections 20, the PCB can be used in an orientation perpendicular to the impingent electromagnetic wave (e.g., as in FIG. 2). This approach involves providing a standoff 520 from the protrusion 20 to the PCB that provides rigid support, and a conductive connection 522 for each face of the projection 20, e.g. four connections 522 when the projection 20 is square or rectangular. In a variant embodiment (not shown), the conductive connections 522 provide the rigid support, so that the separate standoff 522 could optionally be eliminated. The standoffs provide a separation 524 between the bases of the projections 20 and the ground plane 510. This approach is most suitable for higher RF operating frequencies, as for low frequencies the requisite separation 524 becomes large, and this can reduce rigidity and lead to failure under shock and vibration. For example, at 400 MHz, the separation 524 provided by the standoffs would need to be approximately 0.75 meters. By contrast, at 10 GHz the separation 524 provided by the standoffs would only need to be 3 centimeters.

Figure 58:
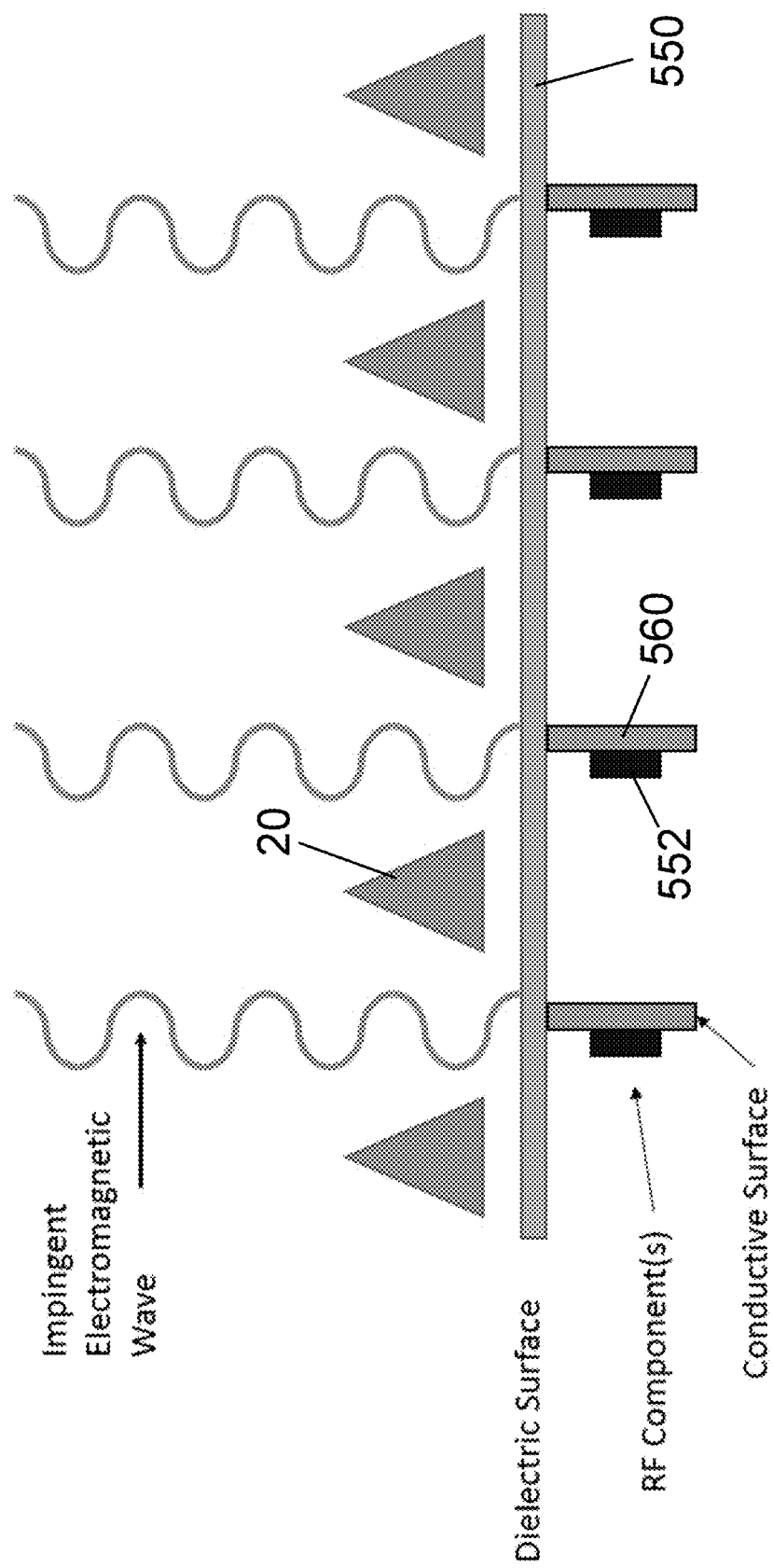
FIGS. 58-63 illustrate embodiments employing RF circuitry comprising perpendicular printed circuit boards (PCBs) to mitigate the potential RF interference described with reference to FIG. 56.

With reference to FIG. 58, another solution is to mount the electrically conductive tapered projections 20 on an electrically non-conductive interface board 550, and to mount the RF componentry 552 on perpendicular printed circuit boards (PCBs) 560 that are oriented perpendicularly to the interface board 550. That is, rather than mounting the projections 20 on an interface board that is a PCB with an electrically conductive ground plane, in the embodiment of FIG. 58 a dielectric substrate interface board 550 is used. A top surface of the dielectric interface board 550 supports the projections 20, and a set of PCBs 560 for supporting the RF componentry 552 are oriented perpendicular to the surface 550. The perpendicular PCBs 560 contain or support the RF components 552 mounted over ground planes of the PCBs 560. In one embodiment (shown in FIG. 58) there is a perpendicular PCB 560 located between each row of projections 20. In another embodiment (not shown) there is one perpendicular PCB underlying each row of projections. Placing the perpendicular PCBs 560 between the rows of projections 20 is well-suited for operating the DSA in a differential mode.

The interface board 550 can be manufactured of any rigid, or semi-rigid dielectric material, such as plastic (e.g., Acrylonitrile butadiene styrene, i.e. ABS). Alternatively, the interface board 550 can be a printed circuit board (PCB), but one that does not include a continuous ground plane. Using a PCB without a ground plane, but with electrically conductive traces, as the interface board 550 permits easier connection of signals between the projections 20 to the connections with the perpendicular PCBs 560 (which do have ground planes). In one approach, the connections to the perpendicular PCBs 560 employs card edge connectors. Using a PCB without a ground plane as the interface board 550 also permits the edges to be terminated with a load directly on the PCB, simplifying design. However, utilizing a PCB without a ground plane as the interface board 550 raises the cost over using a sheet of dielectric material. The sheet dielectric can be made to capture the perpendicular PCBs via various fastening configurations, such as screw holes with a corresponding right angle bracket, edge connectors, tenons, or so forth. Another option is to create a mount for the projections 20 which attaches the projection 20, mount and surface through a screw, rivet, or the like, and the mount mechanically and electrically attaches to the perpendicular PCBs 560. The mount may be soldered or compression type, optionally aided by a screw.

In some embodiments, the interface board 550 forms part of a housing for the DSA, for example the interface board 550 can be one side of a five-sided box enclosure housing. The front surface mounts the protrusions and an optional radome, while the bottom has connection points for an optional backside cover. (See FIGS. 64 and 65).

Figure 59:
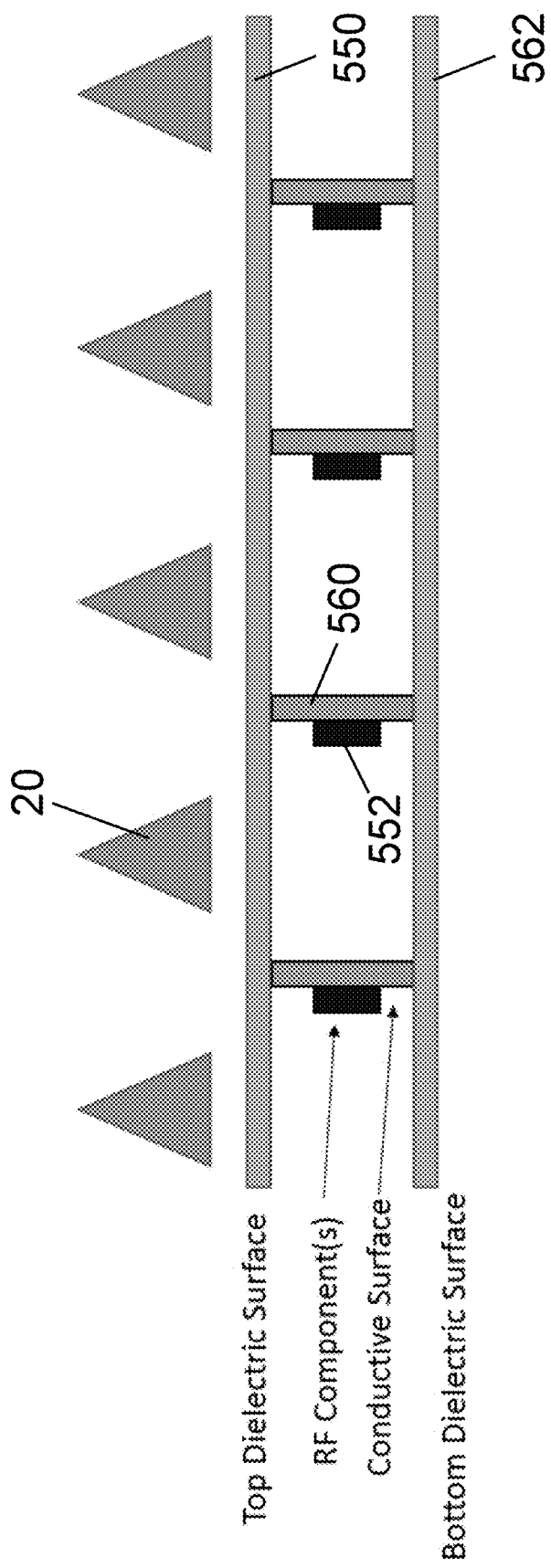

In some embodiments, edges of the perpendicular PCBs 560 are secured to the interface board 550. In this arrangement, the perpendicular boards 560 are subject to stress when under shock or vibration. These stresses can be relieved by the rigid mounting to the interface board 550, and/or by inclusion of a second support board 562 oriented parallel with the interface board 550 to secure the edges of the perpendicular boards 560 distal from the interface board 550, as shown in FIG. 59. The second support board 562 should also not contain a ground plane, unless the perpendicular boards 560 are of sufficient size to position the second support board 562 more than one RF wavelength away from the bases of the projections 20.

Figure 60:
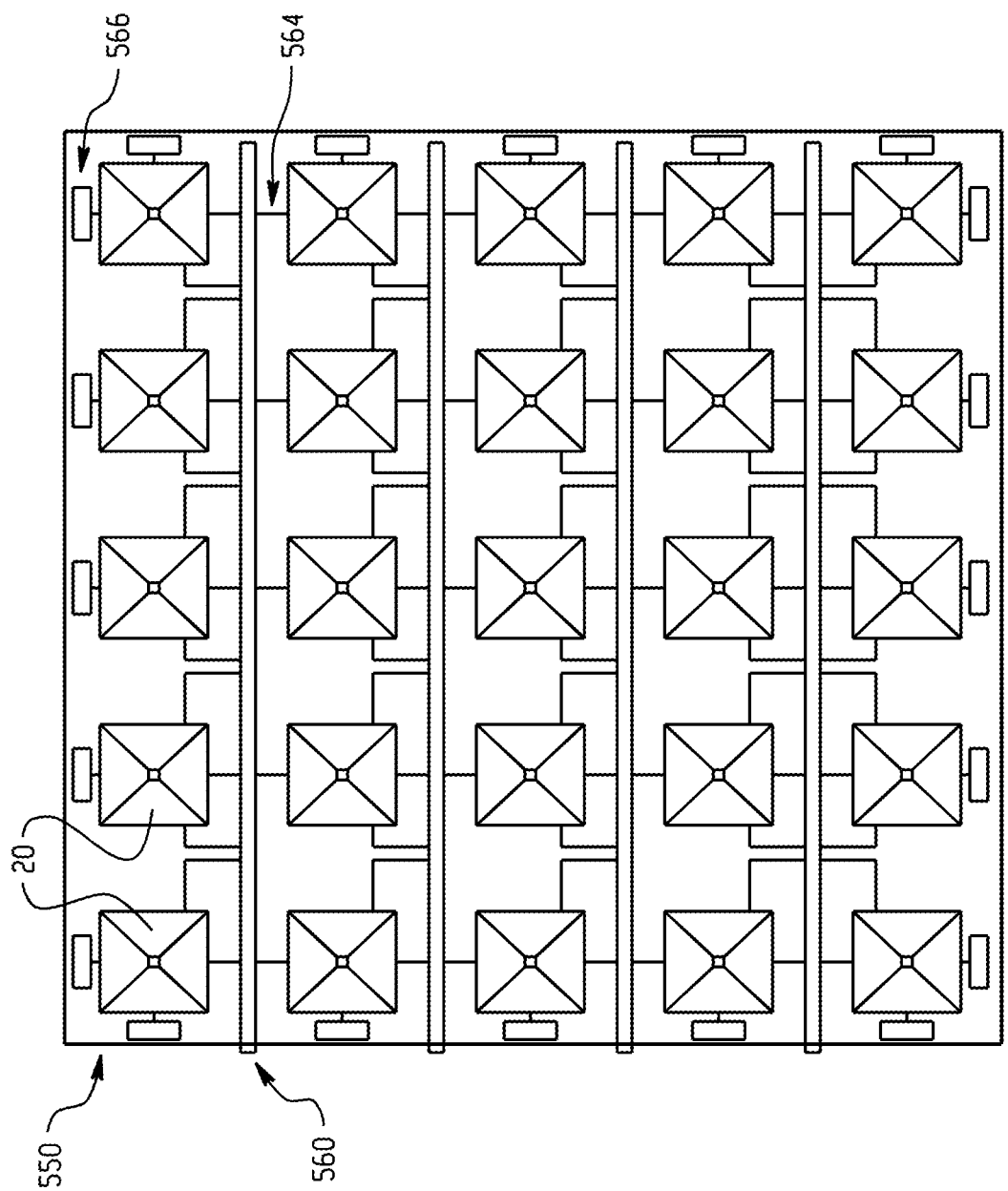

FIG. 60 shows a plan-view of a DSA incorporating the concepts described in FIG. 58. Here the upper surface of the interface board 550 is a PCB (without a ground plane) enabling interconnections 564 of the perpendicular row boards 560 to columns of projections 20, and optional edge terminations 566. The design of FIG. 60 can also optionally include the second support board 562 (occluded from view in FIG. 60), which can improve mechanical rigidity of the assembly so as to improve robustness against shock and vibration. If the second support board 562 is included, then it can optionally include additional routing of electrical connections between the perpendicular row boards 560, simplifying the connection to further signal chain elements. As previously noted, if the perpendicular boards 560 are of sufficient size to position the second support board 562 more than one RF wavelength away from the bases of the projections 20, then the second support board 562 may also include a ground plane and RF componentry.

Figure 61:
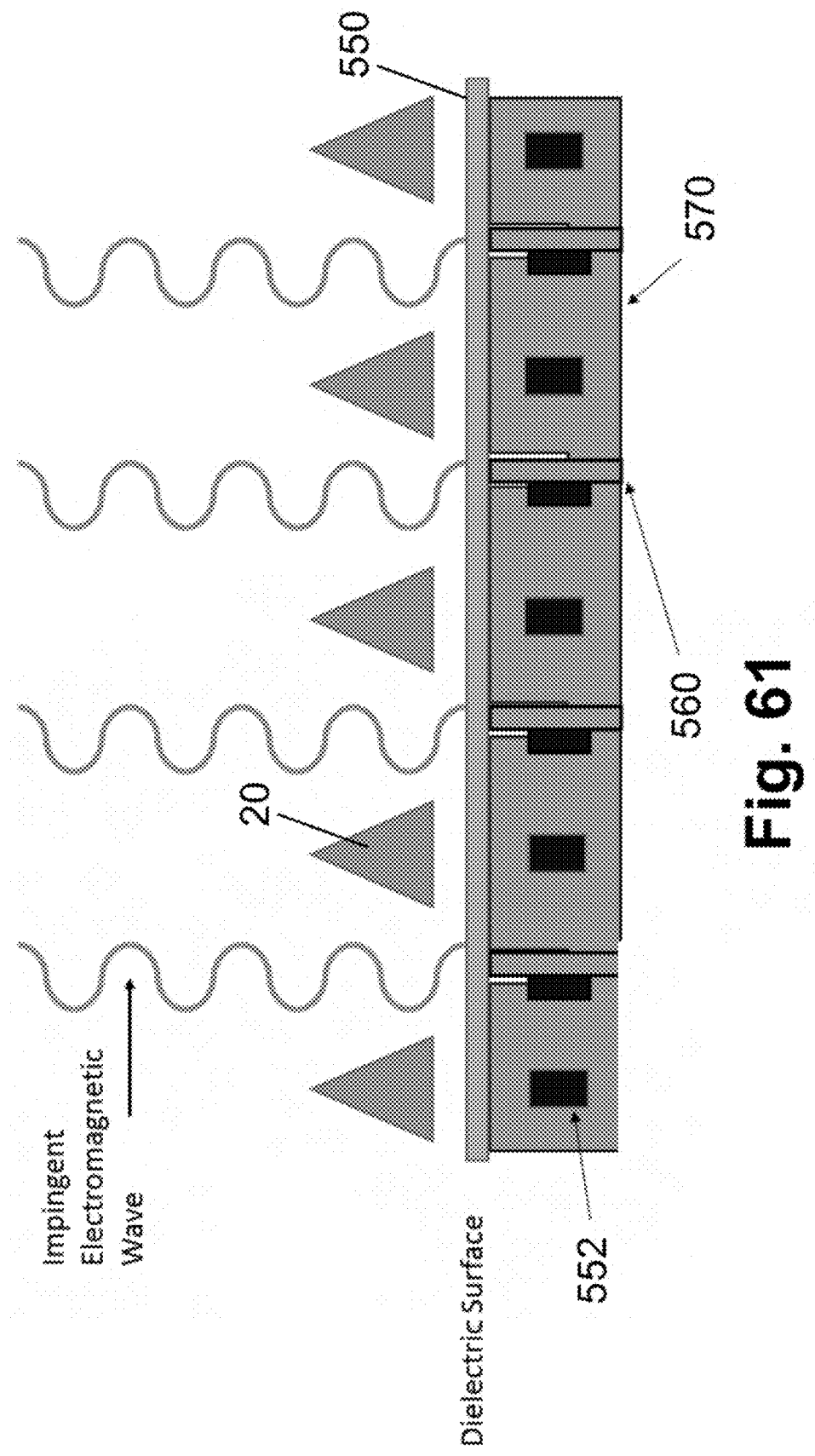
Figure 62:
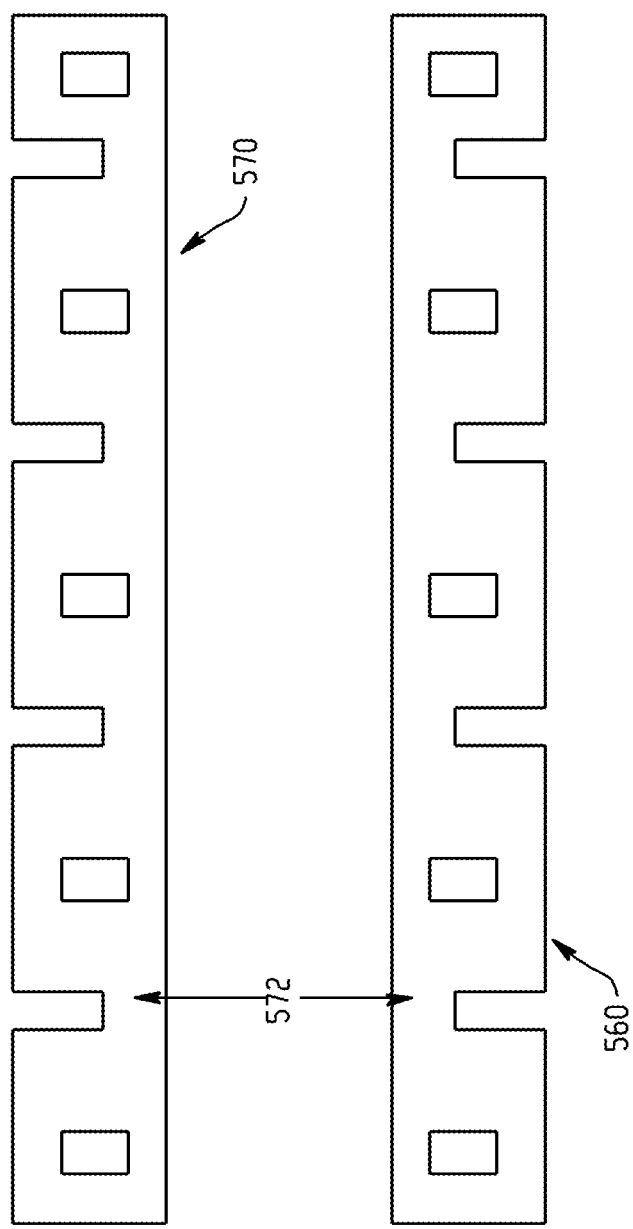
Figure 63:
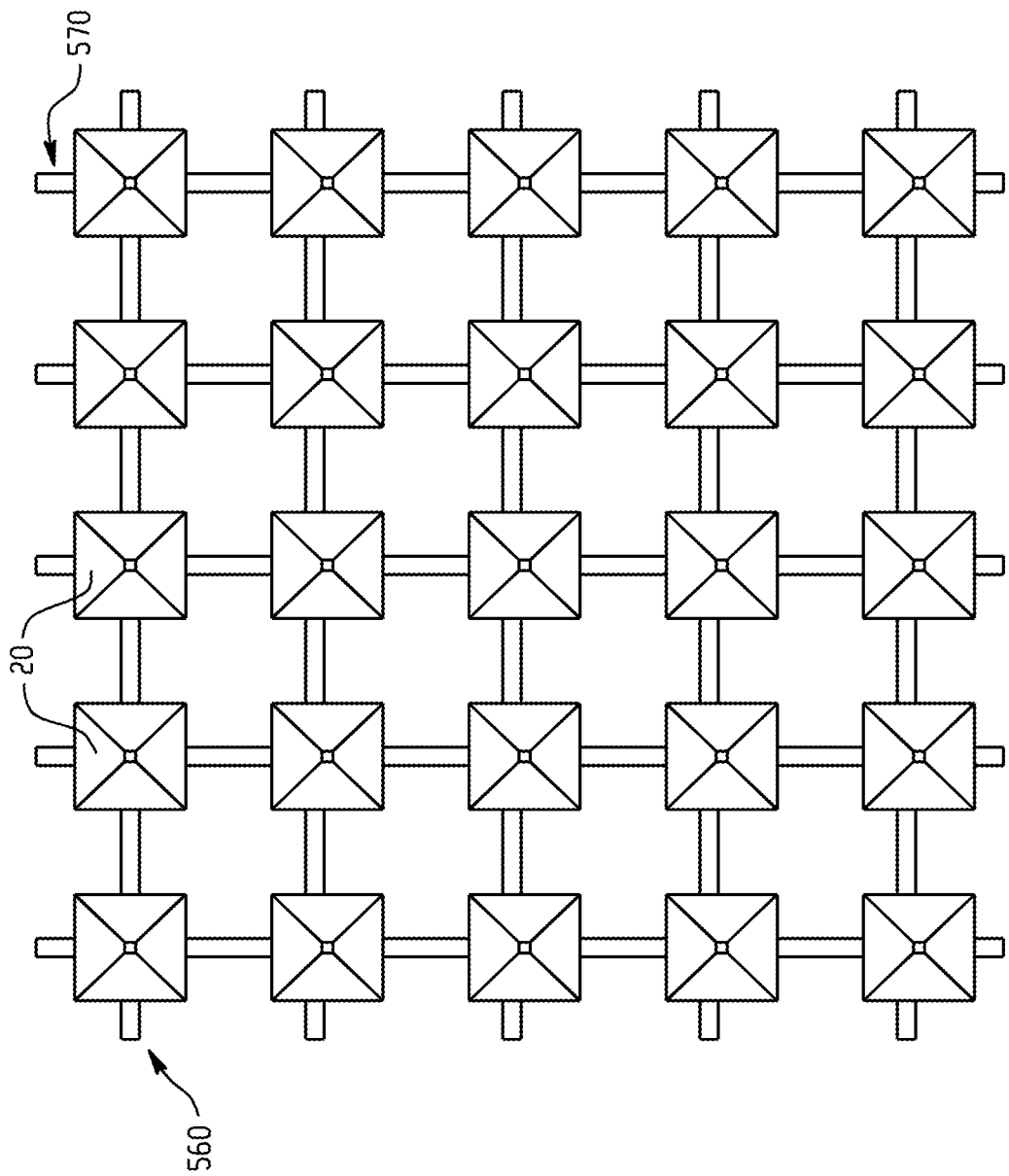

With reference to FIGS. 61-63, in another embodiment two orthogonal sets of perpendicular boards 560, 570 are provided. The set of perpendicular boards 560 (also referred to as "row boards") are perpendicular to the interface board 550, while another set of perpendicular boards 570 (also referred to as "column boards") are perpendicular to the interface board 550 and are also perpendicular to the row boards 560. In this embodiment, the row boards 560 and column boards 570 include cutouts 572 to enable the row and column boards 560, 570 to mate together to form a two-dimensional grid of perpendicular boards 560, 570 all of which are perpendicular to the interface board 550. This facilitates providing electrical connections to both rows and columns of projections 20, and the grid of intermeshed row and column boards 560, 570 provides additional rigidity to the assembly. The cutouts 572 allow the crossing row and column PCBs 560, 570 to cross and intermesh. If the cutouts 572 are mechanically affixed when assembled (e.g. by glue), or have an interference fit, then the assembly becomes a self-supporting two-dimensional grid. Although not shown in FIGS. 61-63, the second support board 562 of the embodiment of FIG. 59 can also be included to further enhance rigidity. The benefits of this method of using crossing row and column perpendicular boards 560, 570 include that it simplifies electrical connection to both rows and columns of projections 20, improves rigidity of the assembly, and optionally allows for omitting the second support board 562 (due to the improved rigidity provided by the intermeshing row and column boards 560, 570). Again, the interface board 550 can be made of any electrically non-conducting material, or can be a PCB without a flood fill (that is, without a continuous ground plane). However, the use of both column and row boards 560, 570 can alleviate the need for electrical conductors on the interface board 550, thus enabling the interface board 550 to be a simple dielectric board with no printed circuitry.

Figure 64:
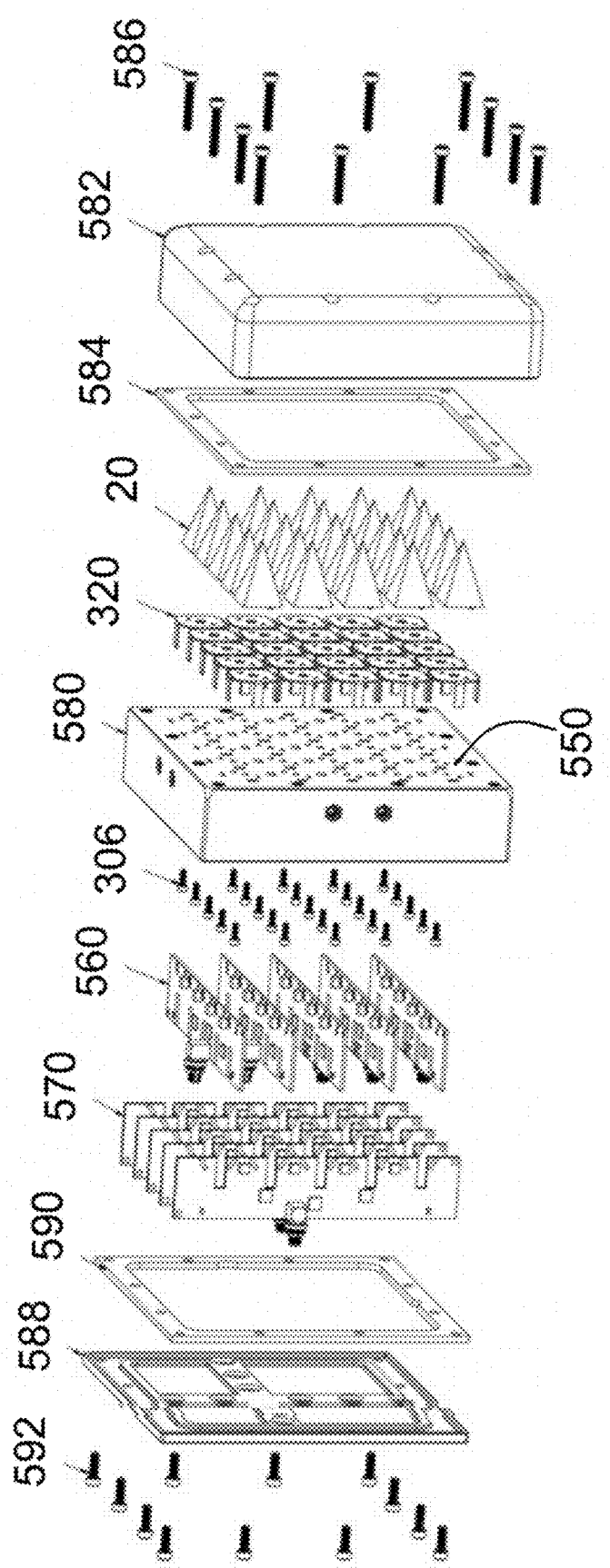
FIG. 64 illustrates an exploded view of a DSA including a radome and perpendicular PCBs as described with reference to FIGS. 58-63.
Figure 65:
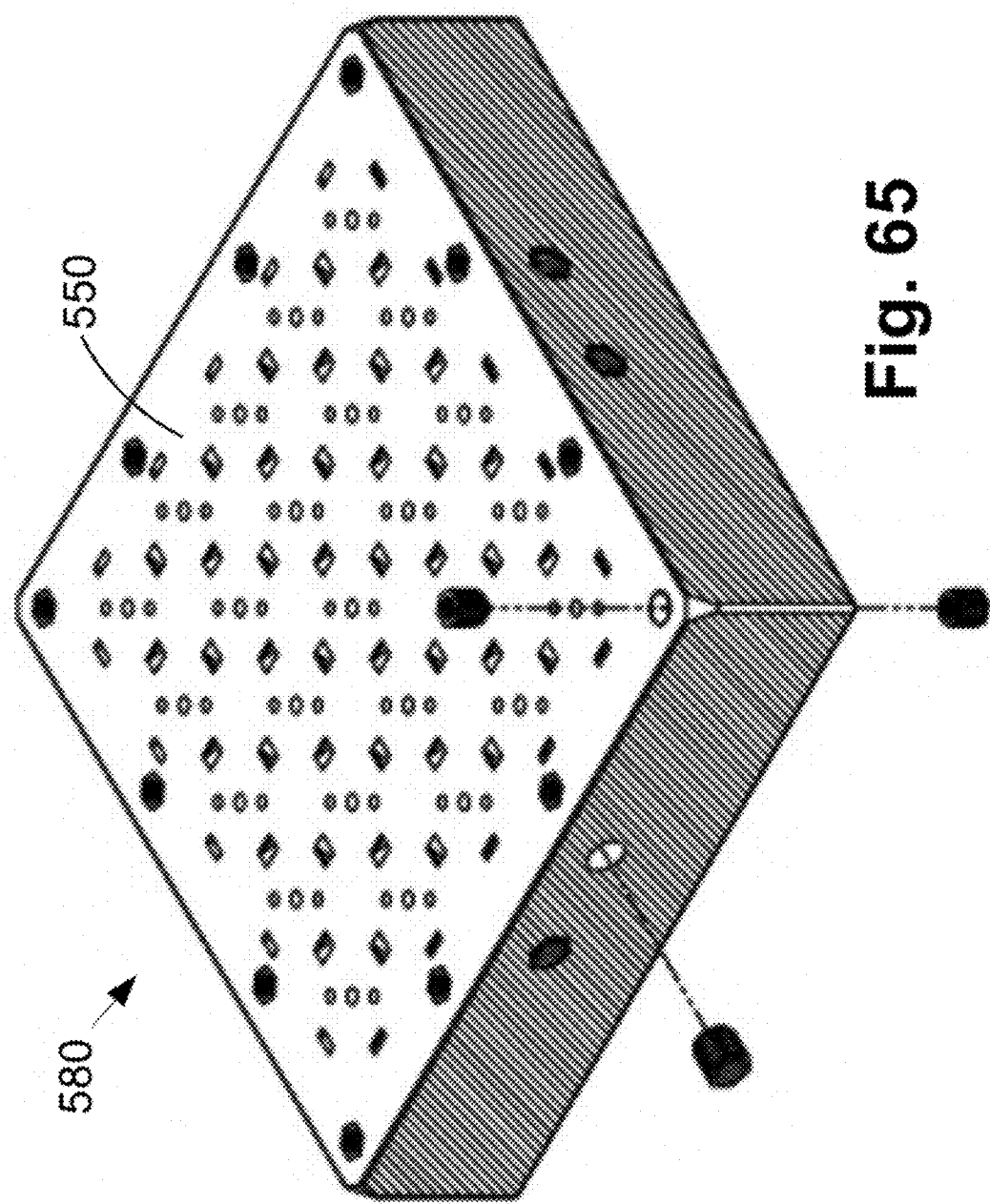
FIG. 65 illustrates the five-sided housing or enclosure of the DSA embodiment of FIG. 64.

With reference to FIGS. 64 and 65, a complete DSA assembly including the embodiment of FIGS. 61-63 is shown. FIG. 64 shows an exploded perspective view of the DSA assembly. This embodiment does not include the second support board 562. In the DSA assembly of FIG. 64, the interface board 550 is a front surface of a five-sided housing or enclosure 580, which is shown in isolation in FIG. 65. The protrusions 20 are disposed on respective mounts 320 (he mounts 320 were previously illustrated in, and described with reference to, FIG. 34) secured by screws 306 (as previously illustrated in, and described with reference to, FIG. 36). The DSA assembly of FIG. 64 further includes a radome 582 with associated gasket 584. The radome 582 fits over the electrically conductive tapered projections 20 and over a portion or all of the enclosure or housing 580, and is secured by fasteners 586. On the backside of the enclosure or housing 580, a rear cover or support 588 and associated gasket 590 is provided, and secured to the DSA assembly by fasteners 592. This design utilizes the interface board 550 as a dielectric surface that also forms the front face of the five-sized housing 580 (see also FIG. 65). The housing 580 contains grooves on the internal faces (not shown) that capture the edges of the perpendicular boards 560, 570, thereby increasing shock and vibration survivability. The interface board 550 (and optionally the entire housing 580) may be a single-piece plastic component, for example fabricated by additive manufacturing or injection molding. As noted, the projections 20 connect to respective mounts 320 which then mechanically and electrically attach to the row and column boards 560, 570. The mounts 320 can be made from stamped metal, which significantly decreases the material and fabrication cost of the projections 20.

The DSA designs disclosed herein can be employed with a wide range of RF componentry configurations. In the following, some illustrative signal chains suitably used with the disclosed DSAs are presented.

Figure 66:
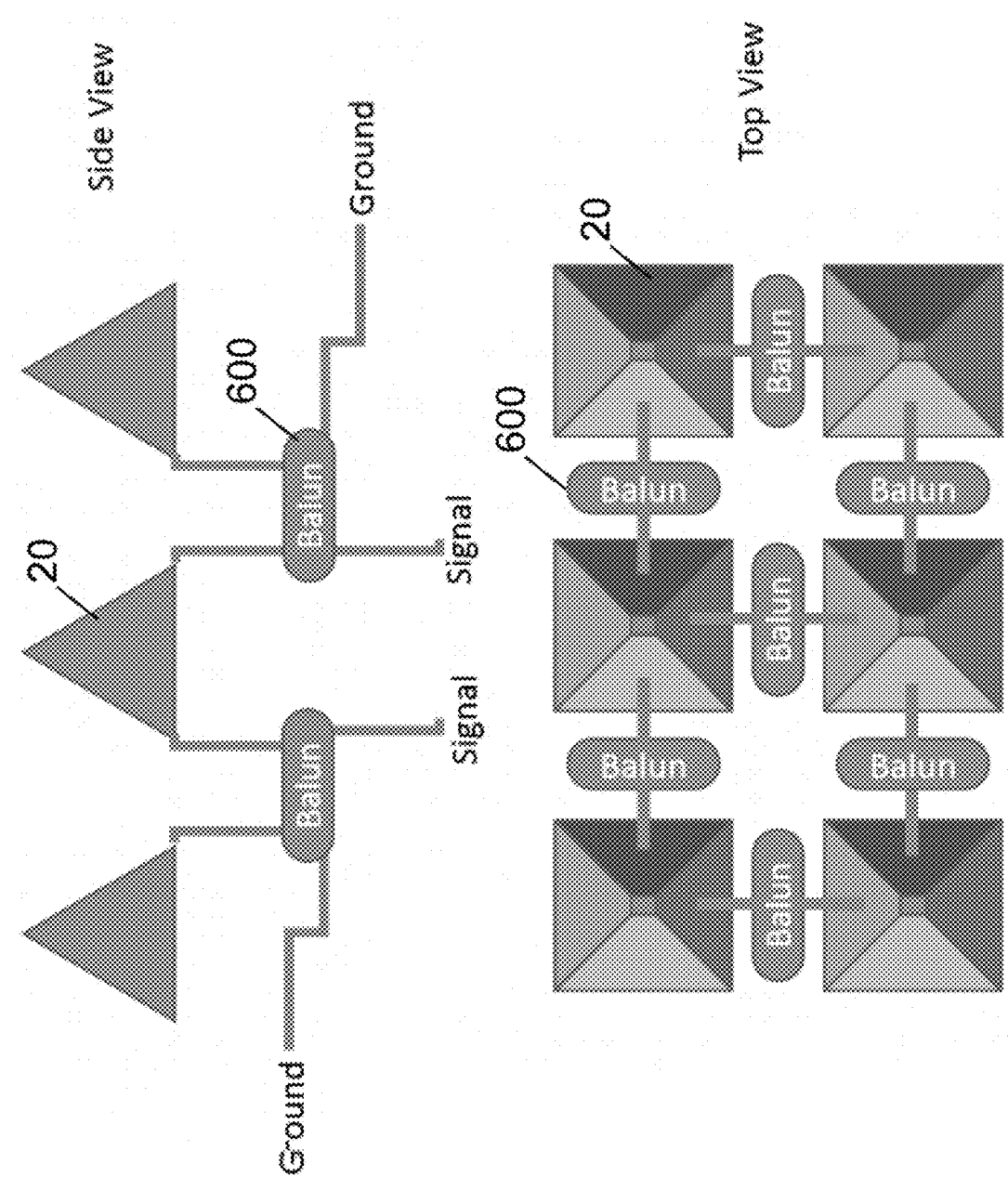
FIGS. 66-81 illustrate various embodiments of RF circuitry suitably used with DSA embodiments disclosed herein.

The DSA interfaces with free space for electromagnetic capture and/or launch (depending on application) in a differential mode, which means that it works off a difference in RF signal between two points. Most commercial off-the-shelf RF circuitry assumes a single ended mode of operation where a signal is on a single conductor and is referenced to a ground. The DSA architecture can be made to work with the single ended circuitry through a transformer referred to as a balun (i.e., "balanced-unbalanced). This is illustrated in FIG. 66 showing a side view (upper drawing) and top view (lower drawing). FIG. 66 shows an RF coupling in which baluns 600 connect the electrically conductive tapered projections 20 and convert the differential signal to a single ended signal. FIG. 66 shows a 3×2 DSA configuration (which can be extended to any M×N DSA configuration, where M and N are each integers greater than or equal to one). In this case the electrically conductive tapered projections 20 are four-sided faceted pyramids, and each facet is connected to the opposing facet of a neighboring projection 20 through the differential side of the balun 600. Herein, this space is referred to as a pixel.

Figure 67:
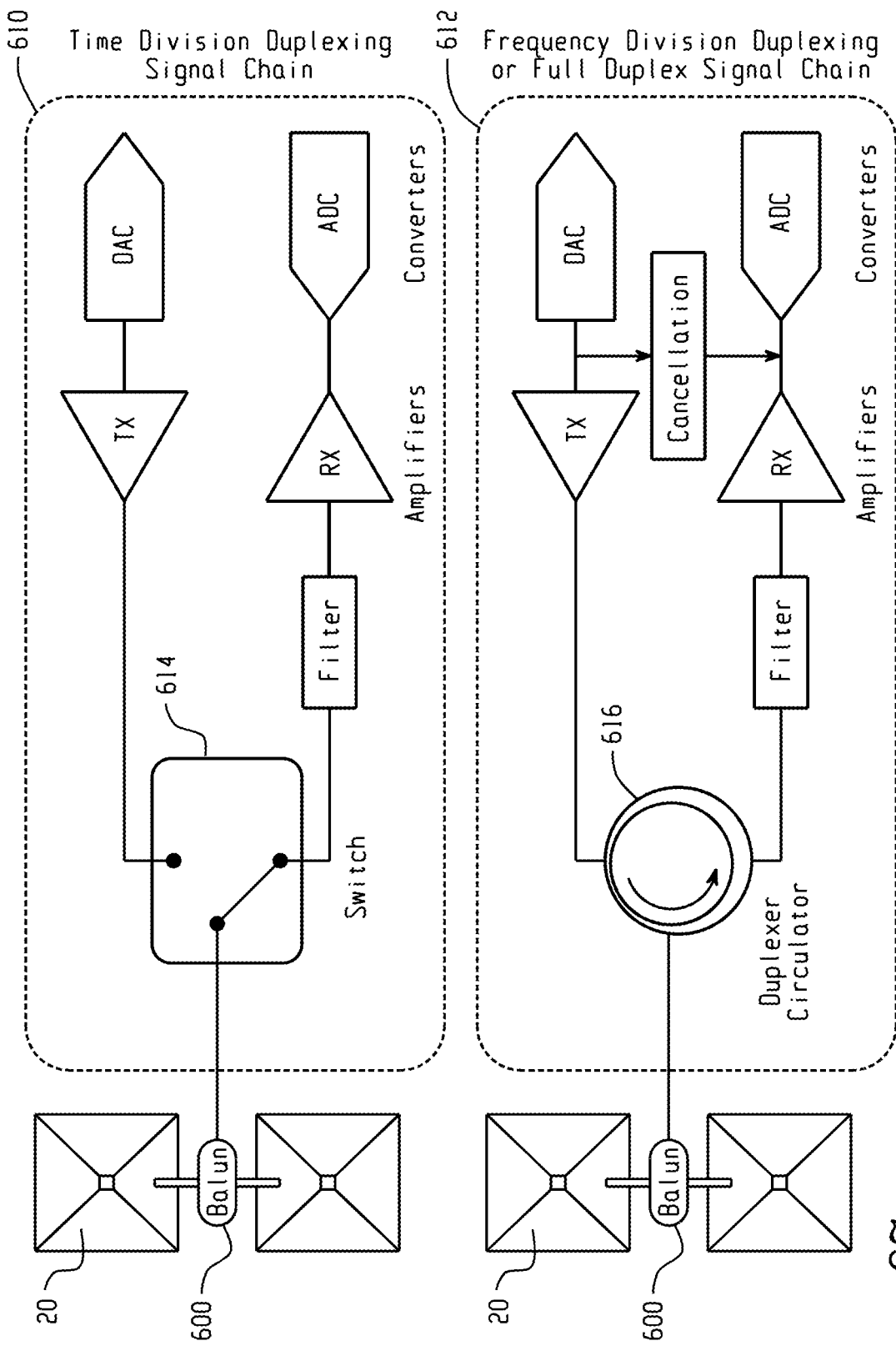

Generally, the baluns are connected to some form of signal chain, two particular embodiments are shown in FIG. 67. The embodiments of FIG. 67 are for a transceiver, i.e. a DSA that provides both transmit (TX) and receive (RX) operations. If only a transmitter, i.e. a DSA that only provides transmit (TX) operation; or only a receiver, i.e. a DSA that provides only receive (RX) operation, is desired, then the switch 614 (upper time-division duplexing signal chain 610) or circulator or duplexer 616 (lower frequency division duplexing or full duplexing signal chain 612) can be omitted, and the unneeded pathway (TX or RX) can be omitted. FIG. 67 also shows the direct attachment of the signal chain 610, 612 to the balun 600, equating a one to one ratio between the number of opposing faces of the projections 20 and signal chains.

The upper part of FIG. 67 shows an example of a signal chain 610 using an RX/TX switch 614. The design of the signal chain 610 does not directly power the receive circuit with the transmit circuit. The switch 614 serves the function of isolating the TX and RX pathways. The circuit 610 cannot both transmit and receive at the same time, often called Time Domain Duplexing (TDD). However, a DSA electrical architecture may have some signal chains 610 operating in RX mode and some signal chains operating in TX mode, simultaneously, to provide both transmit and receive operation at the same time, albeit with a decrease in aperture efficiency. Use of the switch 614 in the signal chain 610 has the benefit that switches are low cost, readily available, can handle high power, and can operate over a wide bandwidth.

The lower part of FIG. 67 shows an example of a signal chain 612 that is capable of operating in either Frequency Division Duplexing (FDD) or Full Duplex (FD). FDD allows simultaneous transmit and receive by transmitting and receiving on separate frequencies and filtering out the transmit frequency from the received signal. Here the switch 614 is replaced by a component 616 such as a diplexer or circulator. A diplexer divides transmit and receive by frequency, whereas a circulator acks like a series of gates permitting the transmit energy to largely avoid reflecting into the RX pathway. The diplexer is not adjustable and requires a designed-in approach to frequency operation (e.g., designated transmit and receive frequencies or frequency bands). Typical commercially available circulators do not exceed approximately 1 GHz (or one octave) in bandwidth. This places constraints on a DSA in using a signal chain such as the illustrative signal chain 612. FD means the signal chain can operate in both transmit and receive modes on the same frequency at the same time, while maintaining isolation of the RX path from the TX path. This is commonly achieved through using different antennas or a circulator, combined with a cancellation circuitry that connects the TX path to the RX path through an inverse signal. The DSA architecture can achieve full duplex operation by having the TX and RX pathways on different sets of projections 20, and thus using different signal chains for each mode, or by including a circulator.

In either TDD, FDD, or FD mode, the signal chain can be varied to support a multitude of different electrical architectures, each with their own SWAP-C/performance tradeoffs.

Figure 68:
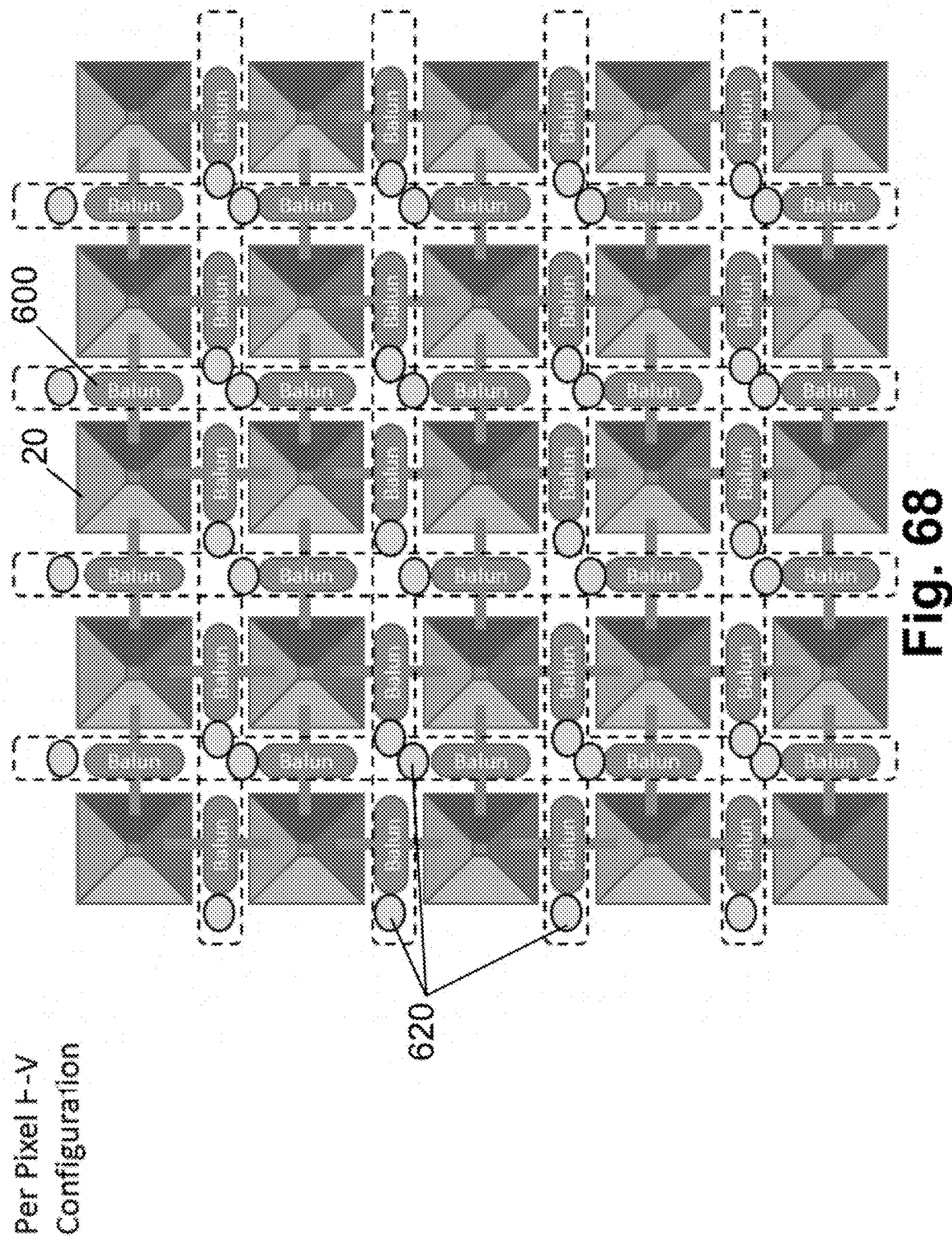

With reference to FIG. 68, an illustrative 4×4 DSA supports up to 40 individual signal chains, where the signal chains are diagrammatically indicated by circles 620 in FIG. 68. There are benefits to this approach, such as the ability to use low power TX amplifiers (often called power amplifiers, PAs), a lower noise floor due to averaging uncorrelated noise of the RX amplifiers (often called low noise amplifiers, LNAs), increased signal dynamic range, aperture subset-ing where a portion of the aperture is dedicated to a function and a different portion dedicated to a different function, and dynamic and arbitrary beam forming and polarization generation. However, this performance comes at a penalty in SWAP-C because each signal chain consumes space and power and raises the cost.

Figure 69:
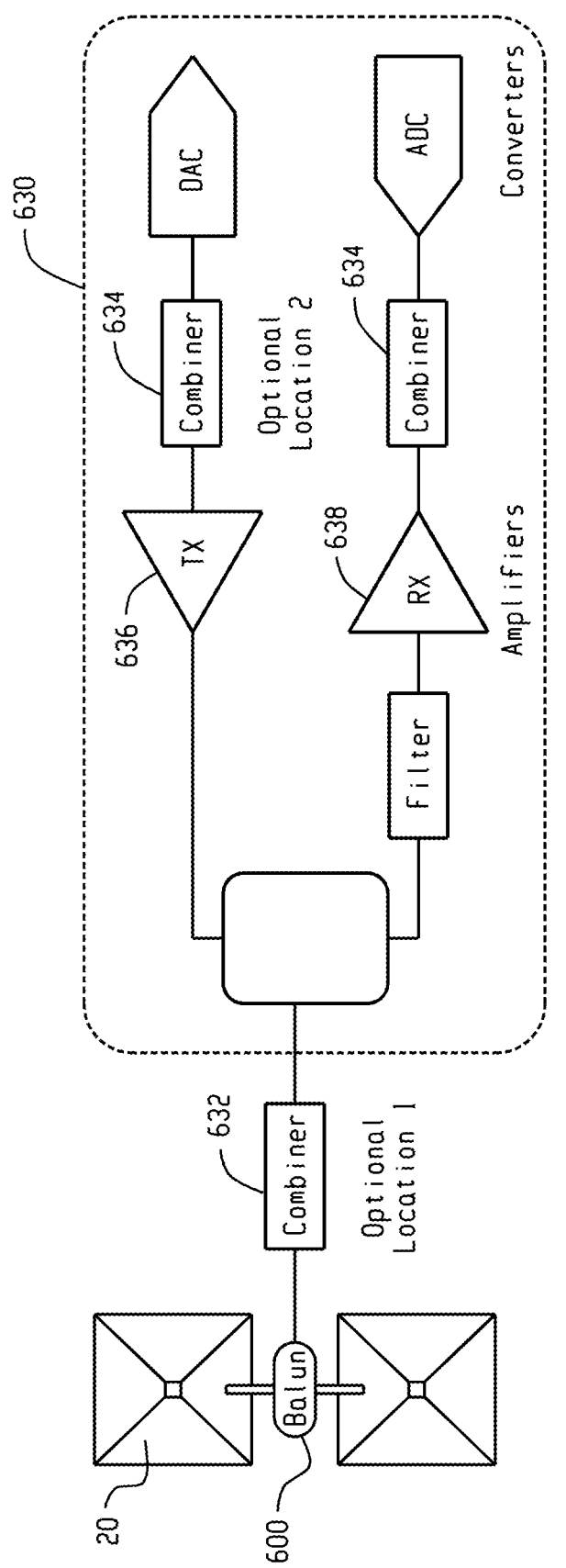

With reference to FIG. 69, it is thus sometimes desirable to combine the signals so that one signal chain supports multiple pixels. One way is to combine the pixels into rows and columns, which maintains multiple polarization operation and beam steering and forming in azimuth and elevation. To combine pixels, a combiner or splitter (e.g., combiner 632 or combiners 634 in the illustrative signal chain 630 of FIG. 69) is inserted into the signal chain at one or more locations in the TX/RX pathways. The combiner 632, 634 is a bidirectional device, meaning current can flow either way, or both ways simultaneously. FIG. 69 shows that a combiner 632 can be placed in between the duplexer and the balun, or alternatively combiners 634 can be placed upstream of a power amplifier (PA) 636 in the TX path and downstream of a low noise amplifier (LNA) 638 in the RX path. (While FIG. 69 shows the combiner 632 coupled with a single illustrative pixel via the illustrated balun 600, more generally the combiner 632 can be coupled with multiple pixels via the respective baluns of the pixels. Likewise, while the illustrative combiners 634 are coupled with a single illustrative pixel via the power amplifier 636 and low noise amplifier 638 of the illustrative pixel, more generally the combiners 634 can be coupled with multiple pixels via the respective components 634, 636 of the pixels.) The first location (i.e. combiner 632) is lower cost, because one combiner 632 is used for both TX and RX pathways; however, this arrangement suffers a performance penalty because the combiner 632 typically has limited power handling capability and inserts a signal reduction (a loss) in the RX pathway. The second location (i.e. combiners 634) doubles the number of combiners required but permits the use of per pixel PAs 636, increasing the overall efficiency of conversion of electrical power to RF power, and allows the LNA 638 to overcome the loss of the combiner 634 on the RX pathway and reduce the overall noise figure of the system since the per pixel thermal noise is uncorrelated and reduces system noise at a ratio proportional to $1/\sqrt{NumberPixels}$. Conversely embodiments employing the combiner 632 use a single LNA 638 for many pixels and receives less noise figure benefit.

The signal chain 630 of FIG. 69 assumes that there are sufficient number of signal chains present to perform beam steering and beam forming, if desired. While some beam forming and steering can be done with two signal chains, four signal chains provides a better performing solution. The highest cost and highest power consuming portion of the signal chain is often the analog to digital conversion, and the digital signal processing required to performing the operations needed for beam steering and forming.

Figure 70:
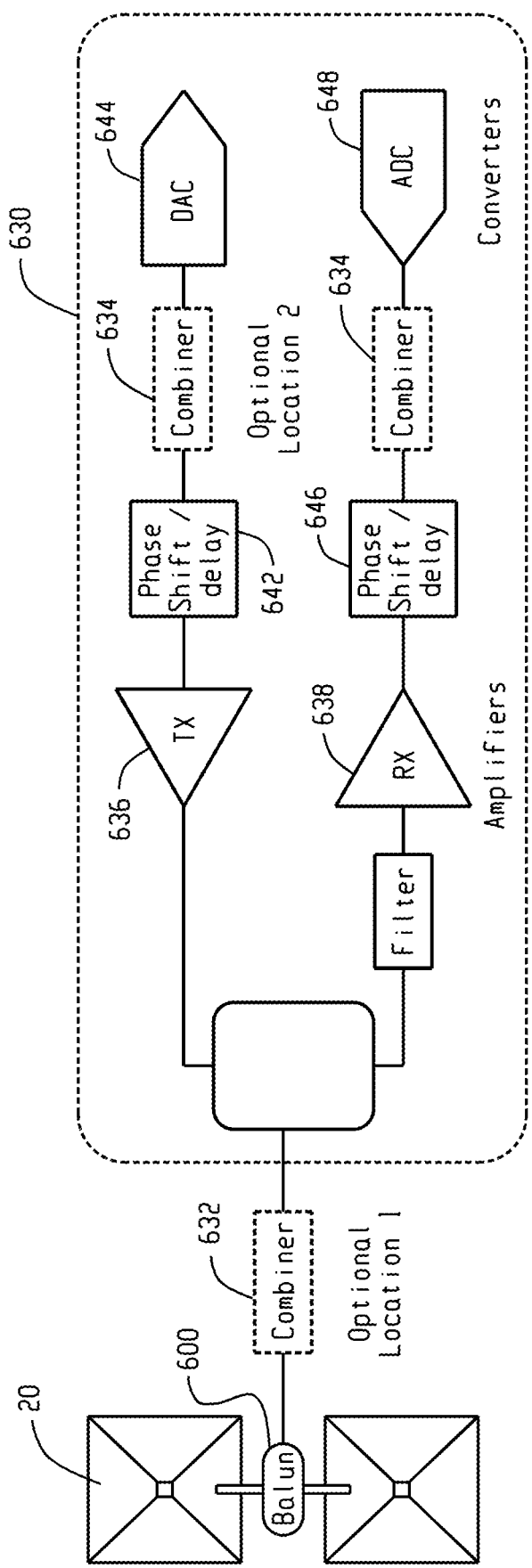

With reference to FIG. 70, a signal chain 640 illustrates one way to reduce system cost. The signal chain 640 includes a phase shifter or time delay 642 downstream of the digital to analog converter (DAC) 644, and a phase shifter or time delay 646 upstream to the analog to digital converter (ADC) 648. This method reduces the number of required signal chains, and in some cases only one signal chain is needed. The tradeoff is that the time shifters or delays 642, 646 can limit wide band operations in some implementations.

In all signal chains shown herein, it is noted that the digital to analog converter optionally can be followed by a mixer that raises the frequency of the signal, and the analog to digital converter optionally can be preceded by a mixer that lowers the frequency of the signal.

Figure 71:
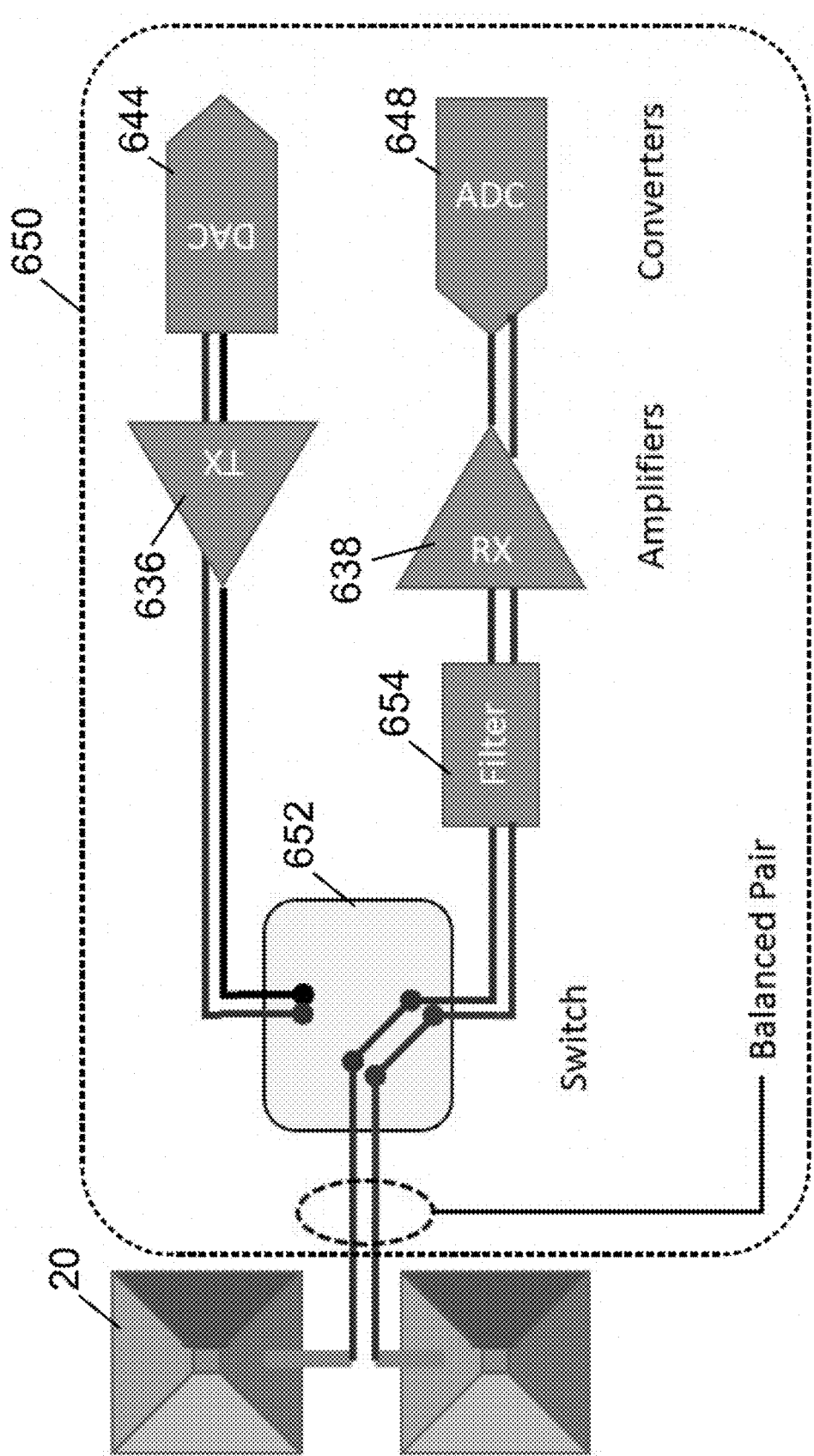

With reference to FIG. 71, some RF components can operate on signals differentially instead of single ended. Using such "differential" RF components enables the DSA to operate with a fully differential signal chain 650 as shown in FIG. 71. Here the inputs are maintained as a balanced pair all the way to the conversion from or to a digital word at the ADC 648 or DAC 644. The power amplifier (PA) 636 and the low-noise amplifier (LNA) 638 process differential signals in this embodiment. The illustrative embodiment of FIG. 71 further includes a switch (or alternatively a duplexer or circulator) 652 to provide time-division or frequency-division duplexing of the TX and RX differential paths, and an optional filter 654 upstream of the LNA 638. It is noted that the switch, duplexer, or circulator is coupled to one or more aperture pixels without an intervening balun.

A variant embodiment may employ a semi-differential signal chain (not shown) where differential signals are maintained to a location short of the DAC and ADC, and baluns are used to convert at that point.

The combiners each insert a loss, are limited in channel count, and increase SWAP-C. Various designs can be employed to mitigate these effects.

Figure 72:
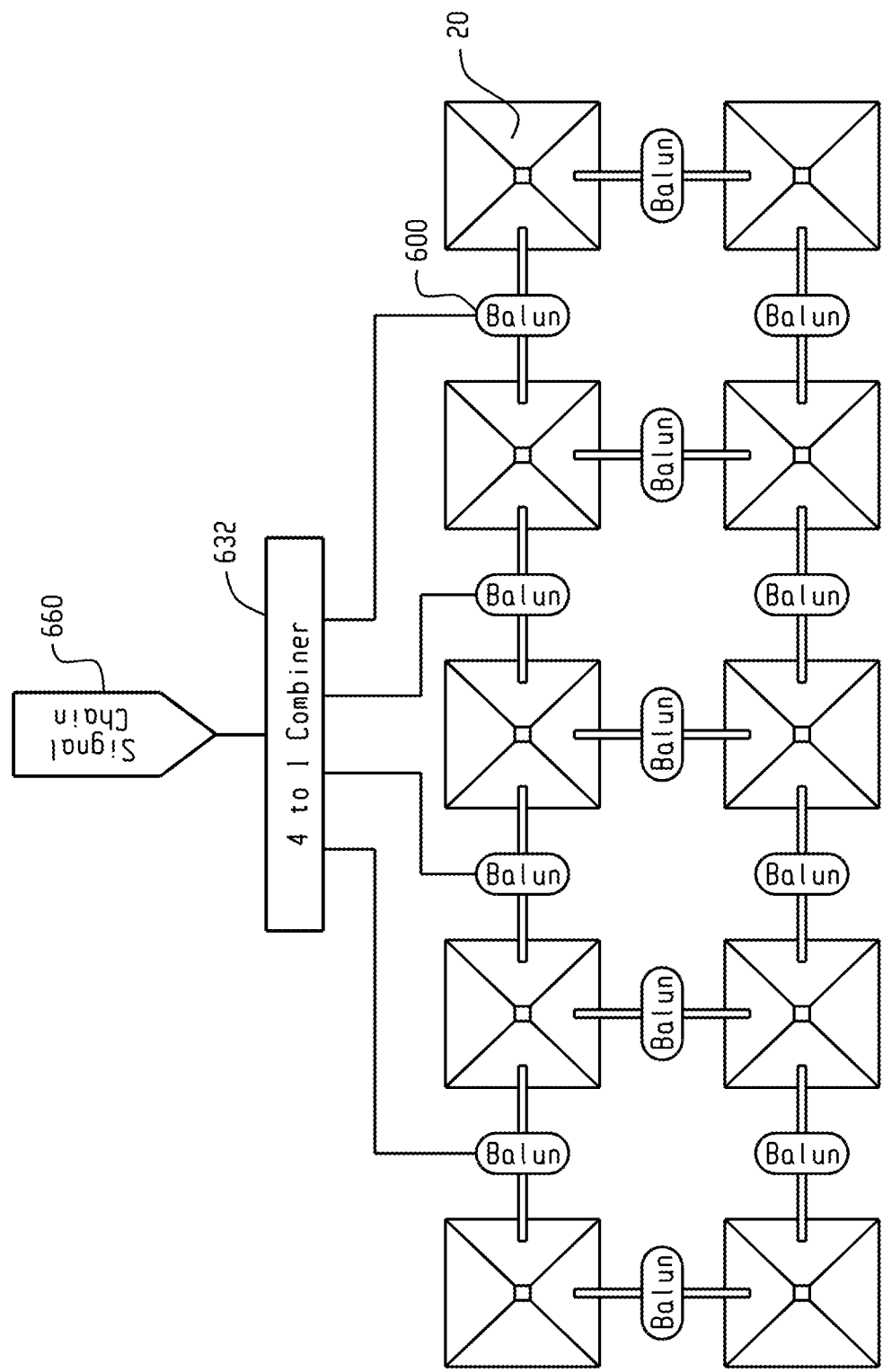

With reference to FIG. 72, an example is shown in which the combiner 632 is included after the signal chain 660 (e.g., this could be the signal chain 630 of FIG. 69, or the signal chain 640 of FIG. 70) and fans out to 4 pixels. These pixels are shown in a row, and the combiner 632 is a 4-1 combiner utilized in front of the signal chain 660. In this example, all 4 pixels receive the same signal, and pixel level steering along the azimuth is not possible. An optional modification is to place a phase shifter between the combiner and baluns. The approach represents a low power, low cost configuration. Note that these examples could easily be extending to larger DSAs, e.g., a 10×10 DSA requiring 9-1 combiners.

Figure 73:
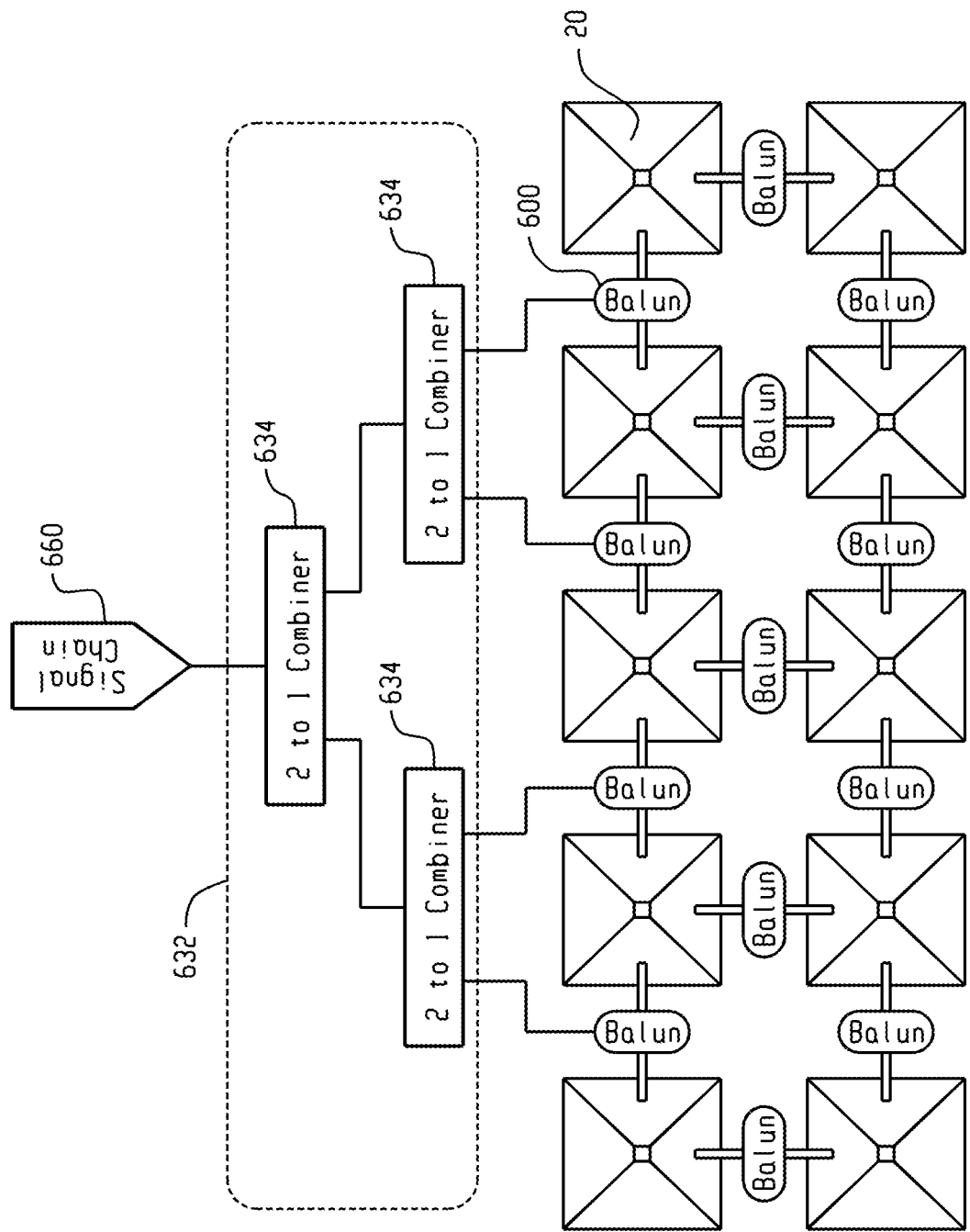

FIG. 73 shows an example of how the combiner 632 can be constructed using multiple combiners 634 in series to create a combiner with larger fanout, or enable phase shifting across multiple pixels. FIG. 73 shows two 2-1 combiners 634 stacked in series. One may choose to do this because of SWAP-C or performance characteristics of the 2-1 vs 4-1 combiner, or the unavailability of the needed combiner fanout. Another reason may be because it is easier to equal total trace lengths from one pixel to another so as not to induce unequal time delays on signal lines. Additionally, one could place a mixer in between the combiners 634 permitting some beam forming and steering between the groups.

Figure 74:
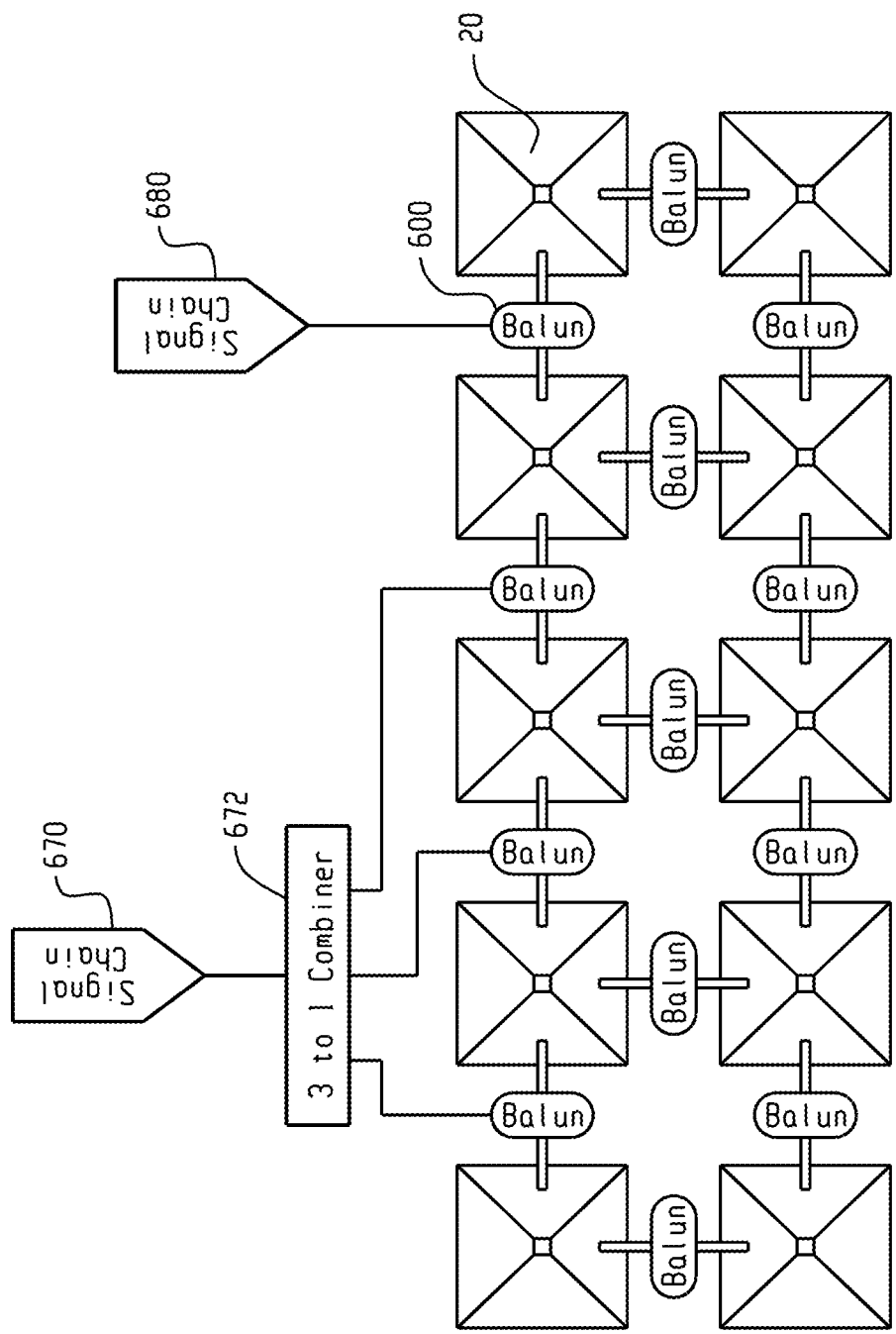

FIG. 74 shows that the combiner approach need not be homogenous, i.e., the use of combiners is not balanced between the pixels. In the example of FIG. 74, a 3-1 combiner 672 connects a first signal chain 670 with three pixels, while a fourth pixel has a straight connection to a second signal chain 680. This approach could be useful when the DSA is designed to process multiple signals of interest simultaneously, with different power/sensitivity needs. In this case when the full DSA performance is needed then the two signal chains 670, 680 are combined in the digital domain.

Figure 75:
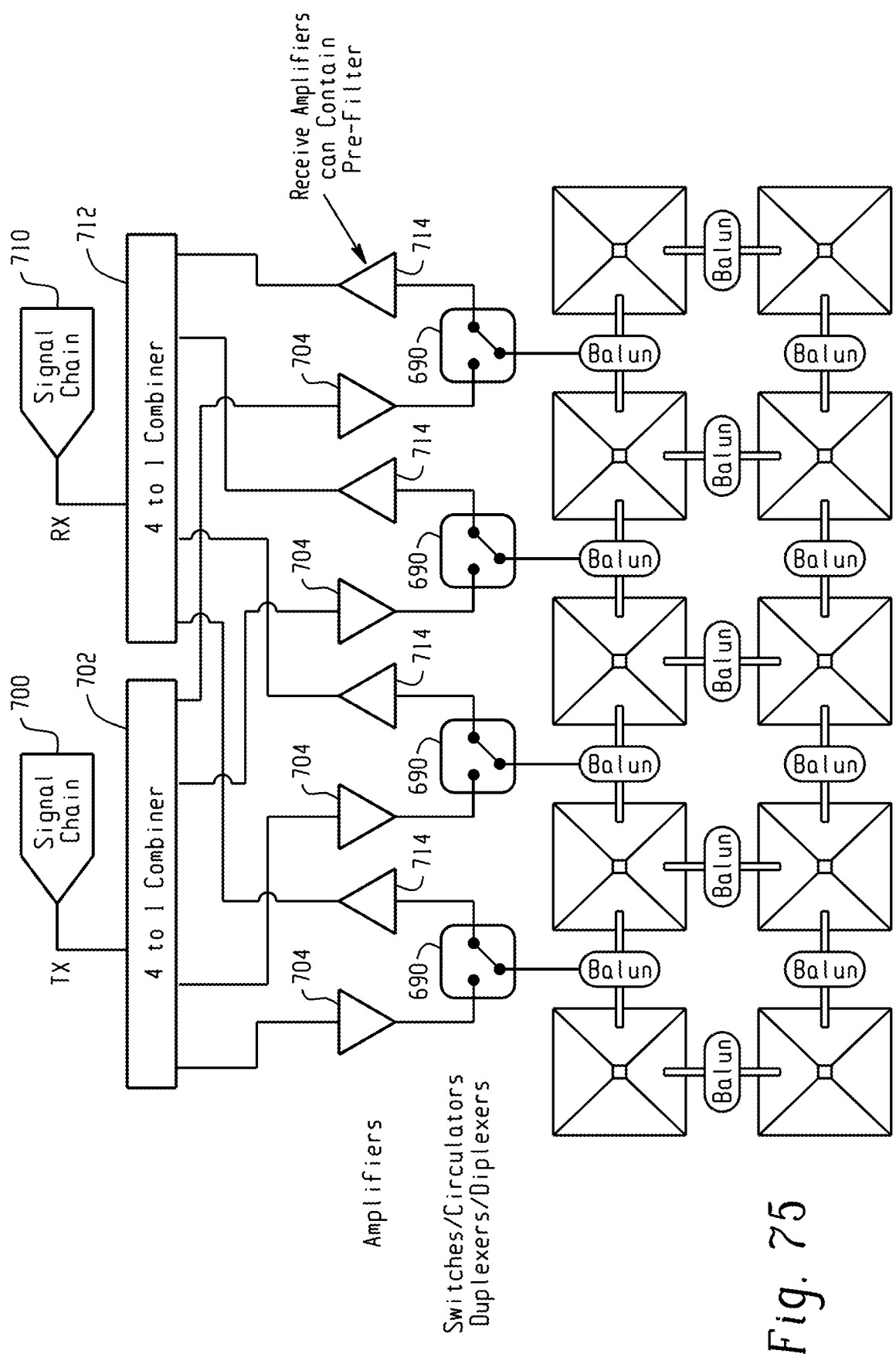

FIG. 75 shows yet another nonlimiting illustrative example, which increases the performance by segregating the TX and RX pathways from the aperture via duplexers 690 (which may be switches, circulators, diplexers, et cetera). As shown in FIG. 75, a TX signal chain 700 feeds into a first 4-1 combiner 702 to drive power amplifiers (Pas) 704 to transmit via pixels of the DSA. An RX signal chain 710 receives signal via a second 4-1 combiner 712 after amplification by low noise amplifiers (LNAs) 714 (which may optionally contain a pre-filter). Here, a doubling in the number of combiners is necessary, but the performance is thereby increased. The LNAs 714 can negate the loss of the combiners, and one is no longer restricted to the power limitations of the combiners because the Pas 704 are downstream.

FIGS. 76-81 present some further examples with various performance/SWAP-C trade space positions. Note that in these examples, combiners 632 of FIG. 69 are used, which interface directly with the balun 600. It is noted that all of these examples could alternatively be implemented with the combiners 634 in the $2^{nd}$ position of FIG. 69.

Figure 76:
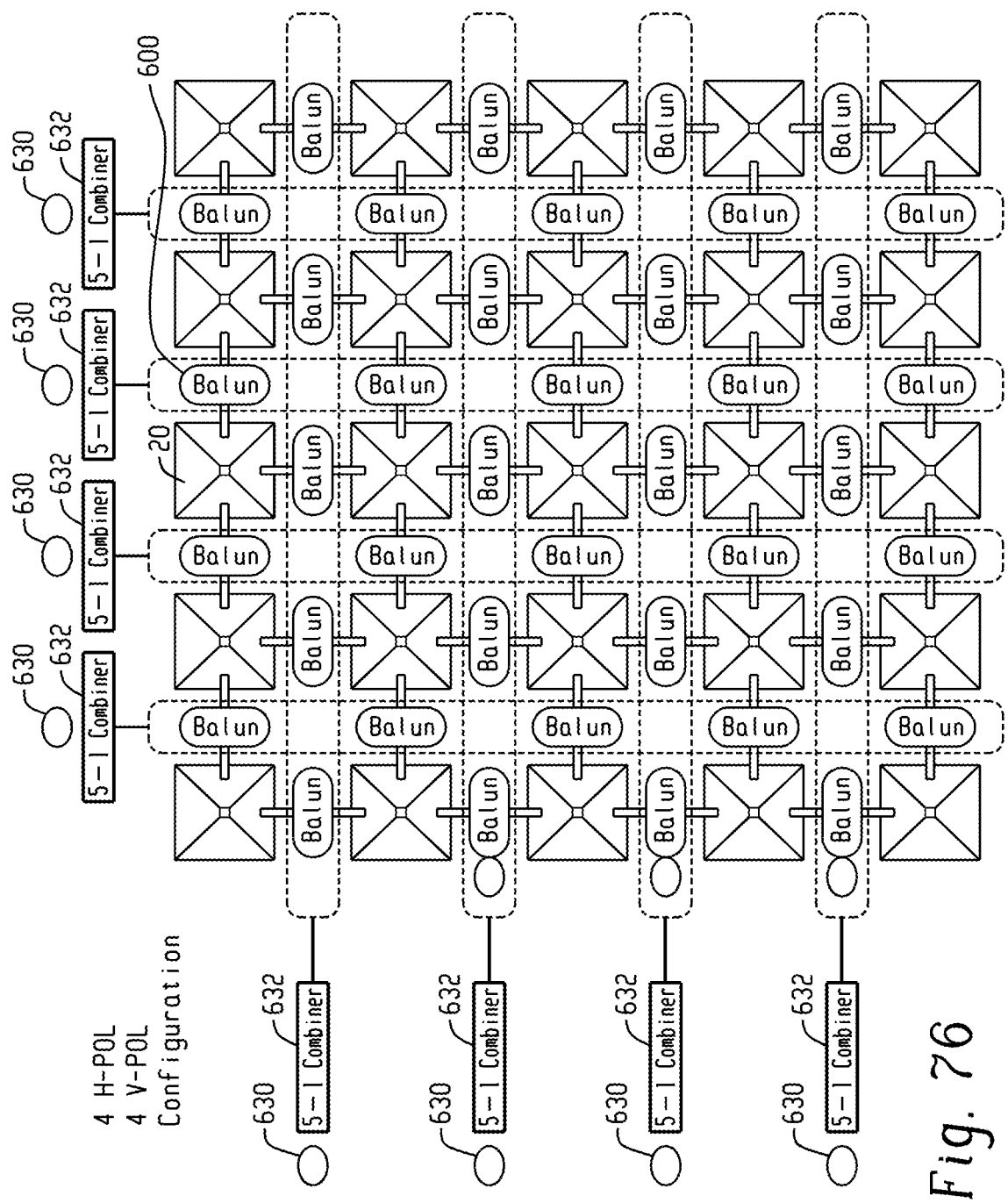

FIG. 76 shows a 5×5 pixel DSA embodiment that offers four signal chains in horizontal polarization and four signal chains in vertical polarization, using combiners 632 which are all 5-1 combiners. This configuration pairs well with Software Defined Radios (SDRs), which have power of two (i.e., $2^n$) channel counts, e.g. SDRs with $2^3=8$ channels are commercially available. This design allows simultaneous operation on both polarizations, the ability to measure incoming polarization, and the ability to beam steer and form in both azimuth and elevation. A drawback of this design in the context of the illustrative 5×5 pixel DSA is that it employs 5-1 combiners, which is not a common fanout.

Figure 77:
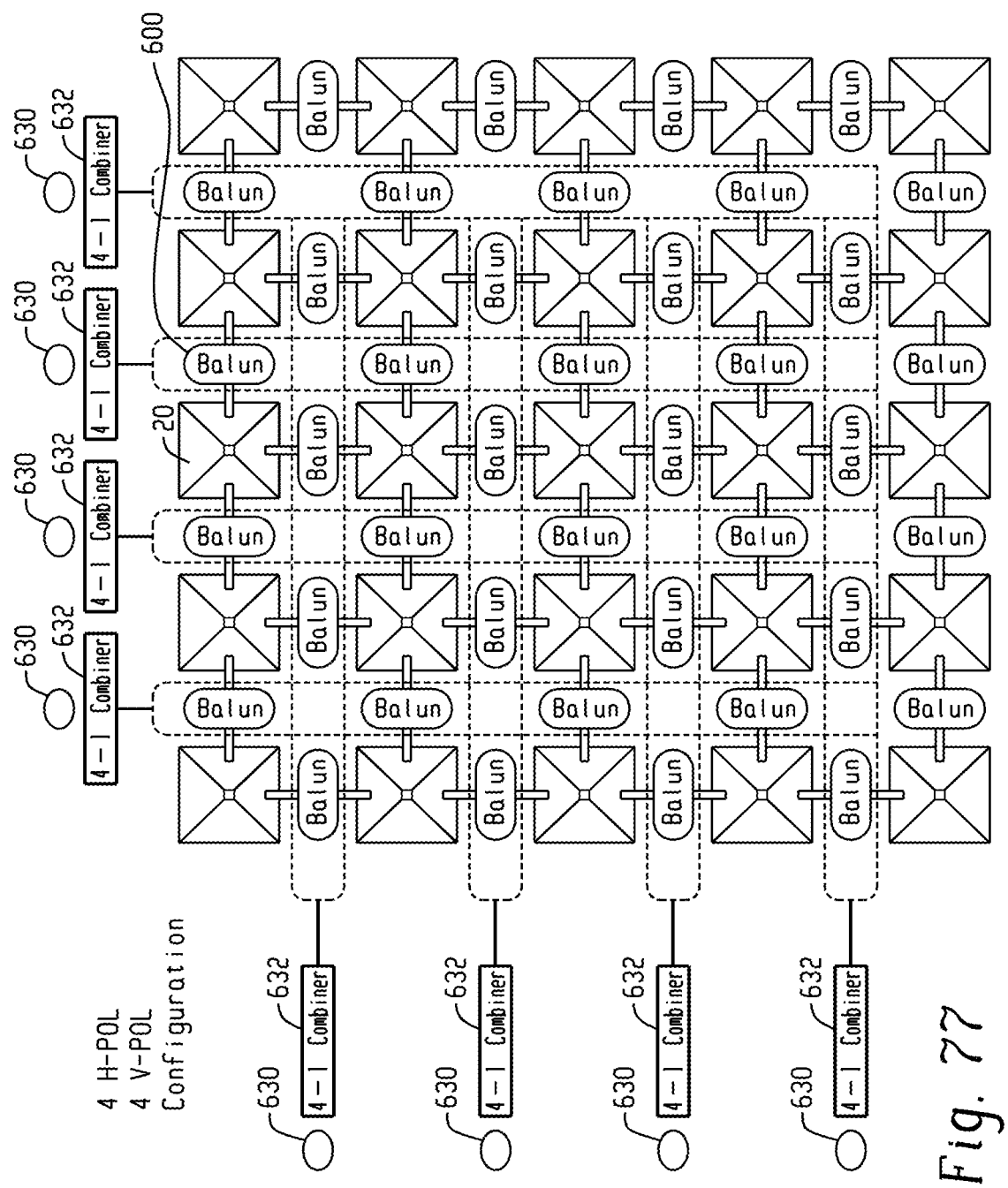

With reference to FIG. 77, to mitigate the need for uncommon 5-1 combiners in the context of the illustrative 5×5 pixel DSA, the design of FIG. 77 can be employed, in which the pixels on one vertical and one horizontal perimeter are not brought into the signal chain, causing a slight reduction in effective aperture area. Thus, only one face of the projections 20 are in use. Here the combiners 632 are all 4-1 combiners. This approach permits the more common 4×1 combiner fanouts to be used, as powers of 2 are most popular. To make better use of the unused faces, the approach of FIG. 74 could be applied to permit an additional signal of interest to be investigated.

Figure 78:
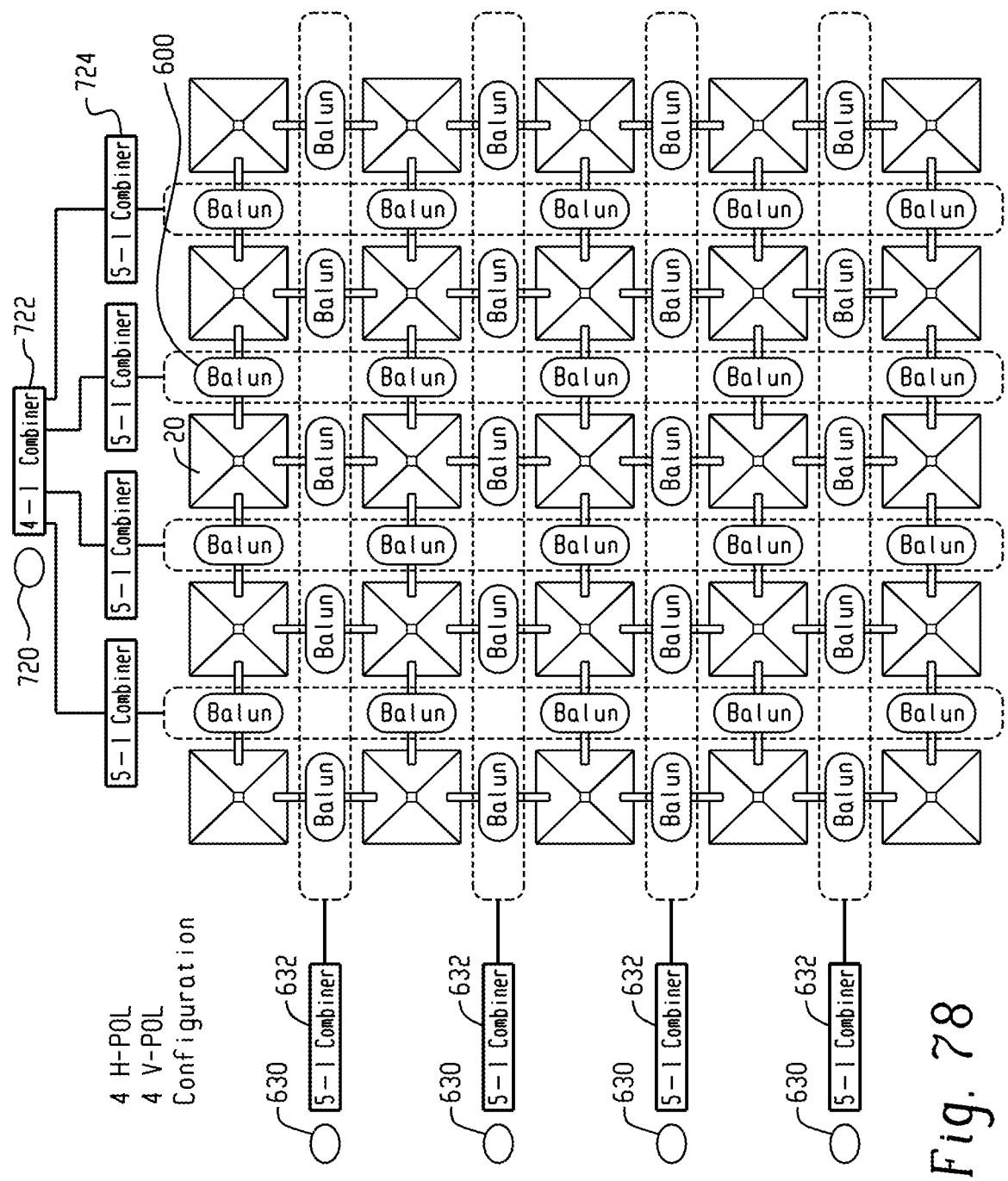

When a single polarization is of interest, or beam steering and forming are only necessary in one polarization, the approach of FIG. 78 is useful. Here the rows are connected by combiners 632 served by four signal chains 630 as already described with reference to FIG. 76. However, in the embodiment of FIG. 78 the columns are combined into a single signal chain 720 by a 4-1 combiner 722 fanning out to four 5-1 combiners 724. This configuration is useful, for example, if two signals of interest are in operation and forming and steering are not needed on one of those signals.

Figure 79:
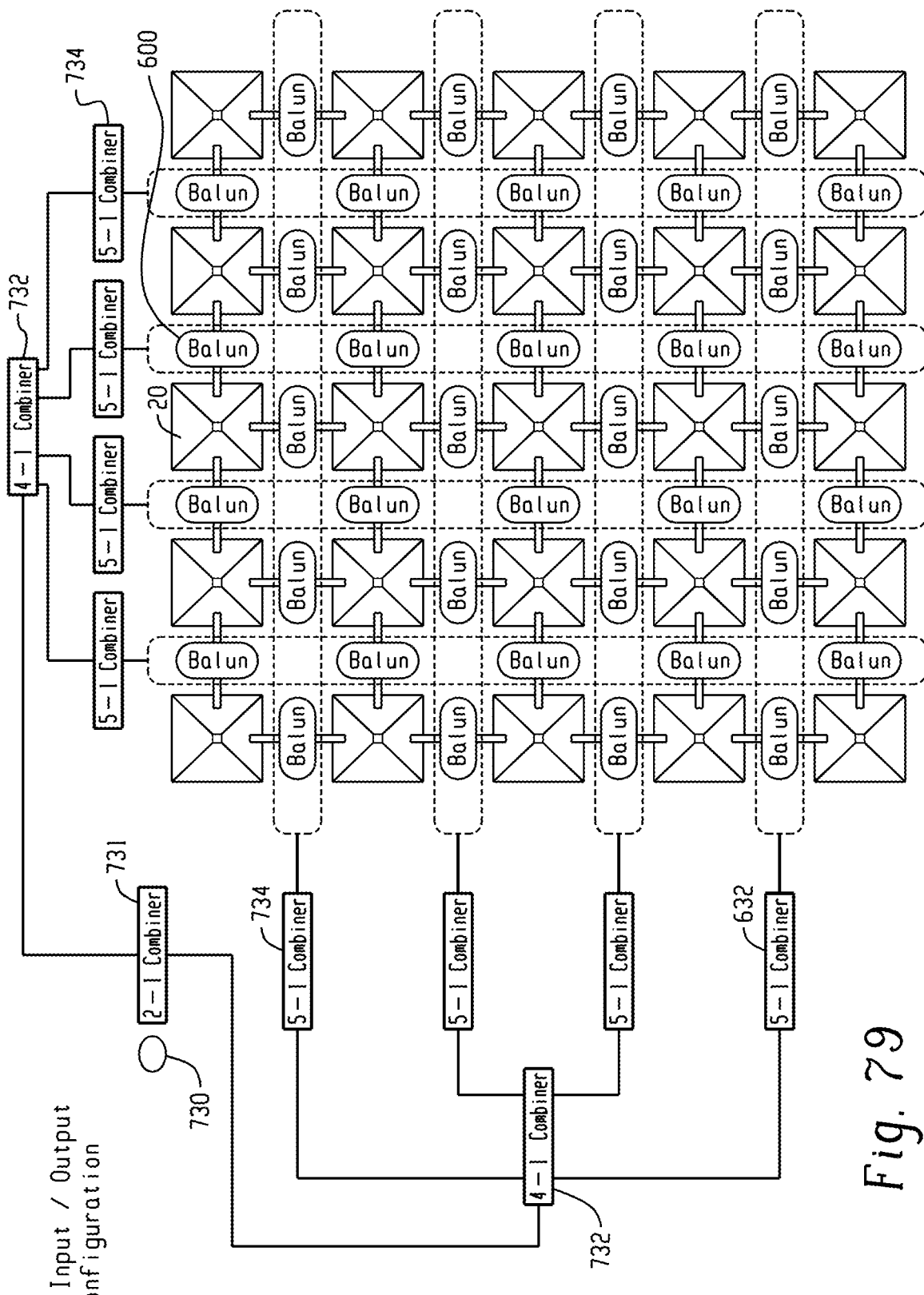

FIG. 79 is a DSA architecture that serves a single signal chain 730 with no capability to measure or control polarization, or beam form/steer. The single signal chain is coupled with the rows and columns by a 2-1 combiner 731 fanning out to two 4-1 combiners 732 each in turn fanning out to four 5-1 combiners 734. This architecture is, for example, useful to support an existing single channel radio that needs efficient, ultrawideband performance.

Figure 80:
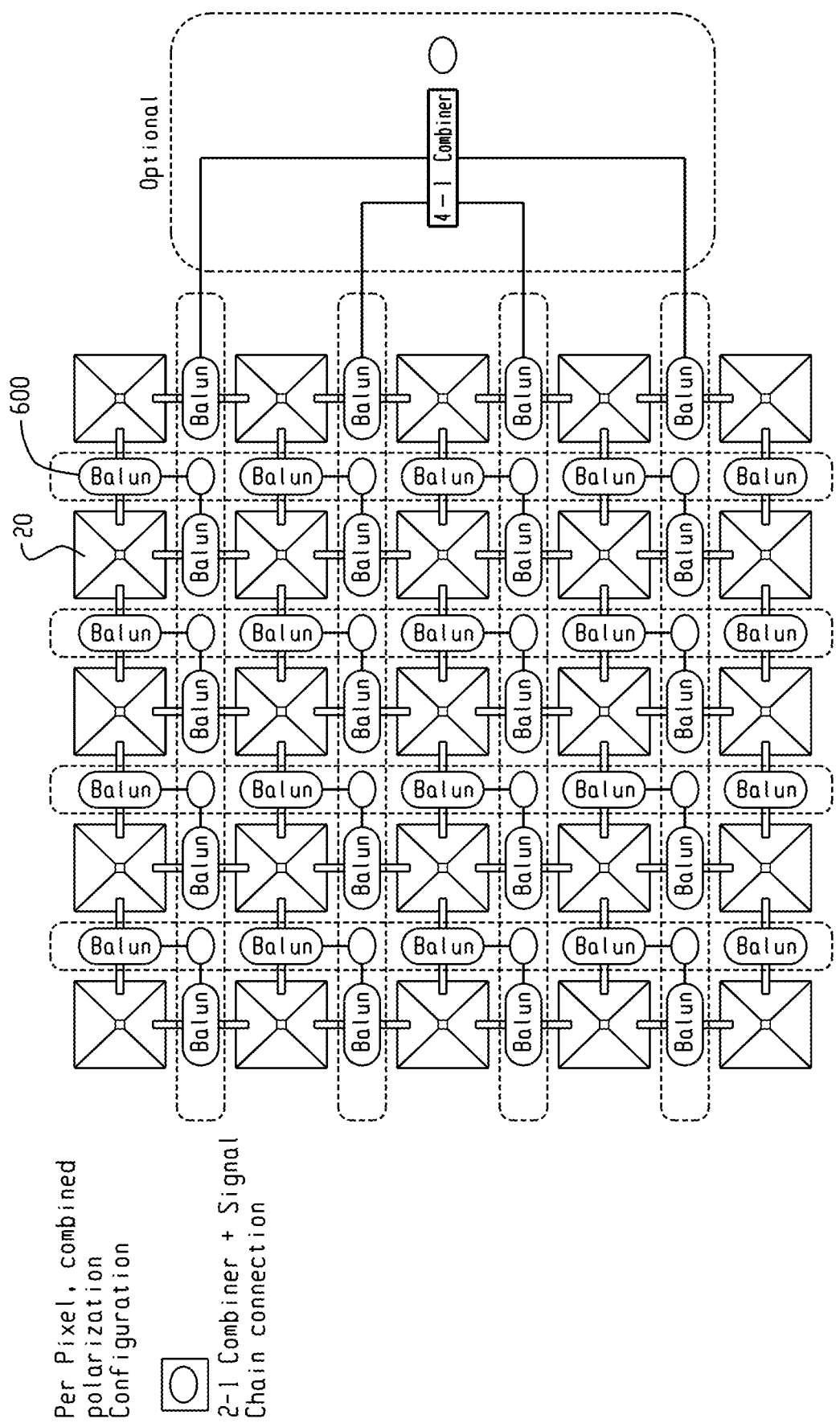

FIG. 80 shows a DSA in which each pixel has its horizontal and vertical polarizations combined, and is connected to its own signal chain. This approach is useful with low noise and high power efficiency are required, and robust beamforming is needed, but the beam pattern and reception pattern are to be symmetrical in polarization.

Figure 81:
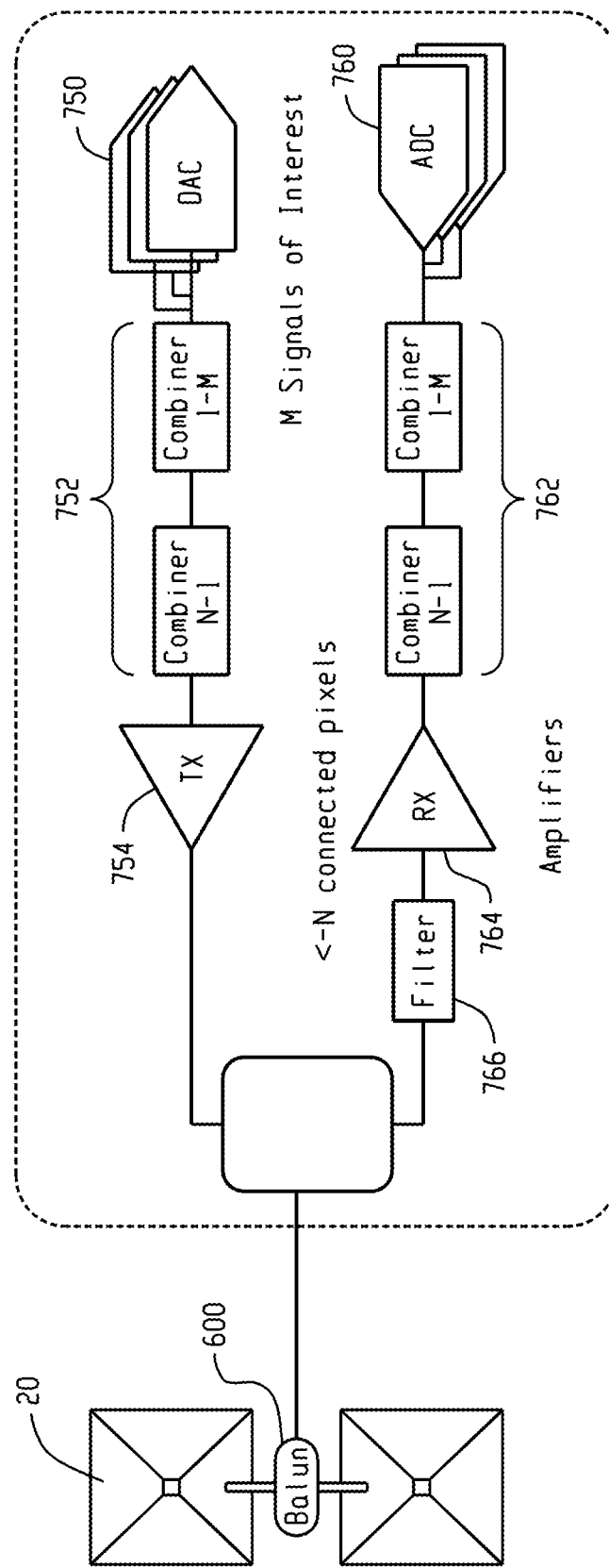

With reference to FIG. 81, one benefit of a DSA is its ultrawide bandwidth and ability to support many signals simultaneously. However, a given DSA implementation may be limited by bandwidth of the data converters. To mitigate this limitation, the architecture of FIG. 81 can be used in any of the preceding examples. As shown FIG. 81, after the pixels are combined into rows, columns or some other configuration, they are then split out to multiple converters. For the transmit (TX) path, multiple DAC converters 750 are coupled via combiners 752 to a power amplifier (PA) 754. For the receive (RX) path, multiple ADC converters 760 are coupled via combiners 762 to a low noise amplifier (LNA) 764, optionally with pre-filter 766. Note that the converter is considered to include the appropriate filtering and mixers. This architecture is suitable, for example, when the LNA and PAs are present, to reduce the impact of losses in the combiners.

Figure 82:
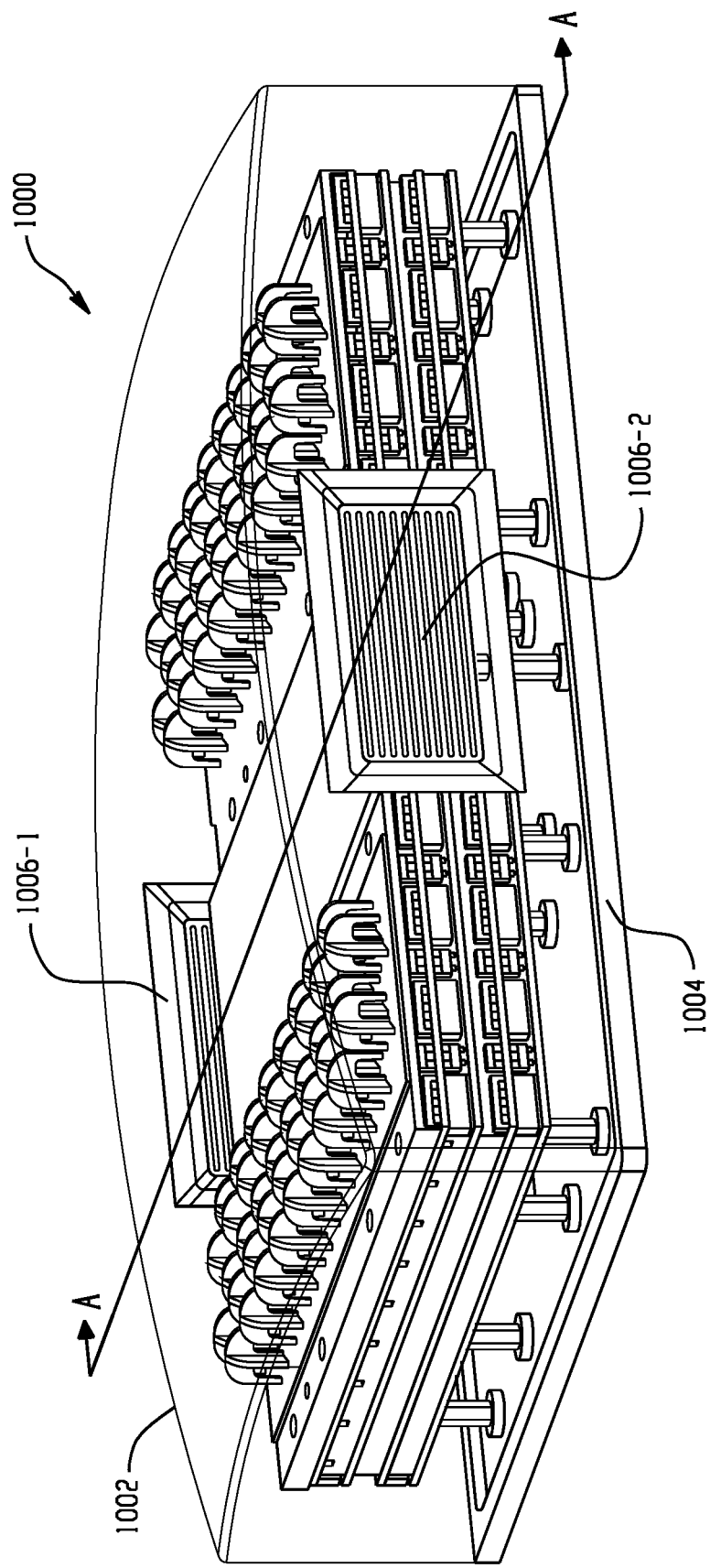
FIG. 82 is a diagrammatic illustration showing a perspective view of yet another embodiment of an RF aperture provisioned with a plurality of electrically conductive tapered projections in accordance with some suitable embodiments disclosed herein.
Figure 83:
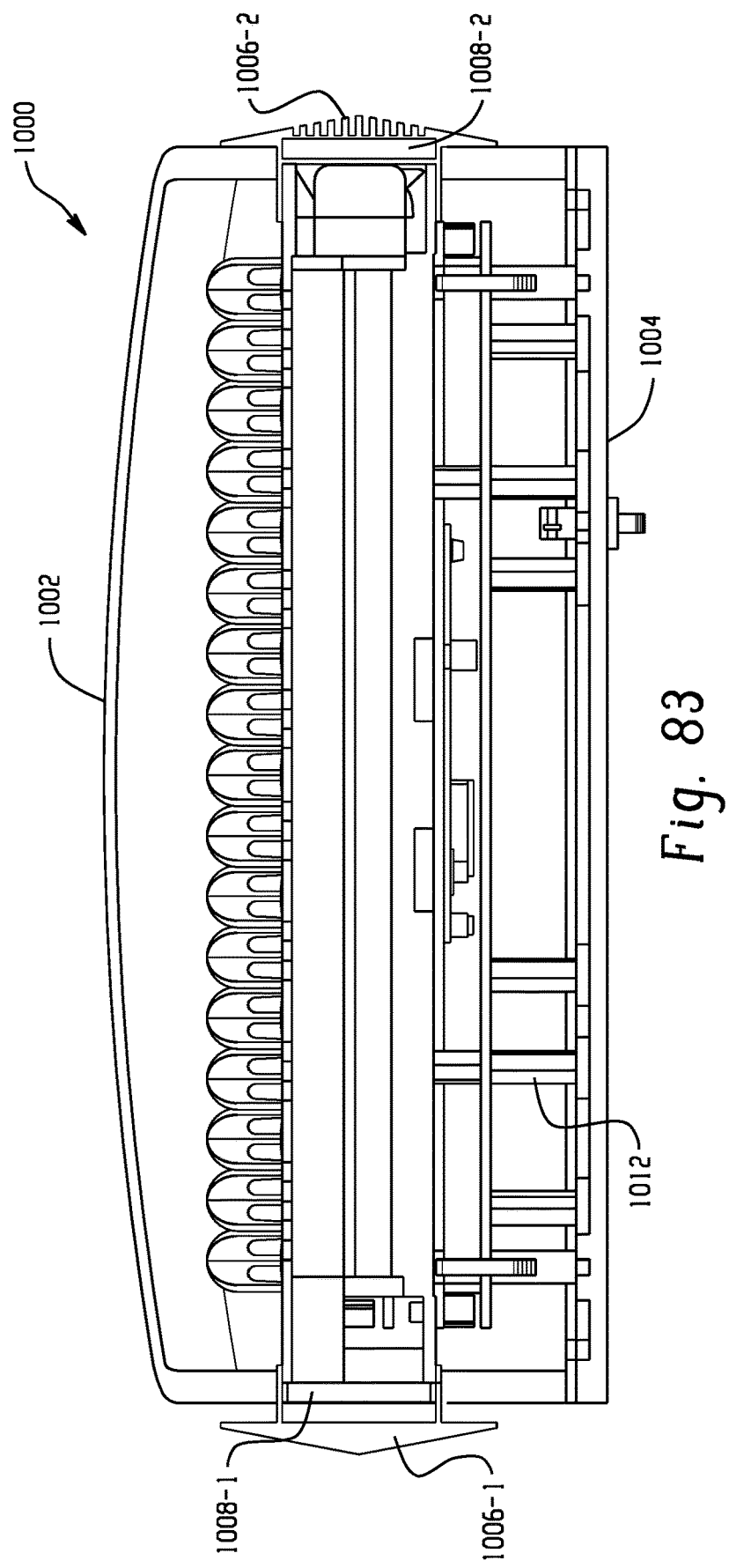
FIG. 83 is a diagrammatic illustration showing a cross section view of the RF aperture shown in FIG. 82 taken along section line A-A.
Figure 84:
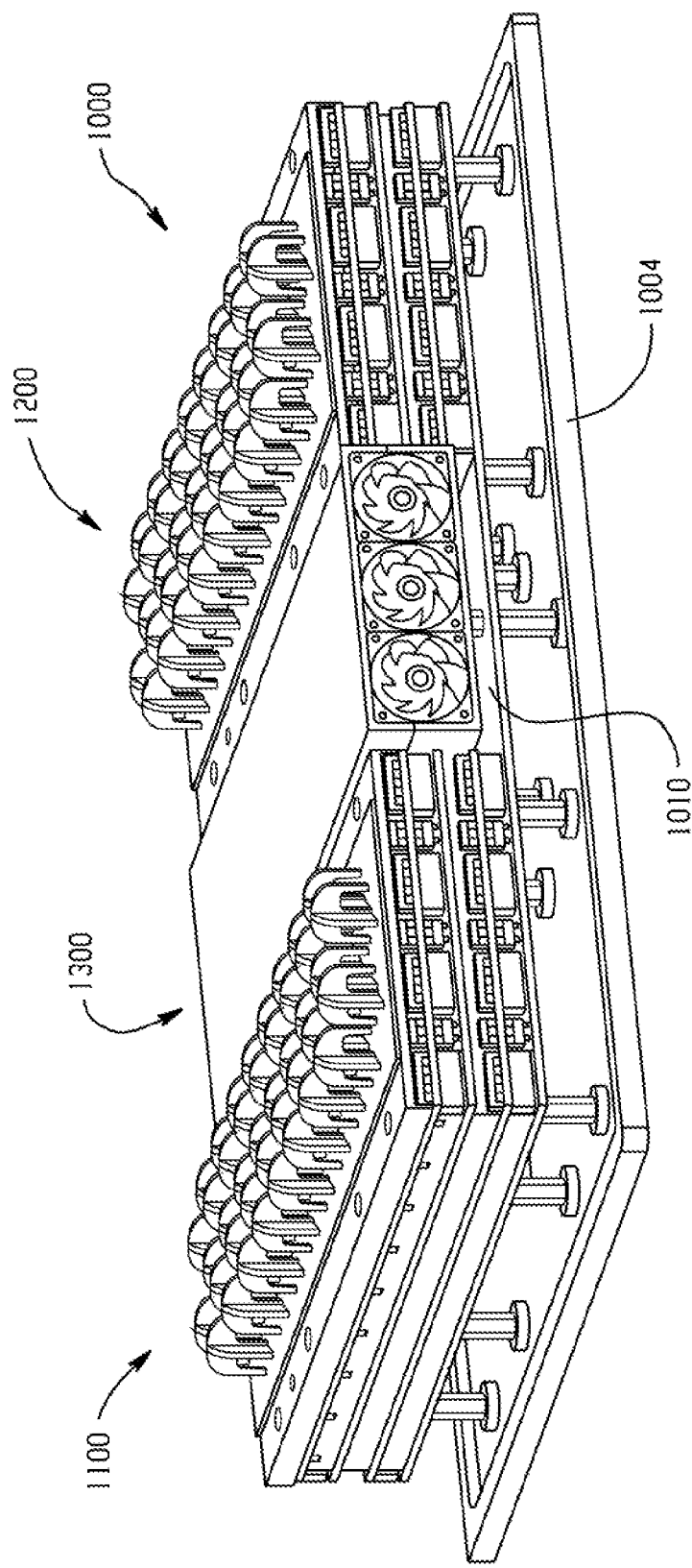
FIG. 84 is a diagrammatic illustration showing a partial perspective view of the RF aperture shown in FIG. 82.
Figure 85:
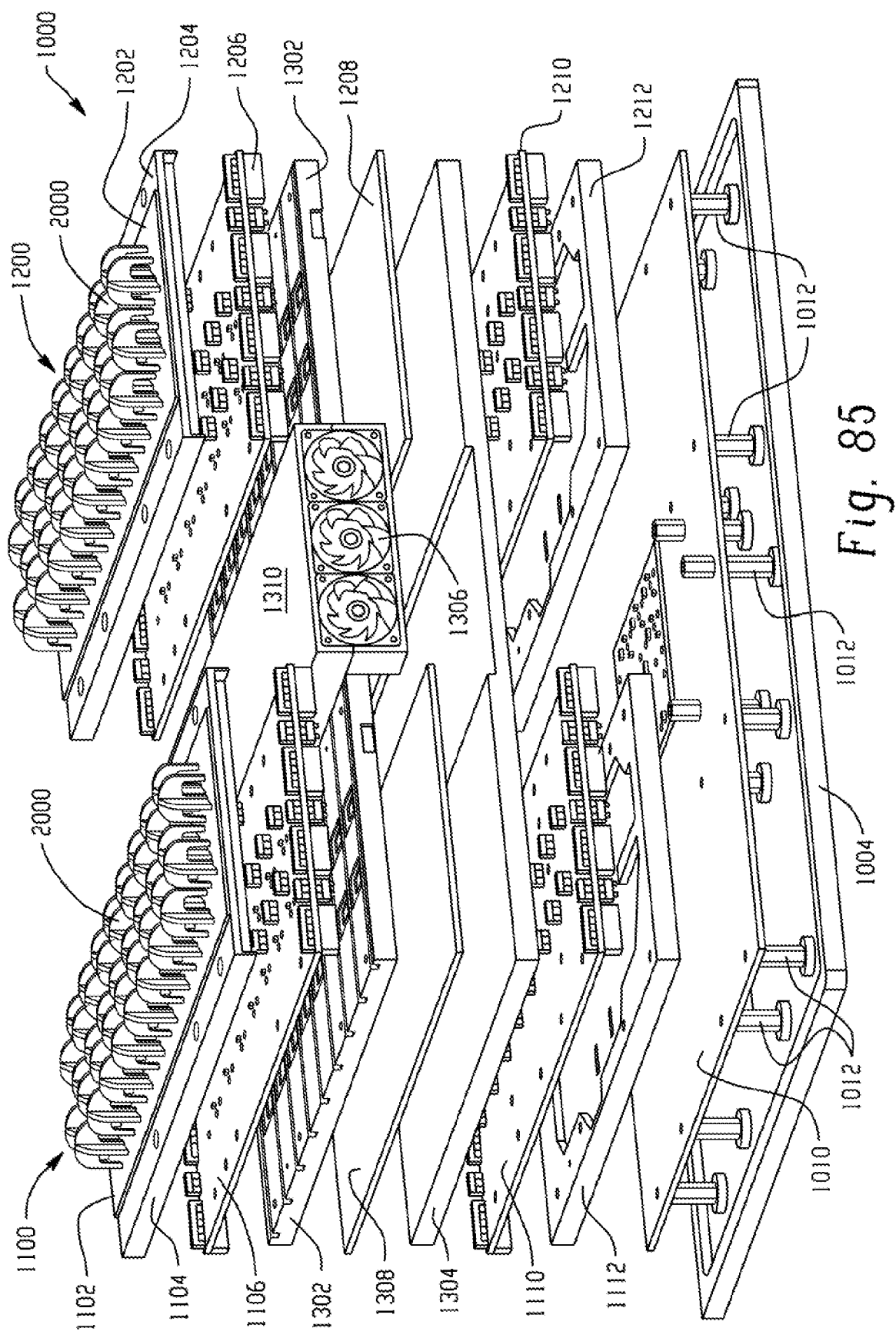
FIG. 85 is a diagrammatic illustration showing an exploded view of the RF aperture as depicted in FIG. 84.

In accordance with some suitable embodiments disclosed herein, FIGS. 82 through 85 show an RF aperture 1000 provisioned with a plurality of electrically conductive tapered elements 2000, wherein adjacent pairs of the tapered elements 2000 define aperture pixels of a DSA. Specifically, FIG. 82 is a diagrammatic illustration showing a perspective view of the aperture 1000 with selected elements (e.g., such as a housing or radome 1002 of the aperture 1000) depicted in phantom to show underlying and/or interior elements and/or components of the aperture 1000; FIG. 83 is a cross-section view of the aperture 1000 taken along the section line A-A shown in FIG. 82; FIG. 84 is a diagrammatic illustration showing a partial perspective view of selected interior elements and/or components of the aperture 1000, e.g., with the housing or radome 1002 removed; and FIG. 85 is a diagrammatic illustration showing a partially exploded view of the aperture 1000 as depicted in FIG. 84.

In some suitable embodiments, the housing or radome 1002 is constructed of a material and/or otherwise made to be transparent and/or largely transparent to RF signals and/or radiation. For example, in some embodiments, the housing or radome 1002 may be constructed from polytetrafluoroethylene (PTFE) or another like polymer material. In some suitable alternative embodiments, the housing or radome 1002 may be constructed from acrylonitrile butadiene styrene (ABS), thermoplastic elastomers (TPE), polycarbonate (PC), polybutylene terephthalate (PBT), polypropylene (PP), nylon (e.g., such as nylon 12), or combinations thereof or other suitable materials. Optionally, the housing or radome 1002 does not include any metallic parts or coatings, e.g., which might potentially interfere with the transmission of RF signals and/or radiation therethrough. In practice, the housing or radome 1002 may be injection molded or otherwise formed and may have a wall thickness in a range of between about 3 millimeters (mm) to about 4 mm, inclusive. In some suitable embodiments, the housing or radome 1002 is dimensioned to contain interior components and/or elements of the aperture 1000 under the housing or radome 1002 such that a minimum spacing between an inner surface of the housing or radome 1002 and a tip or apex of any of the tapered elements 2000 is maintained greater than or equal to about 6 mm.

As seen in FIG. 82, the housing or radome 1002 and base plate 1004 in cooperation with one another suitably house and/or enclose interior components and/or elements of the aperture 1000 therein. As shown in FIGS. 82 and 83, one or more vents 1006-1 and 1006-2 may be arranged on the housing or radome 1002. In some suitable embodiments, at least one of the vents 1006-1 may operate as an air intake vent, i.e., such that outside air may be drawn therethrough into an interior cavity of the aperture 1000 defined by the housing or radome 1002 and base plate 1004; and at least one of the vents 1006-2 may operate as an exhaust vent, i.e., such that air may be exhausted therethrough from the interior cavity of the aperture 1000 defined by the housing or radome 1002 and base plate 1004. In this way, cooling of various elements and/or components housed within the housing or radome 1002 and base plate 1004 of the aperture 1000 may be facilitated by an air flow in through the air intake vent 1006-1 and out through the exhaust vent 1006-2.

As seen in FIG. 83, in some embodiments, a suitable air filter 1008-1 may be arranged and/or positioned over, in and/or proximate the air intake vent 1006-1 to trap and/or remove dust, dirt and/or other unwanted airborne contaminates from the exterior air being drawn into the interior of the aperture 1000 through the respective air intake vent 1006-1. In this way, the air filter 1008-1 may inhibit the potential contamination of interior components and/or elements of the aperture 1000 with dust, dirt and/or other airborne contaminates that may disrupt operation and/or cause unwanted failure of those interior components and/or elements of the aperture 1000. Optionally, a suitable air filter 1008-2 may likewise be employed in connection with and/or arranged proximate to the exhaust vent 1006-2.

In practice, assembly of the aperture 1000 may include sequentially securing various interior element and/or components of the aperture 1000 to the base plate 1004, followed by suitably securing the housing or radome 1002 to the base plate 1004 over the various interior elements and/or components of the aperture 1000. In some suitable embodiments, the housing 1002 may be secured to base plate 1004 with one or more screws, bolts, nuts and/or other like fasteners, combinations of various fasteners and/or other suitable fastening mechanisms. In some suitable embodiments, the housing or radome 1002 may be secured to the base plate 1004 by threading one or more suitable screws or bolts or the like from an underside of the base plate 1004 and therethrough into mated screw or bolt receiving holes or the like formed in the housing or radome 1002 (e.g., where the underside of the base plate 1004 is that side of the base plate 1004 which is opposite the side of the base plate 1004 facing, adjacent and/or proximate to the housing or radome 1002). In some suitable embodiments, a watertight or other suitably sufficient seal between the housing or radome 1002 and base plate 1004 may be achieved with the use of an o-ring or suitable gasket or the like positioned and/or squeezed between the housing or radome 1002 and the base plate 1004.

In some suitable embodiments, as shown in FIG. 84, the aperture 1000 generally includes a transmit (TX) assembly or module 1100 and a receive (RX) assembly or module 1200. In some embodiments, the TX module 1100 and RX module 1200 may be largely separate and/or distinct from one another (i.e., including separate and/or distinct components and/or elements provided therefor), while still sharing some common components and/or elements of the aperture 1000. In practice, the TX module 1100 is provisioned and/or employed to selectively transmit an over-the-air (OTA) RF signal from the aperture 1000, while the RX module 1200 is provisioned and/or employed to selectively receive an OTA RF signal by the aperture 1000. As shown in the illustrated embodiment, the aperture 1000 includes the following interior components and/or elements, which may be shared by the TX and RX modules 1100 and 1200: a digital personality board (DPB) 1010; one or more standoffs 1012 which distance the DPB 1010 from the base plate 1004; and a cooling assembly 1300, which may include one or more first heat sink plates 1302, a second heat sink plate 1304 and an array of one or more fans 1306.

In some suitable embodiments, the TX module 1100 may further include: a TX air interface plane (AIP) 1102 which carries a first matrix of tapered element 2000; a TX AIP shield 1104; a TX conditioning board 1106; a power supply board 1108; a splitting board 1110; and a splitting board shield 1112. Likewise, the RX module 1200 may further include an RX AIP 1202 which carries a second matrix of tapered elements 2000; an RX AIP shield 1204; an RX conditioning board 1206; an optional power supply board 1208; a combining board 1210; and a combining board shield 1212.

As shown, the TX AIP shield 1104 may be sandwiched and/or otherwise positioned between the TX AIP 1102 and the TX conditioning board 1106; a first one of the first heat sink plates 1302 may be sandwiched and/or otherwise positioned between the TX conditioning board 1106 and the power supply board 1108; a first end of the second heat sink plate 1304 may be sandwiched and/or otherwise positioned between the power supply board 1108 and the splitting board 1110; and the splitting board shield 1112 may be sandwiched and/or otherwise positioned between the splitting board 1110 and a first end of the DPB 1010.

As shown, the RX AIP shield 1204 may be sandwiched and/or otherwise positioned between the RX AIP 1202 and the RX conditioning board 1206; a second one of the first heat sink plates 1302 may be sandwiched and/or otherwise positioned between the RX conditioning board 1206 and the power supply board 1208; a second end of the second heat sink plate 1304 may be sandwiched and/or otherwise positioned between the power supply board 1208 and the splitting board 1210; and the splitting board shield 1212 may be sandwiched and/or otherwise positioned between the splitting board 1210 and a second end of the DPB 1010.

In some suitable embodiments, the power supply board 1108 may be a circuit board including a collection of one or more appropriate electronic components and/or elements that cooperate to produce electrical power suitable for supply to and/or operation of various other boards in the aperture 1000. In practice, the power supply board 1108 may be electronically connected to the TX conditioning board 1106 and the TX splitting board 1110 to selectively supply electrical power thereto for operating the same. Likewise, in some suitably embodiments, the power supply board 1208 may be a circuit board including a collection of one or more appropriate electronic components and/or elements that cooperate to produce electrical power suitable for supply to and/or operation of various other boards in the aperture 1000. In practice, the power supply board 1208 is electronically connected to the RX conditioning board 1206 and the RX combining board 1210 to selectively supply electrical power thereto for operating the same. The DPB 1010 may be electronically connected to either or both power supply boards 1108 and/or 1208 to selectively receive electrical power therefrom for operation of the DPB 1010. In some suitable embodiments, either or both power supply boards 1108 and/or 1208 may be additionally electronically connected to the fans 1306 to selectively supply electrical operating power thereto.

In some suitable embodiments, the power supply board 1208 may merely be a blank or place holder board or an otherwise inactive and/or passive board, e.g., without suitable electronic components and/or elements for producing electrical power, and/or the power supply board 1208 may optionally be omitted altogether. In case of the foregoing, the power supply board 1108 may be suitable provisioned and/or electronically connected to the RX conditioning board 1206 and the RX combining board 1210 to selectively supply electrical power thereto for operating the same, and the DPB 1010 and the fans 1306 may be electronically connected to the power supply board 1108 to selectively receive electrical power therefrom for the operation thereof.

In practice, either or both of the respective power supply boards 1108 and/or 1208 may be provisioned and/or operate to receive a single electrical power input at a given input voltage (e.g., at or about a magnitude of 48 volts (V) or the like), which input is conditioned by the respective power supply board and/or converted into one or more desired output voltages (e.g., 12V, 9V, 6V and 5V) as appropriate for use by one or more different components and/or elements within the RF aperture 1000. The respective power supply boards 1108 and/or 1208 may further be provisioned and/or operate to protected one or more different components and/or elements within the RF aperture 1000 from transient voltages and/or power surges. In some suitable embodiments, either or both of the respective power supply boards 1108 and/or 1208 may be modular in nature, for example, so that different input voltages can be supported while retaining the same output voltages and form factor. For example, without limitations, if a 120 V alternating current (AC) system were being manufactured instead of a −48 V direct current (DC) system or if a −48 VDC system were being converted to a 120 VAC system or vice versa, suitable power supply boards 1108 and/or 1208 for the respective systems could be interchangeably swapped out, for example, without making other significant changes to the system to accommodate such power supply boards provisioned and/or designed to receive differing input voltages.

In suitable embodiments, the DPB 1010 may be a digital circuit board including a RF system on chip (SoC) or the like and/or other appropriate electronic elements and/or components. Suitably, the DPB 1010 may be electronically connected to the splitting board 1110 and operates to process outgoing RF signals and/or control the TX module 1100 for transmission of the same. In practice, the RF SoC and/or DPB 1010 may selectively perform digital beam forming processing and include a digital to analog converter (DAC) for converting a digital representation of an RF signal to an analog signal (e.g., such as a modulated transmit signal) which is in turn supplied to the splitting board 1110 which is electronically connected to the DPB 1010.

In some suitable embodiments, the splitting board 1110 may be an analog circuit board including a collection of one or more electronic components and/or elements that cooperate to suitably split and/or divide the signal received from the DPB 1010. In practice, the splitting board 1110 splits and/or divides the signal received from the DPB 1010 into suitable components, e.g., for respective pixels of the TX AIP 1102. In suitable embodiments, the splitting board is further electrically connected to the TX conditioning board 1106. In some suitable embodiments, the splitting board 1110 splits and/or divides the signal received from the DPB 1010 into suitable components and maps a number (N) of channels from the DPB 1010 to a number (M) of corresponding tapered elements, e.g., such as the tapered elements 2000 of the TX AIP 1102. Suitably, the splitting board 1110 may be provisioned such that the mapping can be configured and/or readily changed for different applications and/or system arrangements. In one suitable embodiment, without limitation, the splitting board 1110 may operate to map 8 channels from the DPB 1010 to 8 columns of the tapered elements 2000 in the TX AIP 1102. In another suitable embodiment, without limitation, the splitting board 1110 may operate to map 8 channels from the DPB 1010 to 4 columns and 2 rows of the tapered elements 2000 in the TX AIP 1102, for example, without other further significant changes to the system. In still another suitable embodiment, without limitation, the splitting board 1110 may operate to map 16 channels from the DPB 1010 to 4 columns and 4 rows of the tapered elements 2000 in the TX AIP 1102.

Suitably, the TX conditioning board 1106 receives the component signals from the splitting board 1110 and prepares them for relaying to the respective pixels of the TX AIP 1102. In practice, the TX conditioning board may be an analog circuit board including a collection of one or more electronic components and/or elements that cooperate to suitably condition the received component signals and relay the same to the TX AIP 1102. For example, the TX condition board 1106 may include one or more amplifiers that suitably amplify one or more of the component signals received from the splitting board 1110. The TX conditioning board 1106 may further include one or more low pass, bandpass or high pass filters for suitably filtering noise and/or other selected or unwanted components out of various signals. As described later herein, the TX condition board 1106 may also include one or more baluns that electrically interconnect respective tapered elements 2000 of the TX AIP 1102. In turn, in accordance with the conditioned signal components received thereby, the TX AIP 1102 produces, transmits and/or otherwise outputs an OTA RF signal via the tapered elements 2000 mounted and/or arranged thereon, which collectively function as a DSA. Generally, in some suitable embodiments, operation of the TX module 1100 includes the DPB 1010 providing a modulated TX signal to the splitting board 1110 that in turn splits it into individual signals for each of the pixels (e.g., 64) in the TX AIP 1102 for transmission.

As shown, the RX AIP 1202 is provisioned with a matrix of tapered element 2000 that cooperate to function as a DSA for selectively receiving OTA RF signals. Suitably, the RX AIP 1202 is electronically connected to the RX conditioning board 1206 such that signals from respective pixels of the RX AIP 1202 are relayed to the RX conditioning board. In practice, the RX conditioning board 1206 may be an analog circuit board including a collection of one or more electronic components and/or elements that cooperate to suitably condition the received signals and relay the same to the combining board 1210. For example, the RX condition board 1206 may include one or more amplifiers that suitably amplify one or more of the signals received from the RX AIP 1202. The RX conditioning board 1206 may further include one or more low pass, bandpass or high pass filters for suitably filtering noise and/or other selected or unwanted components out of various signals. Suitably, as described later herein, the RX condition board 1206 may include one or more baluns that electrically interconnect respective tapered elements 2000 of the RX AIP 1202 to define the respective pixels of the RX AIP 1202.

In practice, the RX conditioning board 1206 may be further electronically interconnected with the combining board 1210 to relay the received and conditioned signals thereto. In some suitable embodiments, the combining board 1210 may be an analog circuit board including a collection of one or more electronic components and/or elements that cooperate to suitably combine selected ones the received signals and in turn relay one or more of the combined signals to the DPB 1010 which is electronically connected to the combining board 1210. Suitably, the DPB 1010 may be provisioned with an analog to digital converter (ADC) that converts the received combined signals from an analog format to a digital signal and/or representation thereof and further processes the digital signal and/or representation accordingly. In some suitable embodiments, the RX module 1200 operates to amplify a received RX signal (e.g., from 64 pixels in the RX AIP 1202) which may be grouped into a single stronger signal and passed onto the DPB 1010, e.g., for processing and beam-steering. In some suitable embodiments, the combining board 1210 combines signals received from a number (X) of the respective tapered elements, e.g., such as the tapered elements 2000 of the RX AIP 1202, and maps the combined signals into a number (Y) of corresponding channels for relay to the DPB 1010. Suitably, the combining board 1210 maybe provisioned such that the mapping can be configured and/or readily changed for different applications and/or system arrangements. In one suitable embodiment, without limitation, the combining board 1210 may operate to map 8 channels to the DPB 1010 from 8 columns of the tapered elements 2000 in the RX AIP 1202. In another suitable embodiment, without limitation, the combining board 1210 may operate to map 8 channels to the DPB 1010 from 4 columns and 2 rows of the tapered elements 2000 in the RX AIP 1202, for example, without other further significant changes to the system. In still another suitable embodiment, without limitation, the combining board 1210 may operate to map 16 channels to the DPB 1010 from 4 columns and 4 rows of the tapered elements 2000 in the RX AIP 1202.

Suitably, the respective shields 1104, 1112, 1204 and 1212 interposed between respective boards of the aperture 1000 provides electromagnetic shielding to and/or between the respective boards thereby protecting the same against electromagnetic interference from neighboring and/or other boards. In practice, the shields may be constructed of and/or formed from a metal and/or other like material which is suitably opaque to RF and/or other electromagnetic radiation. Further, the various heat sink plates, e.g., such as heat sink plates 1302 and/or 1304, may provide additional electromagnetic shielding to and/or between the various boards of the aperture 1000.

Figure 86:
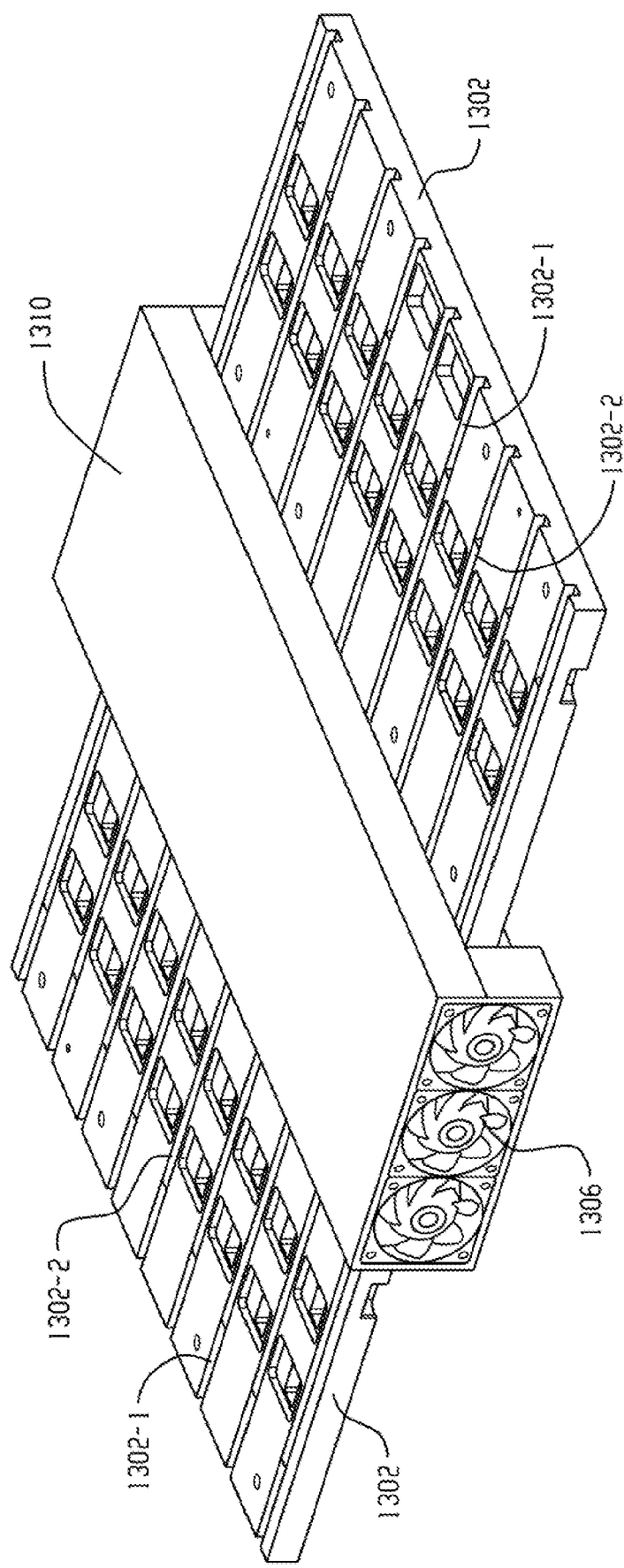
FIG. 86 is a diagrammatic illustration showing a perspective view of a portion of a cooling assembly in accordance with some embodiments of the aperture shown in FIG. 82.
Figure 87:
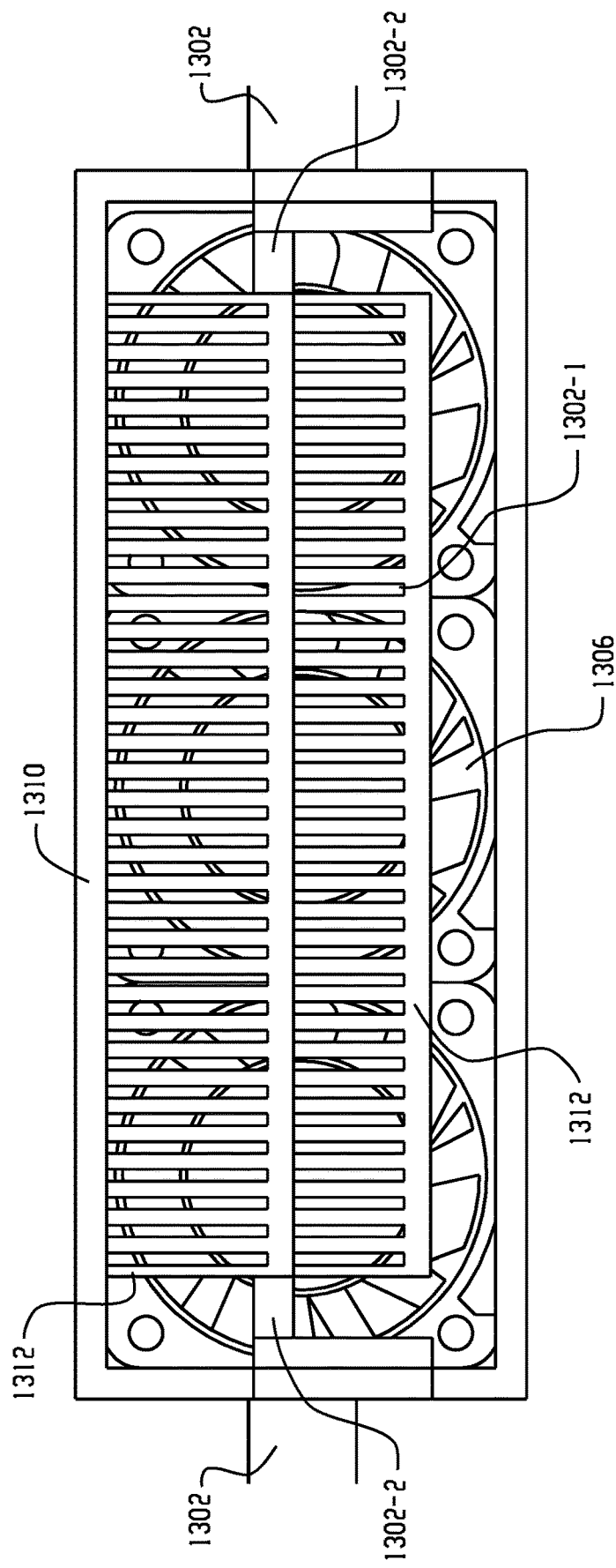
FIG. 87 is a diagrammatic illustration showing an end view of a portion of a cooling assembly in accordance with some embodiments of the aperture shown in FIG. 82
Figure 88:
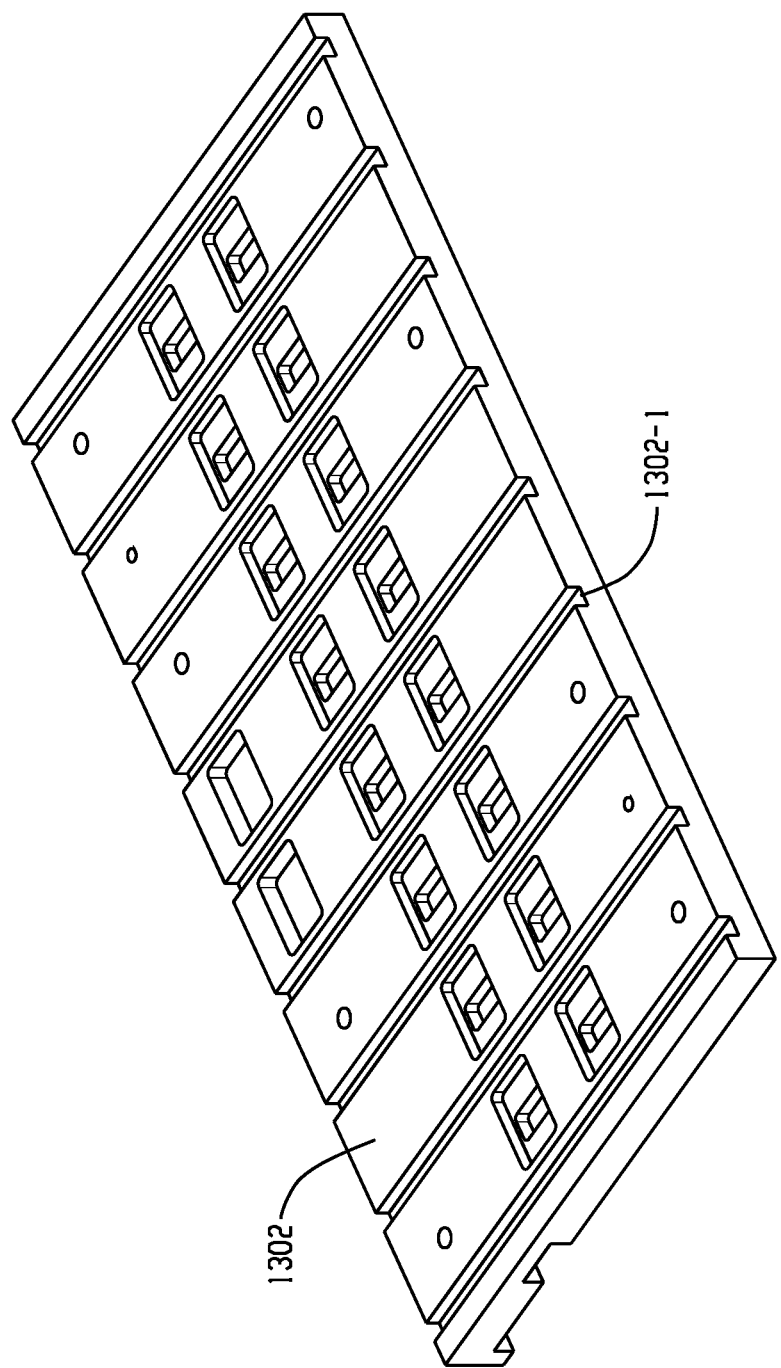
FIG. 88 is a diagrammatic illustration showing a perspective view of a heat sink plate of a cooling assembly in accordance with some embodiments of the aperture shown in FIG. 82.

FIGS. 86-88 illustrate various components of the cooling assembly 1300. Generally, the cooling assembly 1300 facilitates cooling of various components of the aperture 1000, e.g., such as amplifiers and/or other heat generating electronic components on various boards within the aperture 1000.

With reference to FIG. 86, the cooling assembly 1300 may include a central duct 1310 extending between the intake and exhaust vents 1006-1 and 1006-2. An air flow through the duct 1310 is suitably produced by the array of fans 1306 which draws cooler exterior air into the duct 1310 through the intake vent 1006-1 and exhaust hotter interior air out of the duct 1310 through the exhaust vent 1006-2. Suitably, the second heat sink plate 1304 (shown separately in FIG. 88) may be in thermal contact and/or communication with an underside the duct 1310 to withdraw and/or transfer heat out of the second heat sink plate 1304 via the cooling air flow generated in the duct 1310.

With reference to FIG. 87, the first heat sink plates 1302 may likewise be in thermal contact and/or communication with the central duct 1310, e.g., from respective sides thereof. As shown, each of the first heat sink plates 1302 may include a number of channels 1302-1 extending transversely to the duct 1310. Each channel suitably contains a heat transfer tube 1302-2. In practice, each tube 1302-2 may be sealed at either end and contain a suitable thermally conductive liquid, e.g., such as ammonium or the like. In some suitable embodiments, the tubes 1302-2 may be made from a thermally conductive material or metal, e.g., such a cooper (Cu). In practice, heat may be naturally conducted through the contained liquid and/or along the heat transfer tubes 1302-2 from a distal end away from the duct 1310 to a proximate end near the duct 1310 without mechanical pumping of the liquid in the tubes 1302-2 or other like external forces being applied.

With reference now to FIG. 87, one or more thermally conductive masses or heat sinks 1312 may be contained and/or housed within the duct 1310. For example, as shown, there are two such heat sinks 1312, however, in practice there may be more or less. In the illustrated embodiments, each heat sink 1312 may include an array of fins to increase a surface area over which cooling air drawn through the duct 1310 flows. In some suitable embodiments, the proximate end of each heat transfer tube 1302-2 is in thermal contact and/or communication with at least one of the heat sinks 1312. In this way, heat is efficiently drawn from the tubes 1302-2 via the heat sinks 1312 and the cooling air flowing over the same through the duct 1310.

In some suitable embodiments, each of the heat sink plates 1302 and 1304 may have one or more surface formed and/or shape to fit around various heat generating electronic components on adjected boards within the TX module stack 1100 and/or the RX module stack 1200 so as to be in close or near thermal contact therewith. Suitably, the heat sink plates 1302 and/or 1304 and/or the heat sinks 1312 may be made of a suitable thermally conductive material or metal, e.g., such as Al or Cu or the like. Advantageously, the central location and/or positioning of the cooling assembly 1300 and/or central duct 1310 between the TX module stack 1100 and the RX module stack 1200 promotes efficient cooling and/or heat conduction out of both stacks at the same time.

In some alternative embodiments, another liquid or passive or hybrid cooling system may be used in place of the air cooling system 1300 disclosed. In a suitable alternative embodiment, the air channel and/or central duct 1310 may be replaced by another suitable cooling mechanism, for example, which may include, without limitation, liquid cooling, passive cooling, or some hybrid combination of the two.

Figure 89:
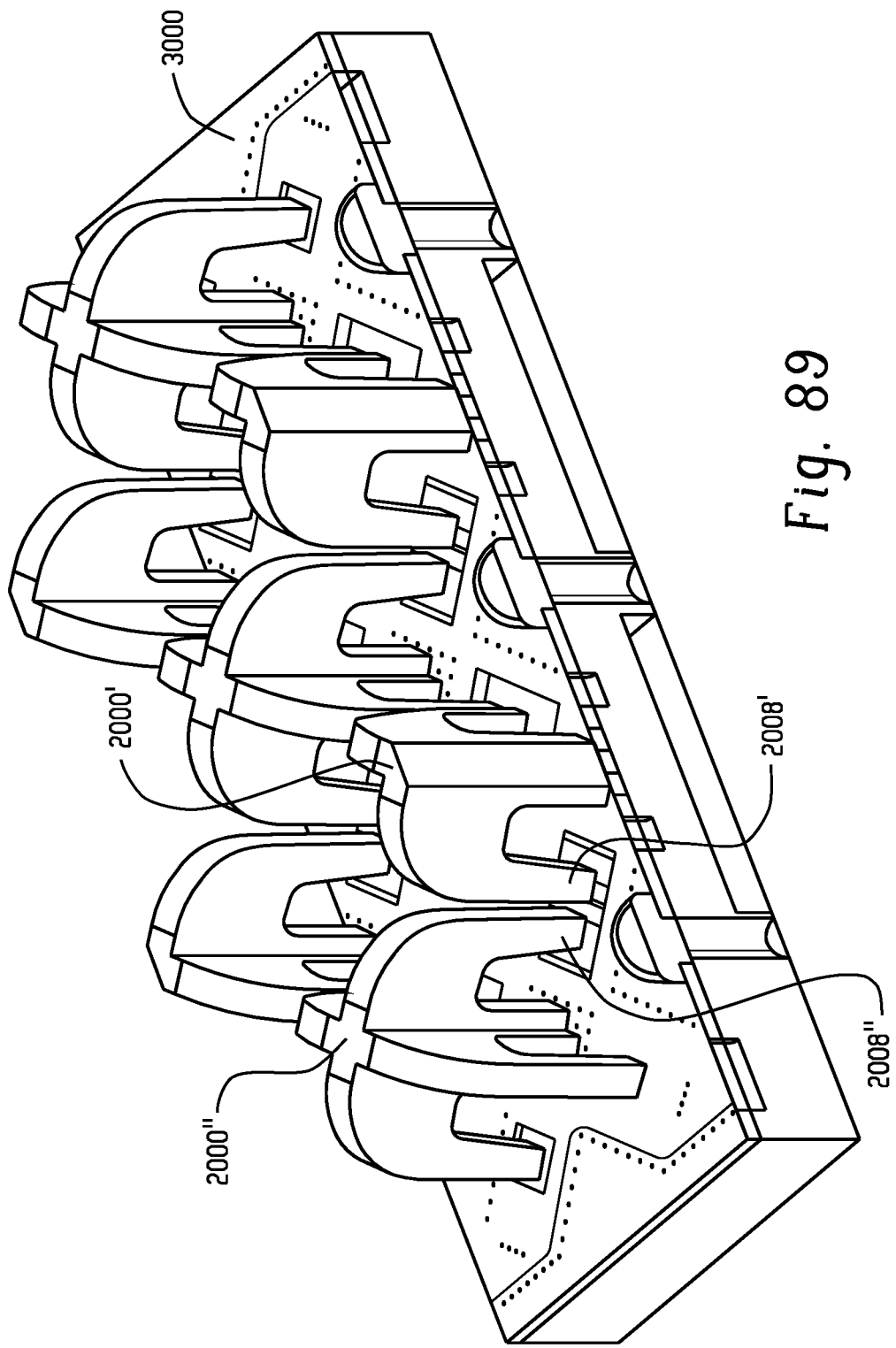
FIG. 89 is a diagrammatic illustration showing a perspective view of a portion of an AIP in accordance with some embodiments of the aperture shown in FIG. 82.
Figure 90:
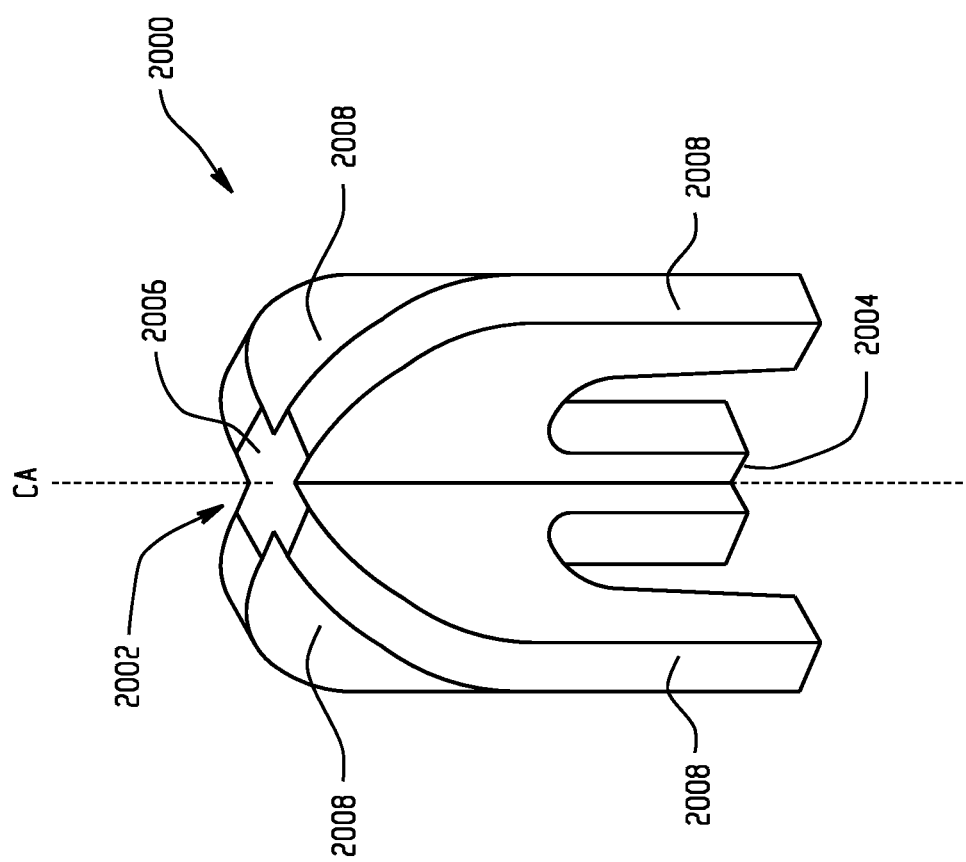
FIG. 90 is a diagrammatic illustration showing a perspective view of a tapered element in accordance with some embodiments of the aperture shown in FIG. 82.

FIG. 89 illustrates a partial section of an AIP in accordance with some embodiments disclosed herein, e.g., such as either one of the AIPs 1102 or 1202. As shown, each AIP may include a number of electrically conductive tapered elements 2000 that are mounted to and/or otherwise arranged on a board 3000, e.g., such as a printed circuit board (PCB) or other like carrier or suitable substrate. In practice, the plurality of elements 2000 may be arranged in a matrix or two dimensional array of rows and/or columns, for example, as more fully shown in FIG. 85, wherein adjacent pairs of the tapered elements 2000 define aperture pixels of a DSA. In the case of the TX AIP 1102, the matrix of tapered elements 2000 cooperate to transmit an OTA RF signal; and in the case of the RX AIP 1202, the matrix of tapered elements 2000 cooperate to receive an OTA RF signal.

FIGS. 90-93 illustrate a perspective view, side view, top view and bottom view, respectively, of a tapered element 2000 in accordance with some embodiments disclosed herein. As shown, the tapered element 2000 includes a central hub 2002 extending along a central axis (CA) from a hub base 2004 to an apex 2006 of the tapered element 2000. The central or longitudinal axis CA is perpendicular to the board 3000 and passes through the apex 2006. Suitably, when mounted to and/or arranged on the board 3000 of the respective AIP, the hub base 2004 may be proximate to the board 3000, while the apex 2006 is distal therefrom.

Figure 92:
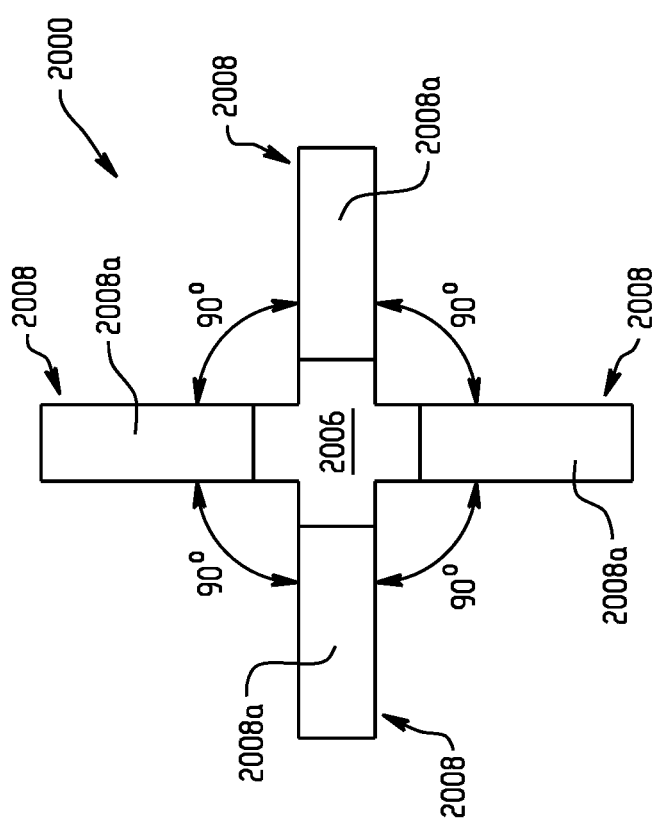
FIG. 92 is a diagrammatic illustration showing a top view of the tapered element shown in FIG. 90.
Figure 93:
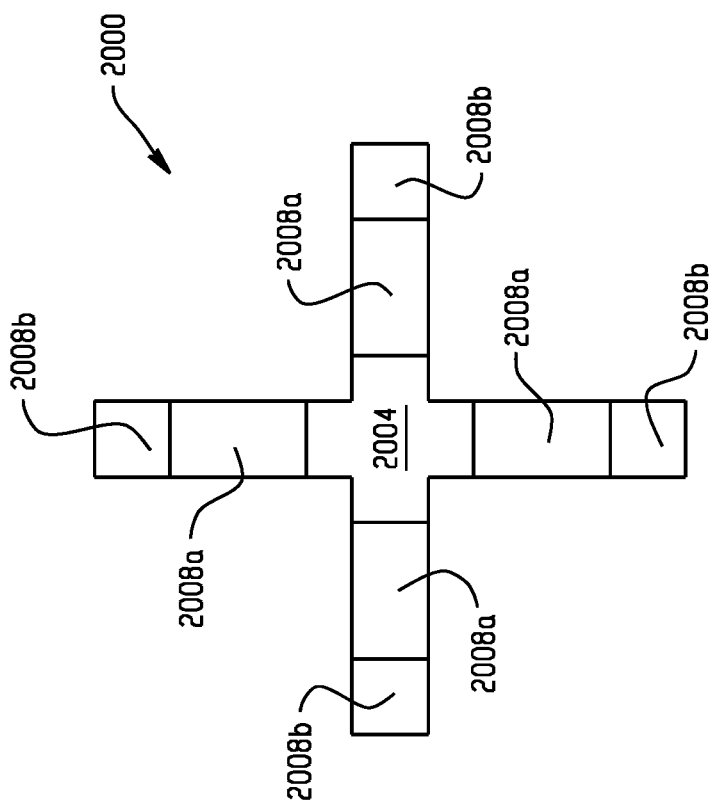
FIG. 93 is a diagrammatic illustration showing a bottom view of the tapered element shown in FIG. 90.

In some suitable embodiments, extending from the hub 2002 are a plurality of arms 2008. In the illustrated embodiment four such arms 2008 are shown, however, in practice more or fewer arms may be used. In particular, each arm 2008 may include: a first portion 2008*a* that projects the arm 2008 radially away from the central axis CA and/or hub 2002; and a second portion 2008*b* that projects the arm 2008 longitudinally in a direction parallel or substantially parallel to the central axis CA, e.g., toward the board 3000 on which the tapered element 2000 is arranged. As shown, the arms 2008 may be mutually orthogonal or substantially orthogonal to one another about the central axis, for example, as seen in FIG. 92. In some nonlimiting illustrative embodiments, the tapered element 2000 has S-fold rotational symmetry about the central axis CA where S is the number of arms. Thus in the illustrative example each illustrative tapered element 2000 has four arms and has four-fold rotational symmetry about the central axis CA.

Figure 91:
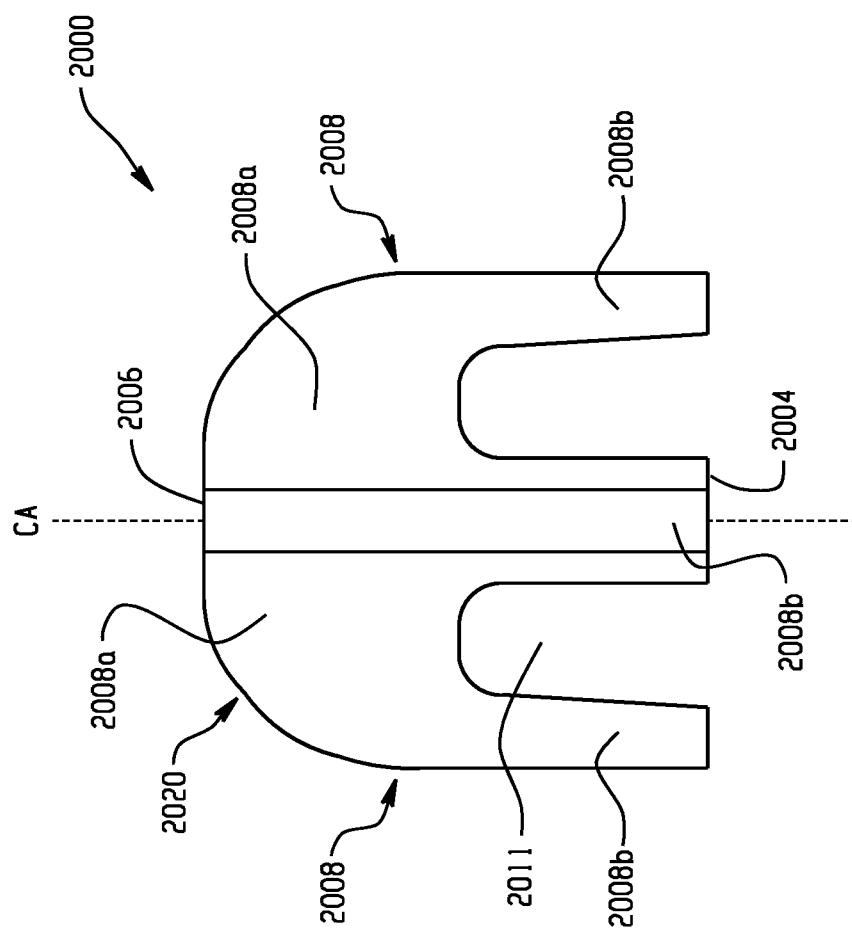
FIG. 91 is a diagrammatic illustration showing a side view of the tapered element shown in FIG. 90.

With particular reference to FIG. 91, one benefit of the design of the tapered element 2000 is that there are substantial open spaces 2011, i.e. regions of "missing" material 2011, between the arms 2008 and the central axis CA. This missing material improves the RF performance of the matrix of tapered elements 2000.

Typically, the downward extension of the central hub 2002 to the base 2004 is not an electrically active element. For example, in some embodiments there may be no direct electrical connection made to the hub base 2004 from or through the board 3000. Hence, in some embodiments (for example, as shown in FIG. 97), the central hub 2002 may omit the downward extension of the hub base 2004. Said another way, in such embodiments the central hub 2002 comprises only the joinder of the number of arms 2008. Omission of the downward extension of the central hub also advantageously increases the area or volume of the open spaces 2011.

As shown, the plurality of arms may include a first arm 2008 that defines a first plane in which both the first and second portions 2008a and 2008b of the first arm 2008 reside and a second arm 2008 that defines a second plane in which both the first and second portions 2008a and 2008b of the second arm 2008 reside, the longitudinal axis CA being contained within both the first and second planes. Suitably, the first and second planes orthogonally intersect one another along the central axis CA. In some suitable embodiments, the plurality of arms includes a third arm 2008 and a fourth arm 2008 arranged such that the first and second portions 2008a and 2008b of the third arm 2008 reside in the first plane and the first and second portions 2008a and 2008b of the fourth arm 2008 reside in the second plane. That is to say, the plurality of arms may include a first arm 2008 and a second arm 2008, arranged such that the first portion 2008a of the first arm 2008 projects the first arm 2008 radially away from the central axis CA in a first direction and the first portion 2008a of the second arm 2008 projects the second arm 2008 radially away from the central axis CA is a second direction, the second direction being orthogonal or substantially orthogonal to the first direction. In some suitable embodiments, the plurality of arms includes a third arm 2008 and a fourth arm 2008 arranged such that the first portion 2008a of the third arm 2008 projects the third arm 2008 radially away from the central axis CA in a third direction and the first portion 2008a of the fourth arm 2008 projects the fourth arm 2008 radially away from the central axis CA in a fourth direction, the third direction being opposite the first direction and the fourth direction being opposite the second direction.

In some suitable embodiments, the tapered element 2000 may be a unitary construction and/or singular continuous element. For example, in practice, the taper element 2000 may be milled and/or otherwise formed from a single block or mass of a suitable metal, e.g., such as aluminum (Al) or an Al alloy, or another suitable electrically conductive material. In some suitable embodiments, the tapered elements 2000 may be injection molded and/or otherwise formed. In some suitable embodiments, the tapered elements 2000 may be injection molded and/or otherwise formed from a thermoplastic, thermosetting polymer or other like material that is generally not electrically conductive, and the so molded or otherwise formed material may be subsequently metalized and/or coated with a layer or the like of suitable electrically conductive material.

Figure 94:
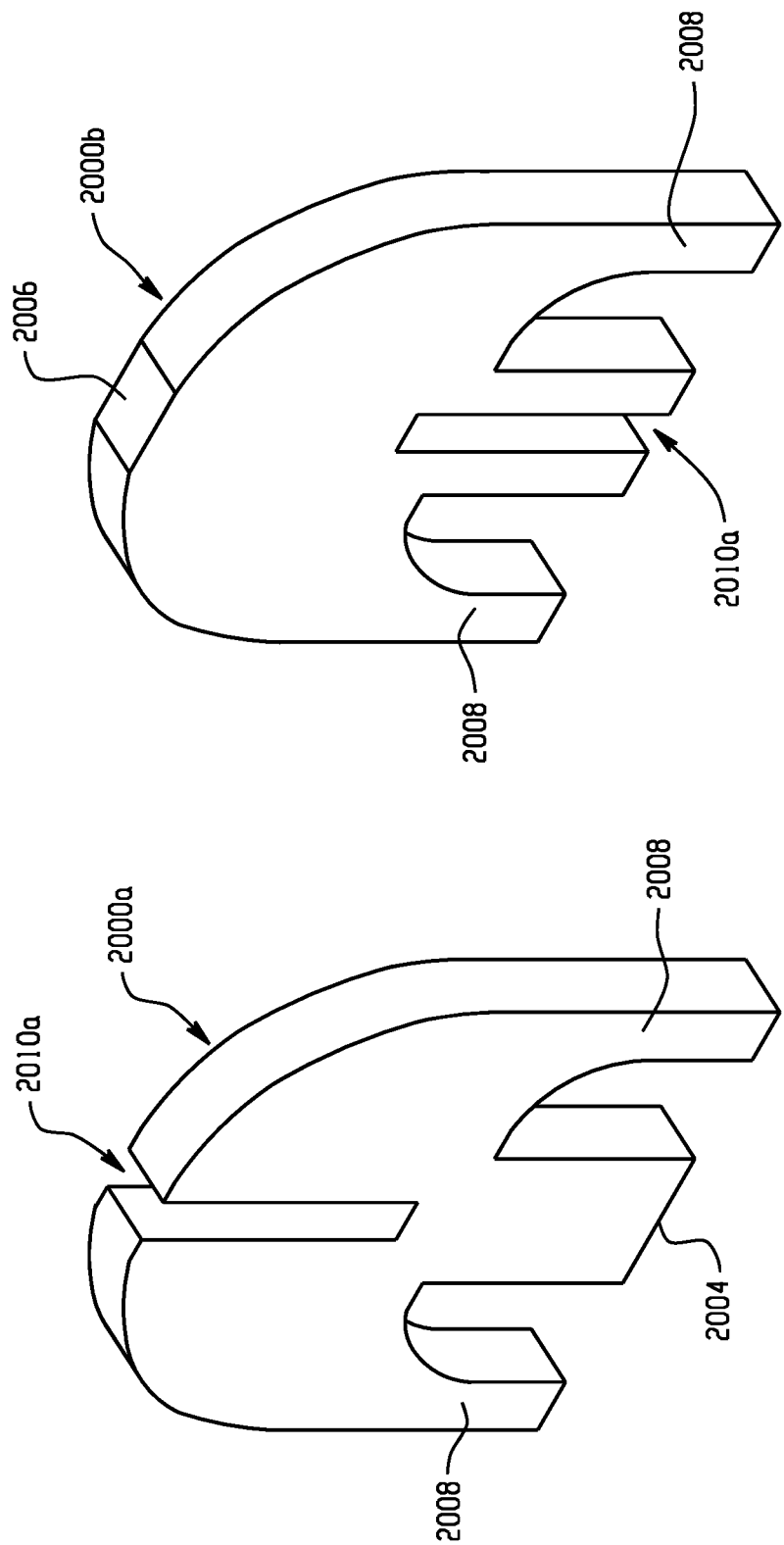
FIG. 94 is a diagrammatic illustration showing a perspective view a multipart embodiment of a tapered element in accordance with some embodiments of the aperture shown in FIG. 82.
Figure 95:
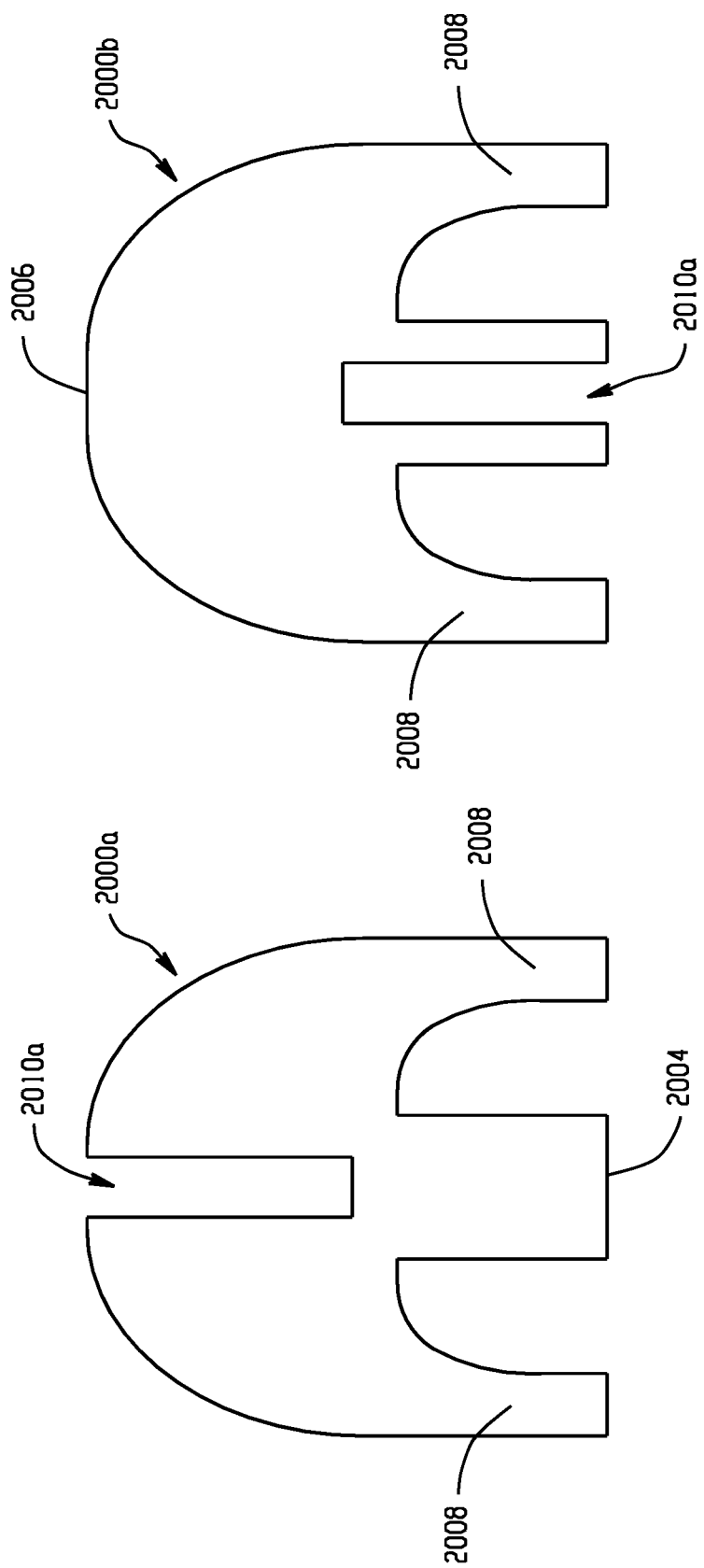
FIG. 95 is a diagrammatic illustration showing a side view of the multipart tapered element shown in FIG. 94.

With reference now to FIGS. 94 and 95, in accordance with some alternative embodiments, the taper element 2000 may be formed from a plurality of separate parts suitably joined together. For example, as shown, the tapered element 2000 may include and/or be constructed from a pair of separate parts 2000a and 2000b, each part including a pair of opposing arms 2008 and a respective central portion which ultimately cooperate to form the central hub 2002. In some suitable embodiments, each part 2000a and 2000b may be punch pressed (e.g., with a suitably shaped die), cut or otherwise formed from a planar or substantially planar sheet of suitable metal, e.g., such as Al or an Al alloy, or another suitable electrically conductive material. Notably, constructing the tapered elements 2000 in this manner can have a number of production and/or manufacturing benefits, e.g., including but not limited to a reduced manufacturing cost compared to milling and/or otherwise forming the tapered elements 2000 as a unitary element.

As shown, the part 2000a may include a slot 2010a formed in the central hub region proximate the apex end thereof. Suitably, the slot 2010a extends from the apex 2006 in a direction of the hub base 2004 to and/or near a midpoint of the central hub 2002. Conversely, the part 2000b may include a slot 2010b formed in the central hub region proximate the base end thereof. Suitably, the slot 2010b extends from the hub base 2004 in a direction of the apex 2006 to and/or near a midpoint of the central hub 2002. In practice, a completed tapered element 2000 may be formed and/or constructed by interlocking the parts 2000a and 2000b together such that the remaining portion (i.e., not including the slot 2010a) of the central hub portion of part 2000a is fit into the slot 2010b, while the remaining portion (i.e., not including the slot 2010b) of the central hub portion of part 2000b is fit into the slot 2010a. In some suitable embodiments, the respective slots 2010a and 2010b and the thicknesses of the respective parts 2000a and 2000b are dimensioned to achieve a tight friction or force fit when the parts are interconnected as described above. In some suitable embodiments, the parts 2000a and 2000b may be otherwise secured to one another, e.g., via a suitable solder joint, weld or another suitable metal joinery or other like joinery. In some suitable embodiments, the parts 2000a and 2000b may be held or otherwise secured relative to one another via respective connections to the board 3000 on which the tapered element 2000 is mounted and/or arranged.

Figure 96:
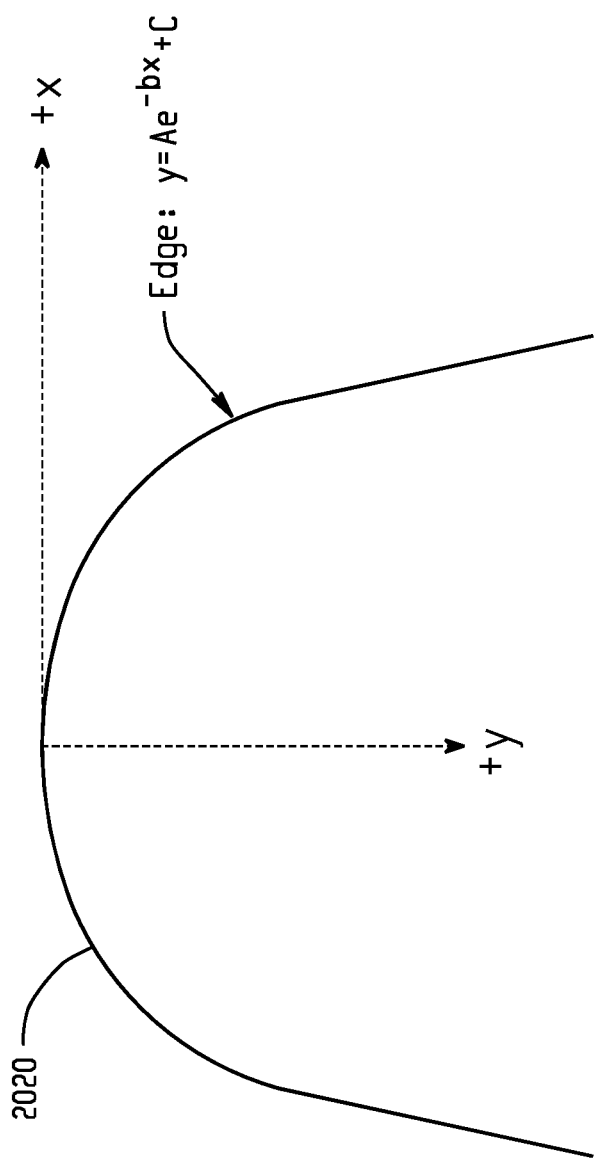
FIG. 96 is a diagrammatic illustration showing a curvature or taper of an edge or periphery of a tapered element in accordance with some embodiments of the aperture shown in FIG. 82.

Returning attention to FIG. 91 and with further reference to FIG. 96, the tapered elements 2000 may have a curvature or taper defined at their apex 2006 and extending across opposing arms 2008 along an outer perimeter or edge 2020 thereof. For example, FIG. 96 diagrammatically shows a suitable curvature or taper of the edge 2020 of the tapered element 2000. In some suitable embodiments, the curvature of the edge 2020 may be defined by and/or given as $y=Ae^{-bx}+C$, where y is a variable representing a distance taken along the central axis CA, x is a variable representing a distance taken along an orthogonal radial direction from the central axis CA, A is a non-zero constant of proportionality, b is a non-zero exponential constant and C is a constant. In some suitable embodiments, C may be zero or otherwise omitted.

Returning attention to FIG. 89, in some suitable embodiments, adjacent arms (e.g., arms 2008' and 2008") of adjacent tapered elements (e.g., tapered elements 2000' and 2000") define an aperture pixel of the DSA therebetween. Suitably, adjacent arms (e.g., arms 2008' and 2008") of adjacent tapered elements (e.g., tapered elements 2000' and 2000") may be electrically interconnected with one another via or through a balun or the like (not shown in FIG. 89). In some suitable embodiments, the baluns may be mounted to and/or arranged on an under side of the board 3000, i.e., on a side of the board 3000 opposite the tapered elements 2000, or alternatively the baluns may be mounted to and/or arranged on respective ones of the TX and/or RX conditioning boards 1106 and/or 1206. In suitable embodiments, electrical connections from each tapered element 2000 to their corresponding circuit (e.g., baluns or the like) may be made at the terminal ends of the arm portions 2008b, i.e., the ends of the arm portions 2008b distal from apex 2006. Suitably, opposing pairs of adjacent tapered elements 2000 and/or their respective adjacent arms 2008 create and/or define the differential signal therebetween. In some suitable embodiments, the hub base 2004 is provided primarily for mechanical support of the tapered element 2000 and/or mechanical connection of the tapered element 2000 to the underlying structure (e.g., the board 3000). Accordingly, the hub base 2004 may not have an electrical connection made directly thereto from or through the board 3000. In some suitable embodiments, the central hub 2002 may not extend as far from the apex 206 as the arm portions 2008*b* and may fall some distance short of the board 3000 when the tapered element 2000 is mounted thereto and/or thereon. Indeed, in some suitable embodiments, as shown in FIG. 97 for example, the end of the hub distal from the apex 2006 may terminate at a point which is flush or substantially flush with where the arm portions 2008*a* cease extending radially from the hub.

Advantageously, the central hub 2002 (for example, at or near the apex 2006) provides a suitable location and/or structure for handling the tapered elements 2000 during manufacturing and/or assembly processes. For example, the central hub 2002 and/or apex 2006 provides a suitable location and/or structure which makes the tapered elements 2000 conducive to manipulation by otherwise standard assembly line tools, e.g., such as pick and place machines.

In practice, as described herein, the various different functions of the aperture 1000 are distributed among multiple boards and/or components, e.g., such as the DPB 1010, the power supply boards 1108 and/or 1208, the TX and RX conditioning boards 1106 and/or 1206, the splitting board 1110, the combining board 1210 and the TX and RX AIPs 1102 and 1202. Additionally, the foregoing boards and/or components are modularly interconnected within the aperture 1000. Accordingly, one or more of the foregoing boards and/or components may be selectively removed and replaced without removing and replacing another one of the boards and/or components. In this way, the aperture 1000 can be readily maintained if one of the boards or components should fail, without having to replace other functioning components and/or boards. Alternately, the aperture 1000 can be readily upgraded and/or modified by replacing only selected the boards and/or components to effect the upgrade or modification desired without having to replace other components and/or boards not impacted by the desired upgrade or modification.

In another illustrative example, a modular RF aperture 1000 comprises: an air interface sub-stack including an analog conditioning board 1106, 1206 and an air interface plane (AIP) 1102, 1202 having a matrix of tapered elements 2000, wherein neighboring pairs of tapered elements within the matrix define aperture pixels and are configured to at least one of receive or transmit over-the-air RF signals; a digital personality board (DPB) 1010 including analog-to-digital converter (ADC) and/or digital-to-analog converter (DAC) components; a power supply board 1108 disposed between the air interface sub-stack and the DPB; a first heat sink plate 1302 disposed between the air interface sub-stack and the power supply board; and a second heat sink plate 1304 disposed between the DPB and the power supply board.

In some embodiments, the modular RF aperture 1000 may further comprise an analog board 1110, 1210 disposed between the DPB 1010 and the second heat sink plate 1304, the analog board configured to split and/or combine analog signals received from the DPB and/or the air interface sub stack.

In some embodiments of the modular RF aperture 1000, the air interface sub-stack comprises a transmit (TX) air interface sub-stack 1106, 1102 whose neighboring pairs of tapered elements are configured to transmit over-the-air RF signals and a receive (RX) air interface sub-stack 1206, 1202 whose neighboring pairs of tapered elements are configured to receive over-the-air RF signals, there being a gap spacing apart the TX air interface sub-stack and the RX air interface sub-stack. The modular RF aperture in this embodiment further includes a cooling mechanism 1310 disposed in the gap spacing apart the TX air interface sub-stack and the RX air interface sub-stack, the cooling mechanism 1310 being in thermal contact with the first heat sink plate 1302 and with the second heat sink plate 1304. In some nonlimiting illustrative embodiments, the cooling mechanism 1310 may comprise a central air duct, a liquid cooling mechanism, or a passive cooling mechanism.

In some embodiments, the modular RF aperture 1000 further comprises a base plate 1004 and a radome 1002. The air interface sub-stack, the DPB, the power supply board, the first heat sink plate and the second heat sink plate are disposed between the base plate and the radome, with the air interface sub-stack proximate to the radome and distal from the base plate, and the DPB proximate to the base plate and distal from the radome.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A modular radio frequency (RF) aperture comprising:
   a first air interface plane (AIP) including a first matrix of tapered elements, wherein neighboring pairs of tapered elements within the first matrix define aperture pixels and are configured to at least one of receive or transmit over-the-air radio frequency (RF) signals;
   a first circuit board electrically connected to the first AIP, the first circuit board being selectively operative to at least one of condition or amplify individual signals at least one of provided to or received from each aperture pixel of the first AIP;
   a second circuit board electrically connected to the first circuit board, the second circuit board being selectively operative to at least one of: (i) receive a modulated transmit signal from a digital personality circuit board (DPB) and divide the received modulated transmit signal into individual signals for each pixel of the first AIP; or (ii) combine individual received signals from each pixel of the first AIP into a combined receive signal and provide the combined receive signal to the DPB; and
   a third circuit board electrically connected to at least one of the first circuit board, the second circuit board, and the DPB, wherein the third circuit board selectively provides electrical power to operate at least one of the first circuit board, the second circuit board, and DPB;
   wherein the first AIP, the first circuit board, the second circuit board, the third circuit board, and the DPB are modularly interconnected such that any given one thereof may be selectively removed and replaced without removing and replacing any other one thereof.

2. The RF aperture of claim 1, wherein:
   the first AIP is a transmit AIP and neighboring pairs of tapered elements are configured to transmit over-the-air differential RF signals;

the first circuit board is a transmit conditioning board selectively operative to at least one of condition or amplify individual signals provided to each aperture pixel of the first AIP; and the second circuit board is a splitting board selectively operative to receive the modulated transmit signal from the DPB and divide the received modulated transmit signal into individual signals for each pixel of the first AIP;

the RF aperture further comprising:

a second air interface plane (AIP) which is a receive AIP, the second AIP including a second matrix of tapered elements, wherein neighboring pairs of tapered elements within the second matrix define aperture pixels and are configured to receive over-the-air differential RF signals;

a fourth circuit board which is a receive conditioning board, the fourth circuit board being electrically connected to the second AIP and selectively operative to at least one of condition or amplify individual signals received from each aperture pixel of the second AIP; and a fifth circuit board which is a combining board, the fifth circuit board being electrically connected to the fourth circuit board and selectively operative to combine individual received signals from each pixel of the second AIP into a combined receive signal and provide the combined receive signal to the DPB.

3. The RF aperture of claim 2, wherein the first and second AIPs, the first circuit board, the second circuit board, the third circuit board, the fourth circuit board, the fifth circuit board and the DPB are modularly interconnected such that any given one thereof may be selectively removed and replaced without removing and replacing any other one thereof.

4. The RF aperture of claim 2, wherein the third circuit board is electrically connected to at least one of the fourth and fifth circuit boards to selectively provide electrical power to operate at least one of the fourth and fifth circuit boards.

5. The RF aperture of claim 1, further comprising:
baluns electrically connected between neighboring pairs of tapered elements within the first matrix.

6. The RF aperture of claim 1, further comprising:
a radome in which the first AIP, the first circuit board, the second circuit board, the third circuit board and the DPB are housed.

7. The RF aperture of claim 6, wherein the radome is constructed from at least one of: polytetrafluoroethylene (PTFE), acrylonitrile butadiene styrene (ABS), thermoplastic elastomers (TPE), polycarbonate (PC), polybutylene terephthalate (PBT), polypropylene (PP), nylon, and combinations thereof.

8. The RF aperture of claim 6, wherein the radome is injection molded.

9. The RF aperture of claim 6, wherein the radome is transparent to RF radiation.

10. The RF aperture of claim 6, wherein the radome has a wall thickness in a range of between 3.0 millimeters (mm) to about 4.0 mm, inclusive.

11. The RF aperture of claim 1, wherein the first AIP, the first circuit board, the second circuit board and the third circuit board are arranged one over another in a first stack, such that the first circuit board is positioned between the first AIP and the third circuit board, and the third circuit board is positioned between the first circuit board and the second circuit board.

12. The RF aperture of claim 11, further comprising:
a base plate;
one or more standoffs which support the DPB on the base plate and space the DPB at a distance away from the base plate; and
a radome connected to the base plate;
wherein said base plate and radome cooperate to form an interior cavity in which the first AIP, the first circuit board, the second circuit board, the third circuit board and the DPB are housed.

13. The RF aperture of claim 12, further comprising:
a sealing member arranged between the radome and the base plate, the sealing member providing an air tight seal between the radome and the base plate.

14. The RF aperture of claim 13, wherein the sealing member is one of a gasket or an o-ring which is squeezed between the radome and the base plate.

15. The RF aperture of claim 12, wherein the radome comprises:
an exhaust vent in a first wall of the radome through which air is selectively flowed out of the cavity; and
an intake vent in a second wall of the radome through which air is selectively flowed into the cavity.

16. A modular radio frequency (RF) aperture comprising:
a first air interface plane (AIP) including a first matrix of tapered elements, wherein neighboring pairs of tapered elements within the first matrix define aperture pixels and are configured to at least one of receive or transmit over-the-air radio frequency (RF) signals;
a first circuit board electrically connected to the first AIP, the first circuit board being selectively operative to at least one of condition or amplify individual signals at least one of provided to or received from each aperture pixel of the first AIP;
a digital personality circuit board (DPB) including analog to digital converters and/or digital to analog converters;
a second circuit board electrically connected to the first circuit board, the second circuit board being selectively operative to at least one of: (i) receive a modulated transmit signal from the DPB and divide the received modulated transmit signal into individual signals for each pixel of the first AIP; or (ii) combine individual received signals from each pixel of the first AIP into a combined receive signal and provide the combined receive signal to the DPB; and
a third circuit board electrically connected to at least one of the first circuit board, the second circuit board, and the DPB, wherein the third circuit board selectively provides electrical power to operate at least one of the first circuit board, the second circuit board, and DPB.

17. The RF aperture of claim 16, wherein the first AIP, the first circuit board, the second circuit board, the third circuit board, and the DPB are modularly interconnected such that any given one thereof may be selectively removed and replaced without removing and replacing any other one thereof.

18. The RF aperture of claim 16, wherein:
the first AIP is a transmit AIP and neighboring pairs of tapered elements are configured to transmit over-the-air differential RF signals;
the first circuit board is a transmit conditioning board selectively operative to at least one of condition or amplify individual signals provided to each aperture pixel of the first AIP; and
the second circuit board is a splitting board selectively operative to receive the modulated transmit signal from the DPB and divide the received modulated transmit signal into individual signals for each pixel of the first AIP;

the RF aperture further comprising:

a second air interface plane (AIP) which is a receive AIP, the second AIP including a second matrix of tapered elements, wherein neighboring pairs of tapered elements within the second matrix define aperture pixels and are configured to receive over-the-air differential RF signals;

a fourth circuit board which is a receive conditioning board, the fourth circuit board being electrically connected to the second AIP and selectively operative to at least one of condition or amplify individual signals received from each aperture pixel of the second AIP; and a fifth circuit board which is a combining board, the fifth circuit board being electrically connected to the fourth circuit board and selectively operative to combine individual received signals from each pixel of the second AIP into a combined receive signal and provide the combined receive signal to the DPB.

19. The RF aperture of claim 16, wherein the first AIP, the first circuit board, the second circuit board and the third circuit board are arranged one over another in a first stack, such that the first circuit board is positioned between the first AIP and the third circuit board, and the third circuit board is positioned between the first circuit board and the second circuit board, and the RF aperture further comprises:

a base plate;

one or more standoffs which support the DPB on the base plate and space the DPB at a distance away from the base plate; and a radome connected to the base plate;

wherein said base plate and radome cooperate to form an interior cavity in which the first AIP, the first circuit board, the second circuit board, the third circuit board and the DPB are housed.

* * * * *